United States Patent [19]
Donovan

[11] Patent Number: 5,914,753
[45] Date of Patent: Jun. 22, 1999

[54] APPARATUS AND METHOD TO CONVERT COMPUTER GRAPHICS SIGNALS TO TELEVISION VIDEO SIGNALS WITH VERTICAL AND HORIZONTAL SCALING REQUIRING NO FRAME BUFFERS

[75] Inventor: Timothy J. Donovan, Milpitas, Calif.

[73] Assignee: Chrontel, Inc., San Jose, Calif.

[21] Appl. No.: 09/105,079

[22] Filed: Jun. 25, 1998

Related U.S. Application Data

[63] Continuation of application No. 08/745,606, Nov. 8, 1996, Pat. No. 5,781,241.

[51] Int. Cl.$^6$ ........................................................ H04N 7/01
[52] U.S. Cl. .......................... 348/441; 348/446; 348/581; 348/447
[58] Field of Search ................................. 348/441, 445, 348/446, 447, 581, 458; 345/154

[56] References Cited

U.S. PATENT DOCUMENTS

| | | | |
|---|---|---|---|
| 4,872,054 | 10/1989 | Gray et al. | 348/441 |
| 5,008,752 | 4/1991 | Van Nostrand | 348/441 |
| 5,510,843 | 4/1996 | Keene et al. | 348/446 |
| 5,546,130 | 8/1996 | Hackett et al. | 348/447 |
| 5,739,867 | 4/1998 | Eglit | 348/581 |

*Primary Examiner*—Victor R. Kostak
*Attorney, Agent, or Firm*—Douglas J. Crisman; Flehr Hohbach Test Albritton & Herbert LLP

[57] ABSTRACT

A method and system is disclosed for scaling computer video in the process of scan rate conversion. In the disclosed system and method storage is provided for at least two lines of graphics pixels per video component composing the computer graphics signals and less than a full frame's worth of the graphics pixels. The graphics pixels are stored as they are provided so that the newest graphics pixels or a linear combination of the newest graphics pixels and stored graphics pixels overwrite previously-stored graphics pixels. In a repeating pattern for every RV VGA lines, where RV≧2, television pixels composing the television video signals are generated from a weighted sum of the stored graphics pixels such that a different precomputed set of weights are used to compute the television pixels for each of the generated television lines. The television signals are horizontally and vertically scaled so the graphics image corresponding to the computer graphics signals being converted fits within a television display.

28 Claims, 18 Drawing Sheets

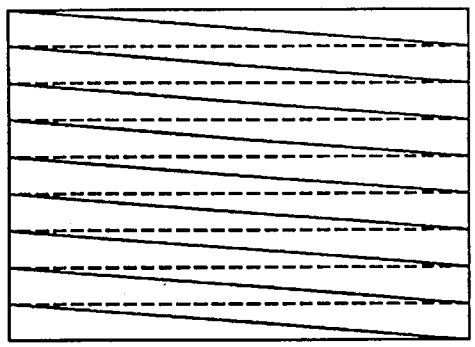
FIG. 1 Non-interlacing Scanning
   Solid Lines - Active Scan
   Dash Lines - Retrace
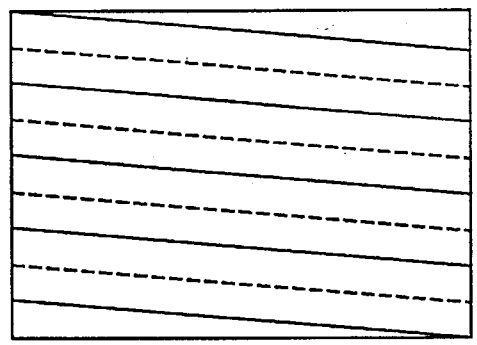
FIG. 2 Interlace Scanning
   Solid Lines - Field 1 Scan Lines
   Dash Lines - Field 2 Scan Lines
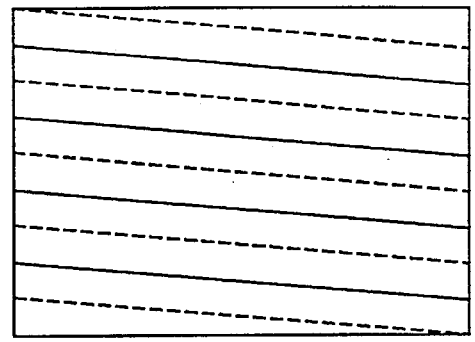
FIG. 3 Interlace Scanning
   Solid Lines - Field 2 Scan Lines
   Dash Lines - Field 1 Scan Lines
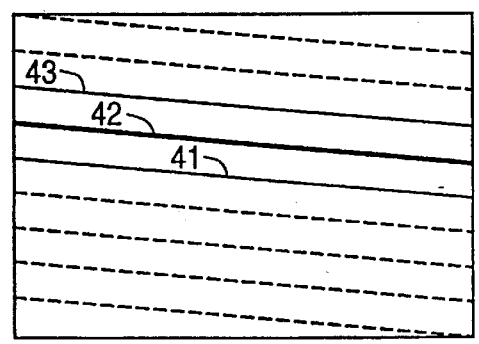
FIG. 4 Three Lines Averaged Together
   VGA Input Signal
   Lines $(1/4)*(n-2)+(1/2)*(n-1)+(1/4)*n$
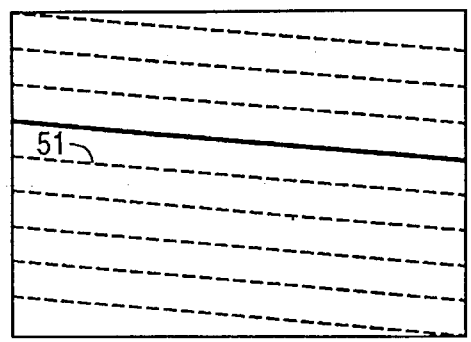
FIG. 5 One Line Produced from Three
   TV Output Signal
   Line n

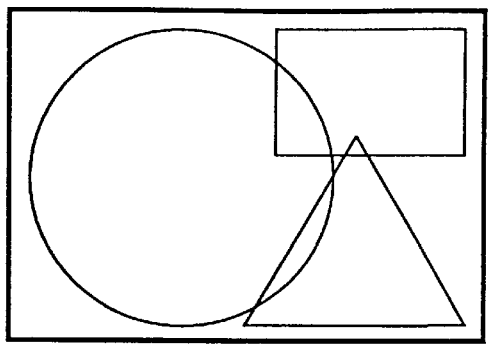
FIG. 6 VGA Image
Underscan of Picture Tube Keeps All
Portions of Picture in Viewable Area
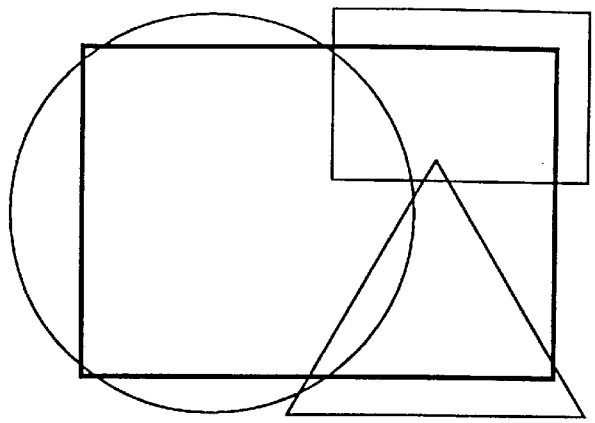
FIG. 7 Image
Underscan of Picture Tube Eliminates
Portions of Picture from Viewable Area
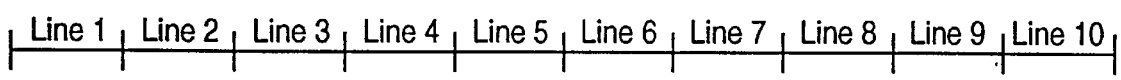
Standard VGA
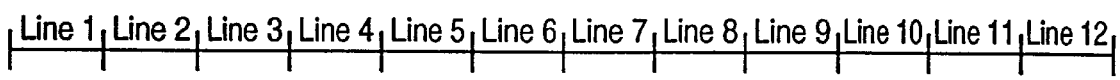
VGA with Increased Pixel Clock (and Horizontal Frequency)
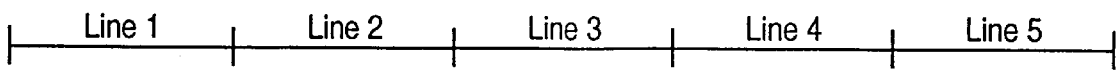
Television Signal after Scan Conversion
FIG. 8 Horizontal Timing Relationships

| VGA Line # | Mem 1 Write | Mem 1 Read | Mem 2 Write | Mem 2 Read | Mem 3 Write | Mem 3 Read | TV Line # |
|---|---|---|---|---|---|---|---|
| 1 | 1 | | | | | 14+15+6+7+8 | 1 |
| 2 | | 1 | 2 | 8 | 8+1+2 | Extra Pixels | |
| 3 | 1 3 | 2 1 | 4 1+2+3 | 3 2 | | 8+1+2 | 2 |
| | | | | | | Extra Pixels | |
| 4 | | | 4 | 1+2+3 | 1+2+3+4 | 1+2+3+4 | 3 |
| 5 | 5 | 3 | | 4 | 3+4+5 | Extra Pixels | |
| 6 | 4+5+6 | 5 | 6 | 4 | | 3+4+5 | 4 |
| 7 | 7 | 4+5+6 | | | 4+5+6+7 | Extra Pixels | |
| | | | | | | 4+5+6+7 | 5 |
| 8 | | 7 | 8 | 6 | 6+7+8 | Extra Pixels | |

FIG. 17

| VGA Line # | Mem 1 Write | Mem 1 Read | Mem 2 Write | Mem 2 Read | Mem 3 Write | Mem 3 Read | TV Line # |
|---|---|---|---|---|---|---|---|
| 1 | 1 | | | | | 10+11+12 | 1 |
| 2 | 12+1+2 | 1 | 2 | 12 | | | |
| 3 | 3 | 12+1+2 | | | 12+1+2+3 | Extra Pixels | |
| | | | | | | 12+1+2+3 | 2 |
| 4 | 2+3+4 | 3 | 4 | 2 | | | |
| 5 | 5 | 2+3+4 | | | 2+3+4+5 | Extra Pixels | |
| | | | | | | 2+3+4+5 | 3 |
| 6 | | | 6 | | | | |
| 7 | 7 | 5 | 5+6+7 | 6 | | Extra Pixels | |
| 8 | | | 8 | 5+6+7 | 5+6+7+8 | 5+6+7+8 | 4 |
| 9 | 9 | 7 | 7+8+9 | 8 | | | |
| 10 | | | 10 | 7+8+9 | 7+8+9+10 | Extra Pixels | |
| 11 | 11 | | | | | 7+8+9+10 | 5 |
| 12 | | 11 | 12 | 10 | 10+11+12 | Extra Pixels | |

FIG. 18

APPARATUS AND METHOD TO CONVERT COMPUTER GRAPHICS SIGNALS TO TELEVISION VIDEO SIGNALS WITH VERTICAL AND HORIZONTAL SCALING REQUIRING NO FRAME BUFFERS

The present application is a continuation of U.S. patent application Ser. No. 08/745,606, filed Nov. 8, 1996, now U.S. Pat. No. 5,781,241, (Apparatus and Method to Convert Computer Graphics Signals to TV Video Signals Requiring No Frame Buffers).

The present invention relates generally to the conversion of computer video signals to television signals and, particularly, to the conversion of computer video signals to horizontally and vertically-scaled television signals in such a manner that the video signals are converted on the fly and only a small amount of video memory (much less than a frame) is required to perform the conversion.

BACKGROUND OF THE INVENTION

The conversion of computer video signals to video signals compatible with today's televisions has become an important technology for business presentations, home entertainment and the network personal computer (NC). There are three major elements involved in this transformation, color space conversion, scan rate conversion, and encoding the composite waveform in accordance with a selected television signal format (i.e., either NTSC or PAL).

Color space conversion transforms the RGB (Red, Green, Blue) signals output by a VGA source to the YUV (Luminance and Chrominance) signals used to create composite video. This can be performed before or after the scan rate conversion, but must be performed before encoding to a composite television signal.

Encoding to a composite television waveform involves modulation of the color difference signals, generation of synchronization signals, bandlimiting of the luminance and chrominance signals and summation of luminance, chrominance and sync signals.

Scan rate conversion produces a sequence of interlaced lines of video from the non-interlaced sequence of lines generated by the VGA source. In video displays, such as a television or a VGA display the picture is created by scanning the electron bean horizontally across the screen from left to right, the moving back to the left, and scanning across the screen again. This process is repeated until all lines have been scanned, thus completing one frame of video. The beam also moves down the screen until it reaches the bottom of the display, at which point the beam returns to the top. Referring to FIGS. 1–5, general aspects of the scan rate conversion process are now described.

FIG. 1 shows a non-interlaced scan pattern typical of VGA displays. Because scan rast converters convert VGA signals 10 television signals, the scan pattern of FIG. 1 illustrates the pattern of VGA lines presented to the scan rate converter. In a non-interlaced VGA display every line is scanned in every frame. At the completion of one scan line, the electron beam travels back to the left side of 10 screen before the next line can be displayed. This is called retrace. A popular VGA display frame rate (i.e., the rate at which new frames are displayed) is ~60 Hz.

FIGS. 2 and 3 show an interlaced scan pattern typical of a television display. On a television display every other line is scanned in what is called the "first field" (FIG. 2), and the alternate lines are displayed in the "second field" (FIG. 3). Both fields are required to make a complete picture. For NTSC signals, the field rate (i.e., the rate at which new fields are displayed) is ~60 Hz and the frame rate ~30 Hz.

Scan rate conversion must account for the different frame rates of the VGA monitors and television monitors. For example, since a television monitor displays half as many lines as a VGA monitor in a given amount of time, each line of the television signal generated by a scan rate converter must have a duration that is twice that of the VGA signal. Conventional scan rate converters account for the different frame rates by writing the VGA data to memory at one rate and reading television data out of memory at one half of this rate.

In addition to extending the duration of each line, conventional scan rate converters perform a filtering function on adjacent VGA lines. The reason for filtering is to reduce flicker in the television picture caused by picture content transitions (i.e., image edges) in the vertical direction in the VGA signal. For example, if only half of the VGA lines were to appear in a television field, these transitions would appear to move up and down by one line at the frequency of the television frame rate (30 Hz). The flicker filter reduces this movement by spreading a transition over a sequence-of television lines. For example, one common flicker filter produces a television line by adding one quarter of the current VGA line, two quarters of the previous VGA line and one quarter of the VGA line before that. This is called a "1-2-1" or a "1/4–1/2–1/4"' filter. This filtering process increases the memory requirement in the scan rate conversion block. Typically, between one and one half and three VGA lines of memory are required per video component.

FIGS. 4 and 5 illustrate how three VGA lines (FIG. 4) are combined with a 1-2-1 filter to produce a corresponding television line (FIG. 5). The solid lines shown in FIG. 4 are the VGA lines being filtered. The line 41 (FIG. 4) is the current VGA line, corresponding to the television line 51 (FIG. 5) being output. The darker line 42 is the previous VGA line, which is multiplied by the largest weight (i.e., "2"). Both lines 41 and 43 are multiplied by the smallest weight (i.e., "1").

The above-described process of scan rate conversion does not change the location of the image content with respect to the beginning and ending of the electron beam scan in either the horizontal or vertical direction. However, unlike a VGA monitor, a television monitor overscans the picture tube, leaving some of the original image outside of the viewable screen. For example, FIG. 6 shows an image displayed on a VGA monitor and FIG. 7 shows the same image when displayed on a television monitor. Note that a significant portion of the image is not displayed on the television monitor. The amount of this overscan is typically on the order of five to ten percent. With traditional viewing material, where the original source was unknown to the viewer, this is not noticeable. However, when the television is displaying a converted computer display, the missing portions of the screen are noticeable, and sometimes important, areas such as menus.

This problem is addressed by scan rate converters that scale VGA images so that, when displayed on a television monitor, the VGA images fit fully within the television monitors viewable area. Conventional scaling scan rate converters (such as the Yuan Scan Rate Converter, Model: SFN-100) require the use of a frame buffer/memory large enough to capture an entire graphics frame. After a frame is captured, these conventional converters perform scaling scan rate conversion. This technique requires either a large part count (for implementation using discrete components)

and corresponding printed circuit board space, or large amounts of on-chip memory (for monolithic integrated circuit implementation). This leads to high system cost and imposes serious limitations on the potential of high volume applications using conventional scaling scan rate conversion techniques.

SUMMARY OF THE INVENTION

The present invention is an apparatus and method to convert computer graphics signals to television video signals with vertical and horizontal scaling without using a frame buffer.

More particularly, the present invention is a cost effective apparatus and method for scaling computer VGA signals in the process of scan rate conversion. The present invention requires no more than three lines of memory per video component and yields an output signal that is entirely within the viewable area of a television screen. The present method increases the horizontal frequency (i.e., the rate at which video lines are output) of the VGA signals by the inverse of the amount of scaling desired. At the same time, the present method maintains the vertical frequency (i.e., the frame rate) of the video at its usual value. This end is accomplished by inserting additional blank lines into the VGA signal, which requires the present invention to increase the total number of VGA lines by the inverse of the desired scaling factor.

The aforementioned VGA parameters (i.e., horizontal frequency, pixel clock and lines per frame) are programmable in today's VGA controllers. Consequently, the present method can be implemented in a preferred embodiment that determines appropriate values for the VGA parameters and then supplies those values to the VGA controller providing the video signals. The appropriate values depend on the format of the video signals being converted and the required format of the television signals (i.e., NTSC or PAL).

Due to the increase in the VGA horizontal frequency, the preferred embodiment needs to lengthen the output time of each line by a factor of 2 times the inverse of the scaling ratio in order to output a line that is of proper duration for a television. This is done by a combination of changing the readout clock frequency (the clock that determines the rate at which television pixels are provided), and inserting or deleting extra pixels to complete each television line.

For example, a typical scan converter produces five lines of television video in the time it takes a VGA controller to output ten lines of standard VGA video in contrast, assuming a scale factor of 516, the preferred embodiment causes the VGA controller to output twelve lines of VGA video, which are converted by the preferred embodiment to five scaled, scan-converted lines of television video. FIG. 8 shows, from top to bottom, the time-relationships between the 10 lines of standard VGA video, the 12 lines of sped-up VGA video, and the resulting 5 scan-converted lines output by the preferred embodiment.

Note that, for the 5/6 scale factor, and assuming an input image of 640 active pixels by 480 active lines, the total number of television lines containing active video will be 400 (480*(5/6)), and the total number of VGA lines will need to be increased to 630 (525*(6/5)). Scaling the incoming video inr this manner generates an output signal whose active video comprises a fewer number of lines than the incoming signal (400 versus 480 in the case of 5/6's scaling). This redistribution of the image across a different number of lines introduces artifacts that where not present in the original image. These artifacts are reduced by modifying the filter used for reducing flicker. This is accomplished by modifying, on a line by line basis, the coefficients used in the flicker filter. For each television line being generated, the surrounding VGA lines are weighted in relation to their distance from the television line. By doing this, the location of objects and transitions in the picture do not move, reducing distortions and artifacts in the image.

FIG. 9 and 10 show how these flicker filter coefficients are derived for the case of 5/6's and 7/8's scaling. Each television line shown spans three (four in one case) VGA lines. For example, for the case of 5/6's scaling, shown in FIG. 9, the television line 3 spans parts of VGA lines 5–8. The taps of the flicker filter (shown between VGA and television lines) are chosen to match the percentage that a particular television line overlaps a particular VGA line. In the case of 7/8's scaling, shown in FIG. 10, the filter coefficients are changed for each of the seven television lines produced by sixteen VGA lines. This pattern is repeated for every group of VGA lines. I.e., for 5/6 scaling, every 12 VGA lines and, for 7/8 scaling, every 16 VGA lines.

To maintain the resulting television image in a proper aspect ratio, the horizontal size of the image needs to be reduced by the same amount as the vertical size. The preferred embodiment accomplishes this by adjusting the TV pixels per line, graphics pixels per line and relationship between graphics pixel frequency and TV pixel frequency in order to achieve a horizontally underscanned image whose degree of underscan matches the effective underscan achieved by scaling the number of vertical lines by the chosen scale factor.

A preferred embodiment also supports no scaling modes, in which one television line is generated from two VGA lines. Therefore, embodiments designed in accordance with the present invention that provide both scaling and no scaling modes generate a new TV line using a pattern of processing operations that repeats for every RV lines, where RV is a repeat value that is greater than or equal to 2.

BRIEF DESCRIPTION OF THE DRAWINGS

Additional objects and features of the invention will be more readily apparent from the following detailed description and appended claims when taken in conjunction with the drawings, in which:

FIG. 1 shows a non-interlaced scan pattern typical of VGA displays;

FIG. 2 shows the scan lines of the first field of an interlaced scan pattern typical of a television display;

FIG. 3 shows the scan lines of the second field of an interlaced scan pattern typical of a television display;

FIG. 4 illustrates three VGA lines combined with a 1-2-1 filter to produce a corresponding television line;

FIG. 5 shows the television line generated from the three VGA lines of FIG. 4;

FIG. 6 shows an image displayed on a VGA monitor;

FIG. 7 shows the image of FIG. 6 when displayed on a television monitor;

FIG. 8 shows, from top to bottom, the time-relationships between the 10 lines of standard VGA video, the 12 lines of sped-up VGA video, and the resulting 5 scan-converted lines output by the preferred embodiment;

FIG. 17 illustrates the sequence of operations by which the scan rate conversion blocks 302 of FIG. 16 generate a TV line from three or four graphics lines for the 5/4 scaling mode;

FIG. 18 illustrates the sequence of operations by which the scan rate conversion blocks 302 of FIG. 16 generate a TV line from three or four graphics lines for the 5/6 scaling mode;

DESCRIPTION OF THE PREFERRED EMBODIMENT

Figure 9:
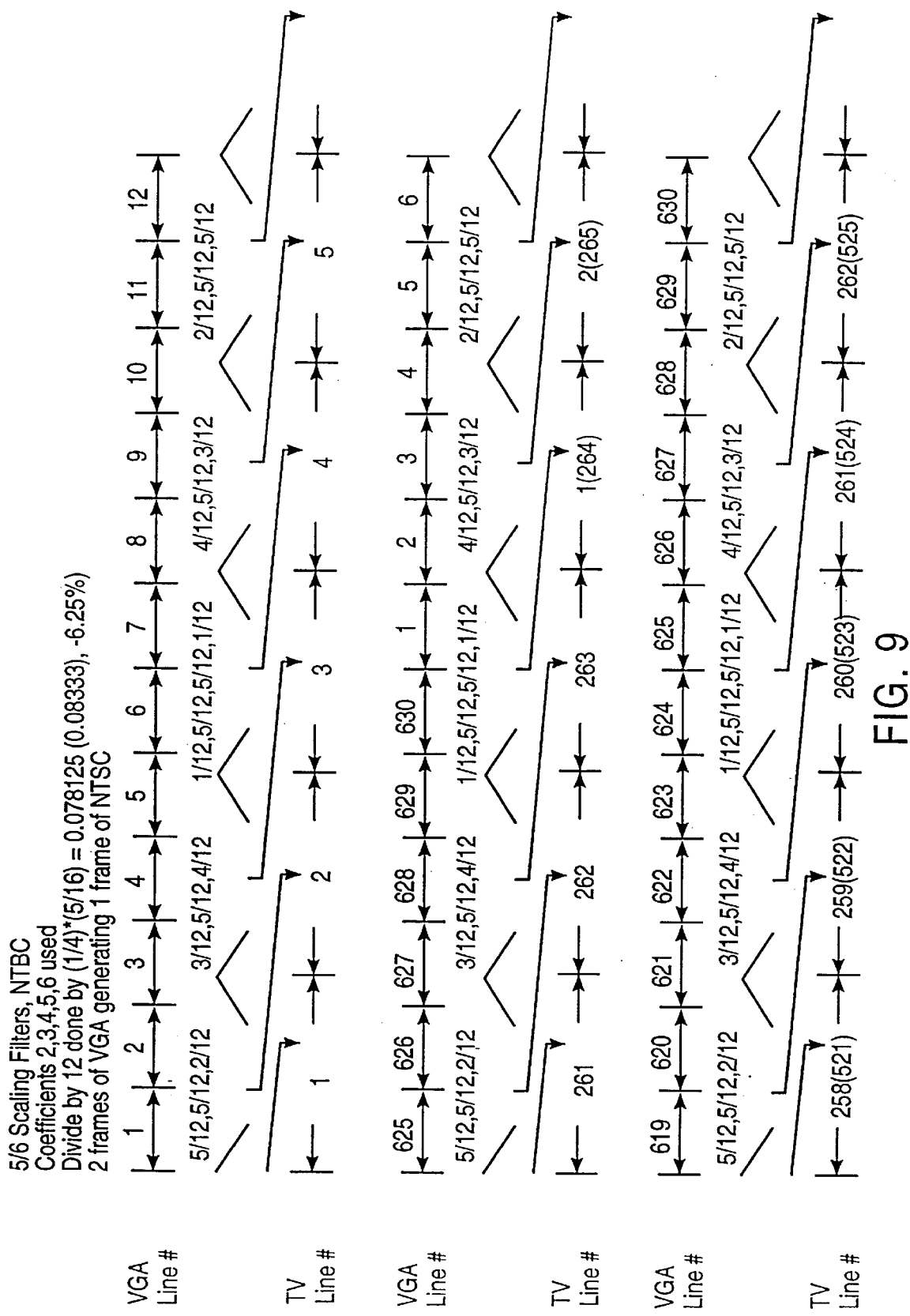
FIG. 9 is a table illustrating the derivation of the flicker filter coefficients for the case of 5/6's scaling.
Figure 10:
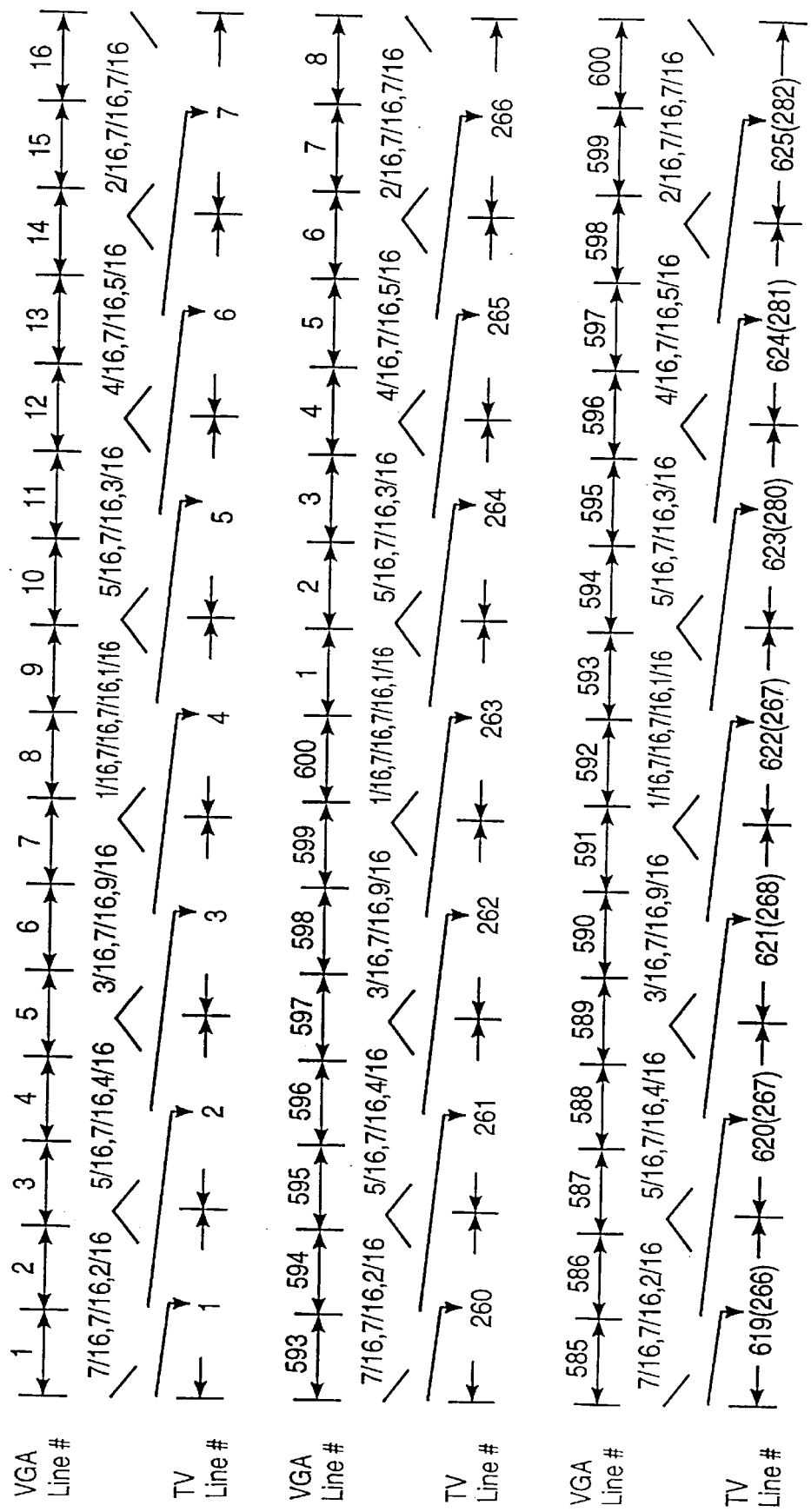
FIG. 10 is a table illustrating the derivation of the flicker filter coefficients for the case of 7/8's scaling.
Figure 11:
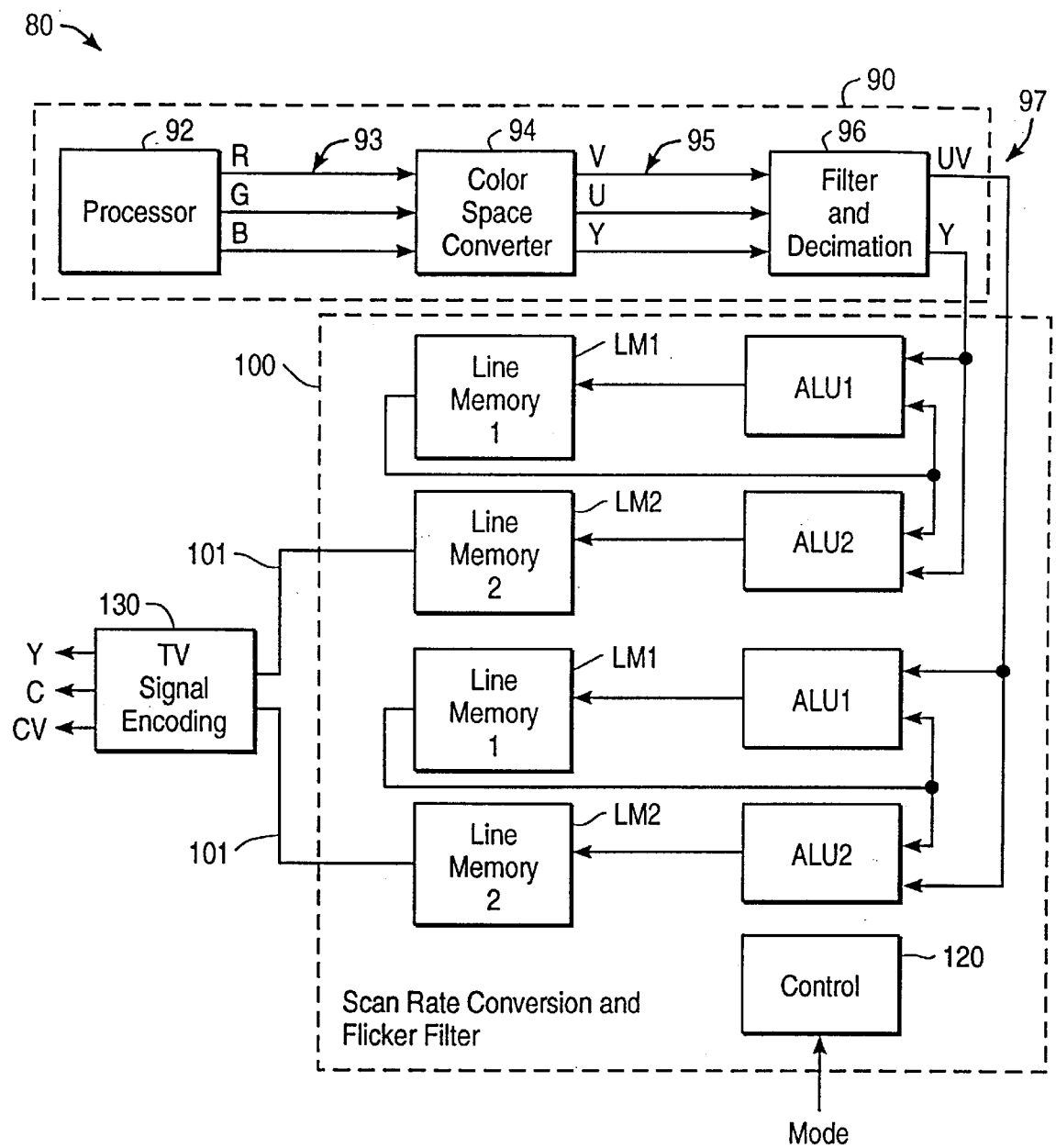
FIG. 11 is a block diagram of a system for converting a computer graphics image into a scaled television image in accordance with the present invention.

Referring to FIG. 11, there is shown a block diagram of a system 80 for converting a computer graphics image into a scaled television image in accordance with the present invention. A graphics processor 92 included within a VGA controller 90 first generates an image 93. The image 93 has a specified number of lines per frame (GLPF), active lines (GLPFA), pixels per line (GPPL) and active pixels per line (GPPLA). The horizontal frequency (GHF) of the image 93 is determined by the pixel frequency (GPF) divided by the GPPL and the vertical frequency, or frame rate, of the image 93 is determined by the horizontal frequency (GHF) divided by the GLPF. The pixel frequency GPF is the frequency of the pixel clock, referred to herein as PClk.

A color space converter 94 transforms the RGB representation of the image 93 to the YUV domain 95. The YUV domain is preferred for television signals because the color component of the final television signal (which is derived from U and V) has a lower bandwidth than the Y component. Therefore, the data rate of the E and V signals can be reduced and these two signals can share one memory bank.

Figure 15:
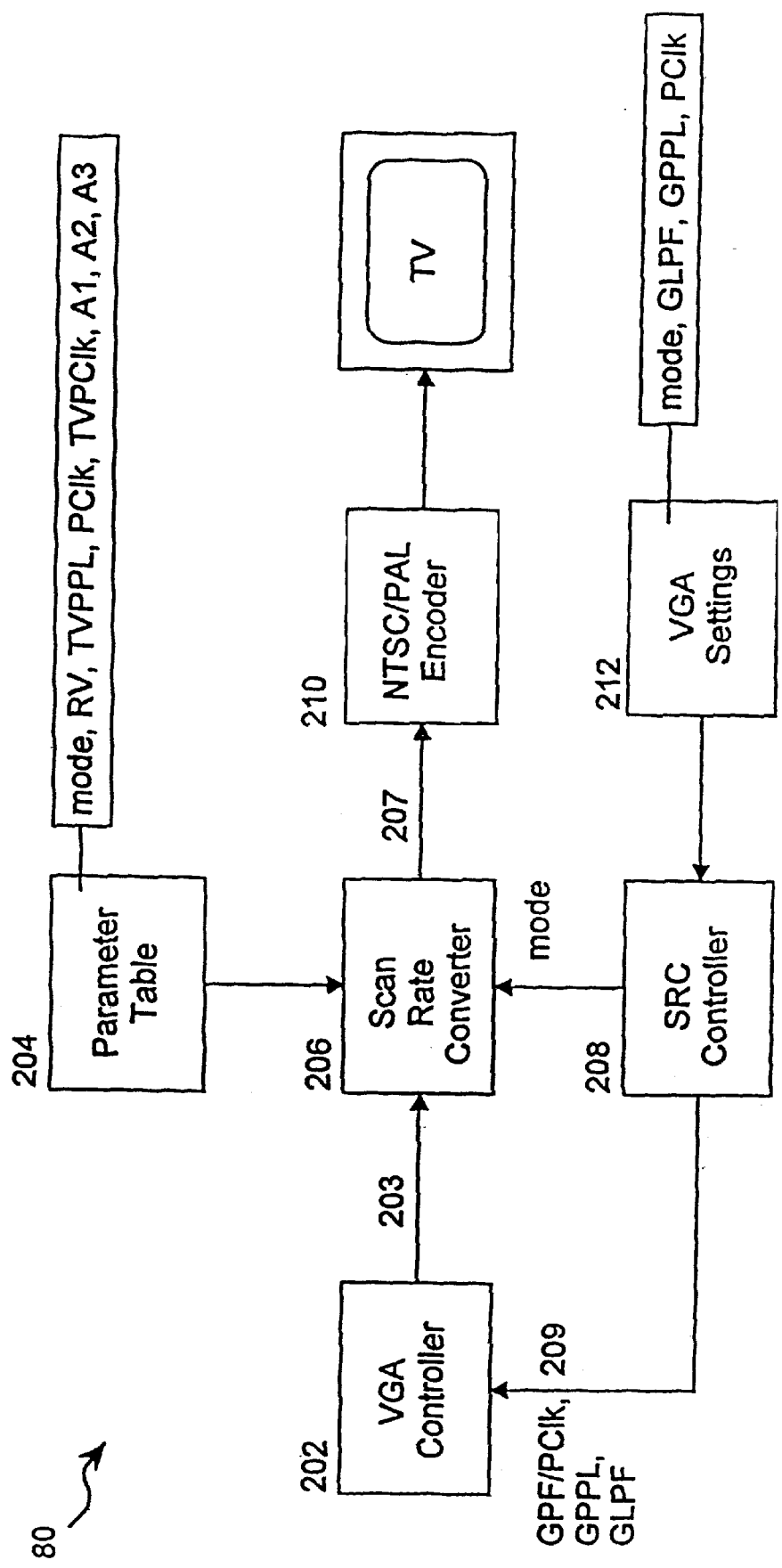
FIG. 15 is a block diagram of a preferred embodiment that determines the signal parameters associated with various operational modes using table lookup techniques.

A filter and decimation block 96 performs data rate reduction and multiplexing on the YUV data 95 output; by the color space converter 94. The block 96 outputs two signals 97X a Y signal and a multiplexed, decimated UV signal. The signals 97 are processed in the scan rate conversion and flicker filter block 1100, which includes two programmable adders ALU1, ALU2 and two line memories LM1, LM2 for each data channel (i.e., for the Y and UV signals). On the preferred embodiment, the line memories LM1, LM2 together store no more than 2*GPPL pixels. For example, all GPPL graphics pixels, or only the GPPLA active graphics pixels, can be stored for each line of video. More generally, the teachings of the present invention are applicable to line memories that store less than one frame of computer video signals. The scan rate conversion (SRC) block 100 also includes a control section 120 that generates addresses for the line memories and sets operational parameters for the SIRC block 100 in accordance with a "mode" supplied by an external SRC Controller (FIG. 15).

Among other things, the mode input to the controller 120 is associated With a scale factor to be applied to the graphics signals 97. Different scale factors, including no (or 1:1) scaling, are implemented to accommodate different combinations of image format and television formats. The various modes are described below in reference to Appendices A and B.

Figure 12:
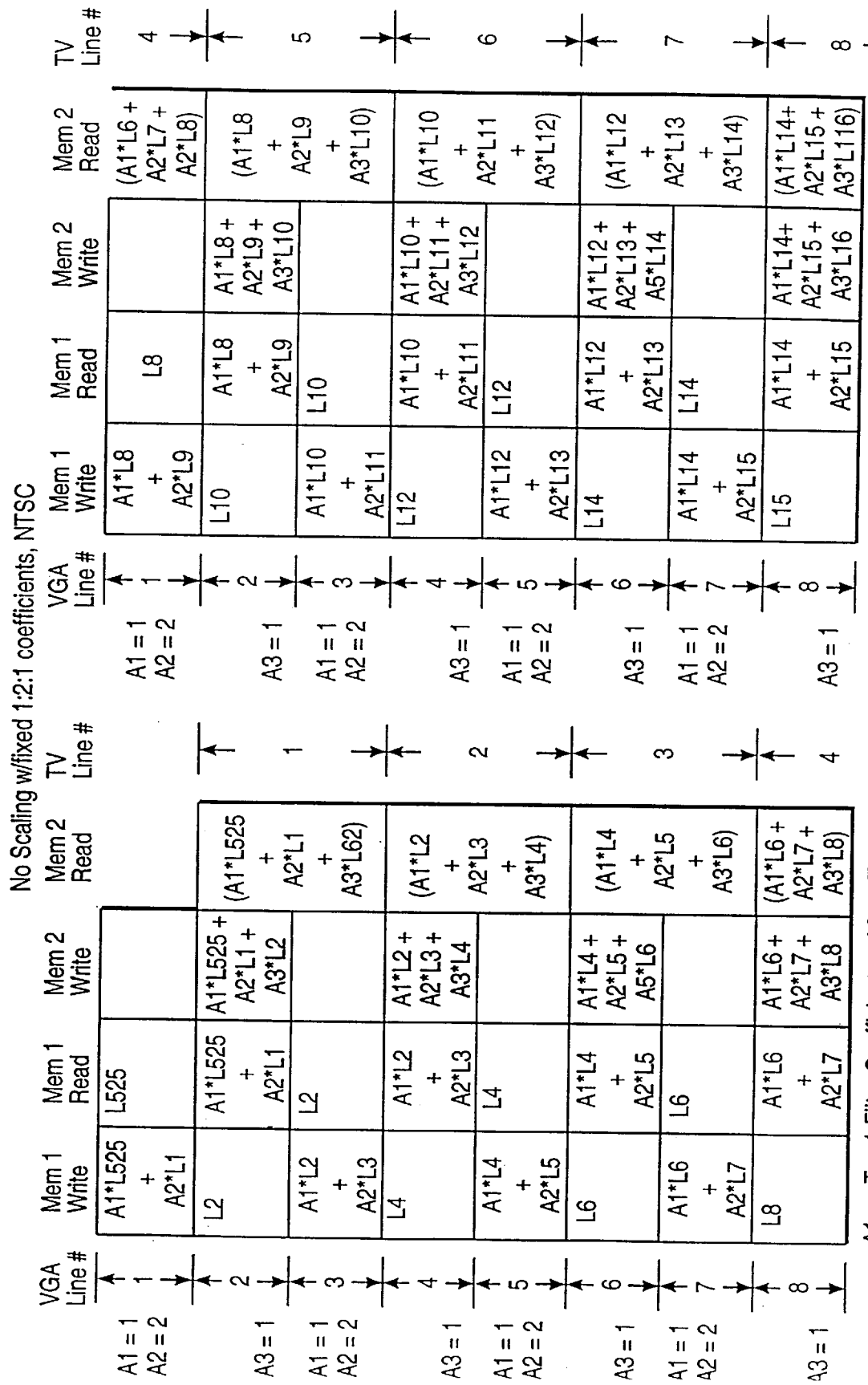
FIG. 12 illustrates the sequence of operations by which the scan rate conversion block of FIG. 111 generates a TV line for every two graphics lines for the no scaling modes.

When no scaling is required, the scan rate conversion block 100 processes every two graphics lines according to a sequence that is illustrated in FIG. 12. This figure shows the values of the filter coefficients (i.e., A1, A2, A3) applied to a set of three graphics lines to generate a corresponding television line. In particular, FIG. 12 is directed to the conversion of a VGA image to a 525 line (NTSC) image without scaling. At least one of the filter coefficients is updated for each incoming graphics line. The values of the filter coefficients updated for a given graphics line are shown to the left of the line number in the 'VGA Line #column. For example, the A3 coefficient is set to "1" for the VGA line 2 and the A1 and A2 coefficients are respectively set to 1 and 2 for the VGA line 3. The television line being generated is shown in the right-hand "TV Line #" column. The LM1 and LM2 and ALU1 and ALU2 operations used to generate a TV line are shown for the relevant set of VGA lines. The sequence of reads, writes and ALU operations used in the scan rate converter block 100 to generate the unscaled TV line 1 is now described in reference to FIG. 12.

When the first line in the two line sequence consisting of the VGA lines 2 and 3 is received by the scan rate conversion block 100, a weighted sum of the two previous lines (i.e., A1*L525+A2*L1) is already stored in the line memory LM1. The VGA line 2 is added in the ALU2, with scale factor A3, to that weighted sum and the resulting sum (A1*L525+A2*L1+A3*L2) is written to the line memory LM2. The first line data (L2) is then stored in the line memory LM1, overwriting the currently stored data. These memory and ALU operations occur at the pixel rate of the graphics processor, indicated in FIG. 12 by the coincidence of the VGA line boundaries with the TMem 1 Write, "Mem 1 Read" and "Mem 2 Write" operations. As the sum (A1*L525+2*Li+A3*L2) is being written to the line memory LM2, the sum is also being read out of the line memory LM2 as the television line 1. However, the line memory LM2 read address pointer is incremented at one half the rate of the line memory LM2 write address pointer, causing the output line to take twice the time of the input line. This is required as a television line has roughly twice the duration of a VGA line. During the second line (i.e., line 3) of the two line sequence, the data from the line memory LM1 (L2) is read, scaled by the factor A1, and added in the ALU1 to the incoming line (L3) scaled by A2. This sum. (A1+L2+A2*L3) is then written back into the line memory LM1 to be used to generate the next television line. This process continues through all the lines of the image.

Figure 13:
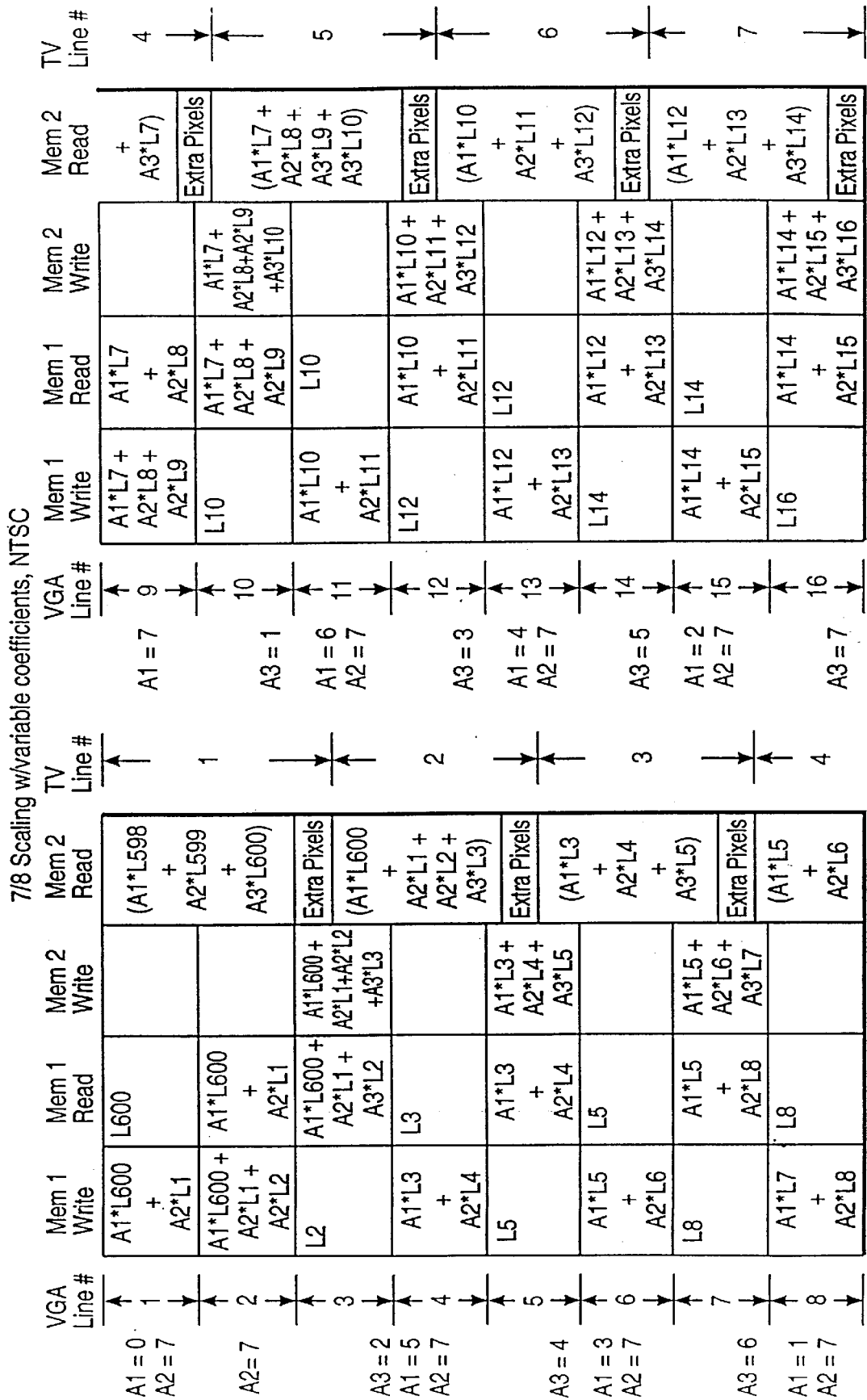
FIG. 13 illustrates the sequence of operations by which the scan rate conversion block of FIG. 11 generates a TV line from three or four graphics lines for the scaling modes.

The operation of the scan rate conversion block when scaling is required repeats a sequence over a number of graphics lines equal to two times the denominator of the scaling ratio. One possible scaling ratio is 7/8 (corresponding to a repetition of the sequence over 16 VGA lines), for which the pattern of memory and ALU operations is illustrated in FIG. 13. The major difference between the non-scaling and scaling modes of operation is that, for scaling modes, alternate lines are not always scaled by the coefficient A2 and combined with the current contents of the line memory LM1. This is due to the fact that in the scaling modes an odd number of television lines is generated from an even number of VGA lines (e.g., 7 TV lines are generated from 16 VGA lines in the 7/8 scaling mode). As a result, all but two of the television lines generated in one period of the repeating sequence are generated from three VGA lines in the manner used for the non-scaling case. The other two television lines are generated from four VGA lines. For example, in the 7/8 scaling operation shown in FIG. 13, the TV lines 1, 3, 4, 6 and 7 are generated in the usual way from three VGA lines. The TV lines 2 and 5 are generated from four VGA lines. In the scaling modes, once the pixels from the VGA lines are used to generate a particular TV line, extra (blank) pixels are output to provide TV lines at the correct horizontal rate.

In the case where the TV line is formed from four VGA lines, two successive incoming lines are scaled and added to the contents of the line memory LM1. Then, during the next line this data (now a combination of three lines) is combined with the incoming line and written to the line memory LM2. For example, TV Line 5 (FIG. 13) is formed from the VGA lines 7, 8, 9 and 10 according to the expression: A1*L7+A2*L8+A2*L9+A3*L10. This allows time for reading data out of the line memory LM2 at a rate slower than one half the write data rate and for inserting extra (blank) pixels into each television line. The combination of these two operations allows the present invention to correct the horizontal rate and process all active graphics lines (GLPFA) in a reduced number of television lines.

Figure 14:
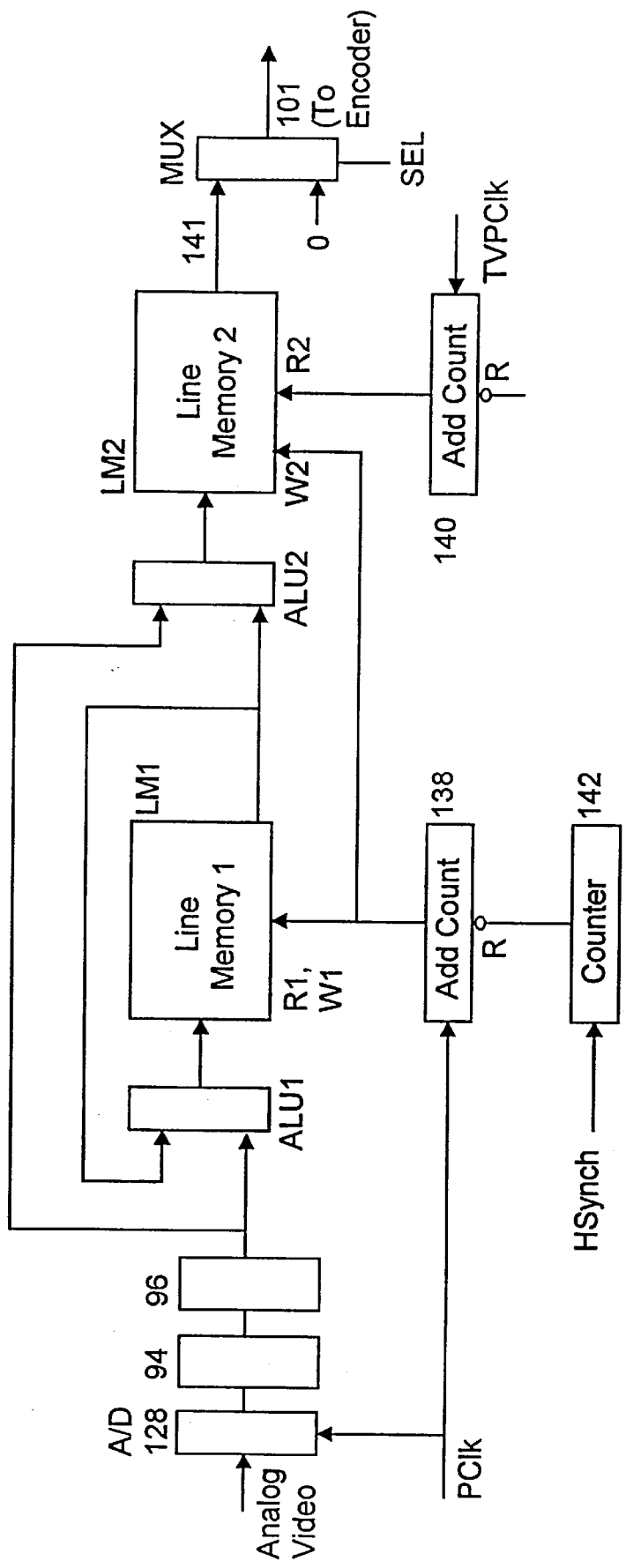
FIG. 14 is a block diagram illustrating additional details of a preferred embodiment of portions of the scan converter circuitry of FIG. 11.

Referring to FIG. 14, there is shown a block diagram illustrating additional details of a preferred embodiment of portions of the scan converter circuitry 100. The circuitry shown in FIG. 14 is duplicated for each of the two data channels (i.e., the Y and the UIV signals). An analog to digital converter (AND) 128 coupled to one of the data channels reads out analog pixel data at a rate (GPF) determined by a pixel clock PClk. The digital data from the A/D 128 is coupled to one input of the ALU1 via the color space conversion block 94 and the filter and decimation block 96 (both described in reference to FIG. 11). The ALU1 output is coupled to the line memory LM1, whose output is, in turn, fed back to the other ALU1 input and to one input of the ALU2. The ALU1 output is stored at an address W1 supplied by the address counter 138, which increments the W1 addresses at the rate of the pixel clock PClk. The address counter also provides an address R1 of data to be read out from line memory LM1. The address R1 is 2–3 pixel clocks ahead of the write address W1 due to the processing delay of the ALU1, which enables each pixel representing a particular location in the video line to be written to the same memory location. The address counter 138 is reset by a horizontal synch signal HSynch, that is asserted at the beginning of each VGA line. The PClk and HSynch signals are generated by the controller 120 (FIG. 11).

The A/D 128 output is also provided to the other input of the ALU2 via the color space conversion block 94 and the filter and decimation block 96. The output of the ALU2 is stored by the line memory LM2 at a write address W2 that is the same as the W1 address provided by the address counter 138. Consequently, the line memory LM1 reads and writes and the line memory LM2 writes all occur at the pixel clock PClk frequency. Active television signal data 101 is output from the line memory LIM2 from an address R2 that is incremented by the address counter 140 at the rate of the television pixel clock TVPClk. The frequency of the TVPClk, referred to herein as the TVPF, is set by first determining the correct values of the TVPPL, GPPL and P/Q clock relationship in order to achieve the correct horizontal underscan. The TVPF is then determined by multiplying the TVPPL value by the TV horizontal frequency (for the desired TV standard) to determine the TVPF. This value is then adjusted so that the number of pixels per line satisfies equation (4), discussed later. The address counter 140 resets itself after the TVPC[]k reaches TVPPL (TV pixels per line setting). The TVPClk is generated by the controller 120.

The active television signal data 141 from the line memory LM2 is coupled to one input of a multiplexer (MUX) whose other input is tied to a "0" input. The MUX is responsive to a select signal (SEL) that selects the active television signal data 141 when the pixel count for the current line has not exceeded GPPL (indicating there are more graphics pixels to be converted) and selects the "0" input whenever the pixel count for the current line is between GPPL and TVPPL. This enables the MUX to generate active television pixels when appropriate and blank television pixels as needed to fill out the current TV line and satisfy the required television horizontal frequency (TVHF). The MUX output 101 is provided to the TV signal encoder 130 (FIG. 11).

The address counters 138 and 140 are synchronous with a period ofl M lines, where M is equal to the number of VGA lines over which the filtering sequence is performed. For example, Mv is equal to 12 for 5/6 scaling and is equal to 16 for 7/8 scaling.

The operations of the ALUs are controlled by signals from the controller 120 that are not shown in FIG. 14. For example, for the first VGA line of a sequence of VGA lines, the ALU2 is caused to combine the output from the A/D converter 128 (after color space conversion and decimation) and the contents of address R1 of the line memory LM1. This weighted sum is then stored at address W2 of the line memory LM2. For the same line, once the line memory LM1 read has been performed, the ALU1 is caused to simply pass VGA line 1 signals to the line memory LM1 to be stored at the W1 address, where they overwrite pixel data from the previous line. For the second VGA line of a sequence, the ALU1 is caused to combine the contents of the line memory LM1 at the new pixel address R1 with the current weighted output from the A/D 128 (after color space conversion and decimation). The new sum is then written to address W1 in the line memory LM1. No ALU2 or line memory LM2 write operations are performed for the second line of the sequence. This enables the contents of the line memory LM2 to be read out at the slower rate defined by the TVClk.

Referring again to FIG. 11, the output 101 of the scan conversion and flicker filtering block 100 is applied to the TV Signal Encoding block 130. This block filters the inputs, modulates the U and V components and generates the Y, C and CV (composite video) outputs required by a television.

The preferred embodiment supports many different computer graphics and television formats. For example, the preferred embodiment can generate PAL or NTSC television signals from VGA images with 640×480 or 800×600 pixel resolutions. To accommodate the different combinations of formats and different desired television image sizes, the preferred embodiment provides a wide-range of scaling factors, including 1:1 (no scaling), 7:8, 5:6 and 3:4. Each different supported combination of scaling factor, television format (output) and computer graphics format (input) is defined as a selectable user mode. Once a user selects a mode of operation, the preferred embodiment determines parameters of the VGA and television signals consistent with that mode. This parameter determination can be performed in the scan rate conversion block 100 by table lookup or by direct calculation.

Referring to Appendices A and B, there are shown two tables that list some of the VGA and television signal characteristics associated with operational modes supported in various preferred embodiments of the present invention. These signal characteristics include: the number of VGA lines per frame (GLPF); the number of VGA pixels per line (GPPL); the VGA horizontal frequency (GHF); the VGA pixel frequency (GPF); the A/D clock frequency (PClk); the D/A clock frequency (TVPClk); the number of television lines per frame (TVLPF), the number of TV pixels per TV line (TVPPL); over/underscan percentage of the resulting scaled image when displayed on a television monitor (overscan is positive, underscan is negative); and aspect ratio of the final image (expressed as a horizontal/vertical ratio). Appendix A is directed to a set of six modes (0-3, 5-6) that are implemented in the Chrontel model CH7002 VGA to NTSC scaling scan rate converter. Appendix B is directed to a hypothetical set of modes that could be supported in an alternative preferred embodiment. The possible settings are not limited to those illustrated in either Appendix A or B.

How these modes are implemented is now described in reference to FIG. 15, which shows a preferred embodiment that determines the various signal parameters using table lookup techniques.

Referring to FIG. 15, the VGA controller 202 outputs video signals 203 representing an image to be scan-rate converted and scaled. Characteristics of the signals 203 are set by the VGA controller 202 in response to control inputs 209 from art external scan-rate converter (SRC) controller 208. These control inputs 209, which the SRC controller 208 establishes depending on the selected mode, include at least the number of lines per frame (GLPF), pixels per line (GPPL) and pixel clock rate (Pclk) (or graphics pixel frequency GPF) to be used to generate the video signals 203. A group of these parameters is stored for each supported mode in a VGA settings table 212 that can be accessed by the SRC controller 208. Given these parameters, the VGA Controller can determine other graphics parameters, such as the horizontal frequency (GHF) and frame rate (GFR). An example of the VGA settings table 212 is provided in Table 1, below.

TABLE 1

VGA Settings Table

| Mode | Graphics Lines per Frame (GLPF) | Graphics Pixels per Line (GPPL) | Pixel Clock (MHz) (PClk) |
|---|---|---|---|
| 0 | 750 | 944 | 35.400 |
| 1 & 4 | 625 | 800 | 25.000 |
| 2 | 525 | 800 | 25.1748 |
| 3 | 600 | 784 | 28.1958 |
| 5 | 625 | 944 | 29.506 |
| 6 | 700 | 1040 | 43.6364 |

In addition to setting the VGA controller parameters, the SRC controller 208 passes the selected mode to the scan rate converter 206. The scan rate converter 206 determines the television signal parameters by performing a lookup into the parameter table 224, which stores basic television signal parameters required for each mode. The basic parameters include: scaling routine periodic rate (the number of VGA lines over which the scaling routine is repeated), also called the repeat value (RV); total pixels per television line (TVPPL); line memories LM1 and LM2 write clock and line memory LM1 read clock (PClk); line memory LM2 read clock (TVPClk); and values for the flicker coefficients: A1; A2 and A3.

An exemplary parameter table 204 is shown in Table 2. The modes shown in Tables 1 and 2 are the same. This enables the necessary coordination between the VGA controller 202 and the scan rate converter 208.

TABLE 2

Parameter Table

| Mode | 0 | 1 | 2 & 4 | 3 | 5 | 6 |
|---|---|---|---|---|---|---|
| RV | 12 | 2 | 2 | 16 | 2 | 8 |
| TVPPL | 1920 | 1800 | 1600 | 1792 | 1600 | 1600 |
| LM1, LM2 WClk; LM1 RClk | 800 × GHF | 800 × GHF | 800 × GHF | 784 × GHF | 800 × GHF | 800 × GHF |
| LM2 RClk | 800 × GHF | (⅞)800 × GHF | 800 × GHF | 784 × GHF | 800 × GHF | (¾) 800 × GHF |
| A1 Values | 0, 2, 1, 4, 2 | ⅓ or ¼ & ⅕ | ⅓ or ¼ or ⅕ | 0, 5, 3, 1, 6, 4, 2 | ⅓ or ¼ or ⅕ | 0, 1, 2, |
| A2 Values | [5, 5], 5, [5, 5], 5, 5 | ⅓ or ⅔ or ⅗ | ⅓ or ⅔ or ⅗ | [7, 7], 7, 7, [7, 7], 7, 7, 7 | ⅓ or ⅔ or ⅗ | [3, 3], [3, 3], 3 |
| A3 Values | 2, 4, 1, 3, 5 | ⅓ or ¼ or ⅕ | ⅓ or ¼ or ⅕ | 2, 4, 6, 1, 3, 5, 7 | ⅓ or ¼ or 1/5 | 2, 1, 3 |

For the 1:1 scaling modes (i.e., modes 1, 2, 4 and 5) shown in Table 2, the user can select from three sets of filter coefficients: (1/3, 1/3, 1/3), (1/4, 1/2, 1/4), or (1/5, 3/5, 1/5). For the other modes, where scaling a performed, note that the number of filter coefficient values shown is not the same as the number of VGA lines over which the filter sequence is performed. This is because respective filter coefficients are not adjusted for each VGA line. For example, referring to FIG. 13, which corresponds to mode 3 (7/8 scaling, 640×480 input image, NTSC output), the A1 coefficient is updated only for VGA lines 1, 4, 6, 8, 10,13 and 15. Consequently, Table 2 shows seven A1 coefficient values, corresponding to the aforementioned VGA lines. Similarly, Table 2 shows 9 values for the A2 coefficient, corresponding to the 9 times the A2 coefficient is set by the preferred embodiment in the 16 VGA lines used to generate the 7 television lines in mode 3 operations. The bracketed filter coefficients in Table 2 designate occurrences in which two consecutive VGA lines are scaled by the coefficient A2 and averaged with the line memory LM1 contents.

Having described the architecture of a preferred embodiment, the method by which the video and television parameters associated with a particular operational mode are determined is now described.

Equations relating input and output signals

In the preferred embodiment, the television signal clock (TVClk) rate is not decoupled from the graphics signal (PClk) clock rate. This is what enables the present invention to avoid the frame buffer required by the prior art. However, this coupling between the TVClk and the PClk dictates a need for a set of methods/guidelines to determine graphics signal parameters (i.e., GLPF, GPPL, PClk) and scaling factors that enable systems implemented in accordance with the present invention to convert computer graphics signals to scaled television signals on-the-fly.

The first issue to be resolved when determining the signal parameters is the scale factor (K) to be used. The scale factor K can be represented as by the ratio M/N, where M and N are integers corresponding, respectively, to the MV television lines to which the present invention must scale 2*N graphics lines.

For example, in mode 3, the scan rate converter converts 16 VGA lines into 7 television lines. Alternatively, designating the number of television lines per frame as TVLPF (which can be 525 for NTSC and 625 for PAL), the number of graphics lines per frame (GLPF) can be represented as: GLP=TVLPF/K, where GLPF is an integer. Given that TVLPF and GLPF are integers, it must be the case that equation 1, shown below, must produce an integer.

$$\frac{TVLPF}{K} = TVLPF \times \frac{N}{M} \qquad \text{Eq. (1)}$$

Typically, 4/5<=N/M<2. The N/M ratios of less than 1 (e.g., 4/5) scale the picture to a slightly larger image instead of the normal, slightly smaller image. This capability is provided for modes like 640×480 and 512×384 displayed on a PAL TV. Since, by default, such images are already significantly underscanned (480 or 384 lines where PAL has 575 active lines) it is possible to scale up these images while still allowing them to fit on a TV screen, giving the user a larger image size. Given the range of NIM ratios, the relationship shown in equation 2 must also produce an integer.

$$\frac{TVLPF}{M} = \text{integer} \qquad \text{Eq. (2)}$$

Thus, because 525 is divisible by 3, 5, and 7, the scale factors K of 3/4, 5/6 and 7/8's are possible for NTSC television monitors (recall that NITSC uses 525 television lines). Other scale factors, such as 15/16 and 21/30 etc., are also possible but provide either too much or too little scaling.

Because 625 is only divisible by 5 it appears that K=5/6 is the only possible scale factor for PAL television monitors. However, other scale factors K can be implemented by changing the total number of television lines to something other than 625. For instance, 7/8's scaling can be used to produce a television signal of 623 lines (712 graphics lines). Televisions supporting PAL signals will be able to lock to this number of lines and, as long as the number of television lines remains an odd number, the interlace of the television will be maintained.

Having determined the scale factor, the graphics horizontal frequency (GHF) can be determined according to equation 3.

$$GHF = \frac{(2 \times TVHF)}{K} \qquad \text{Eq. (3)}$$

In this equation, TVHF designates the horizontal frequency of the television signal, the factor of two comes from the non-interlaced nature of the graphics signal and the division by the scale factor K corresponds to need to speed up the graphics signal so that the total number of active graphics lines will occur in a shorter period of time, covering fewer television lines.

Having determined the GHF, the number of graphics pixels per line (GPPL), and television pixels per line (TVlPPL) can be determined as follows.

On the present invention data is read out of memory at a rate that is one half of the rate it was written into memory (GPF) times a PIQ ratio, which can be 1, 9/8 or 3/4. The preferred embodiments interpolate the data to twice this rate when sending it to the encoder block 130 (FIG. 11). Therefore, the TVPF=GPF(1/2)(P/Q)2=GPF(P/Q). All of the following equations showing the relationships between basic quantities have been written assuming this interpolation is taking place. However, the system being described will still work if the interpolation is not done, in which case all TVPPL and TVPF values would be just cut in half. The motivation for interpolating by a factor of two before going to the encoder block is to minimize the sin(X)/X effect of passing data through a D/A converter after all processing.

In systems where a single phase locked loop (PLL) is employed to generate the television signals, P/Q is 1; therefore data is read from the line memory LM2 at exactly one half the rate it is written into it. In such systems, the number of television pixels per line (TVPPL) times the number of television lines per frame (TVLPF) must equal the number of graphics pixels per line (GPPL) times the number of graphics lines (GLPF) (i.e., the GPF equals the TVPF).

Since the number of lines for both graphics and television have already been established, GPPL and TVPPL can be determined according to either equation 4 or equation 5. The factor of 2 in equations 4 and 5 and equations 8 and 9 (below) is required because, in the described embodiment, there are two graphics frames for every TV frame. This factor could differ for different embodiments.

$$\frac{TVPPL \times TVLPF}{2 \times GLPF} = \text{integer} = GPPL \qquad \text{Eq. (4)}$$

$$\frac{2 \times GPPL \times GLPF}{TVLPF} = \text{integer} = TVPPL \qquad \text{Eq. (5)}$$

Any values of graphics pixels per line (GPPL) and television pixels per line (TVPPL) that satisfy these equations can be used. However, for many graphics processors the number of graphics pixels per line (GPPL) must be a multiple of eight. Additionally, the total number of graphics pixels per line (GPPL) should be chosen such that the percentage of underscan achieved in the horizontal direction matches the percentage of underscan in the vertical direction.

For example, where the number of television nominal active lines per frame is designated as TVNLPFA (which equals 480 for NTSC and 575 for PAL), the vertical underscan (VU) of the television image can be determined according to equation 6.

$$VU = \frac{GLPFA \times K - TVNLPFA}{TVNLPFA} \times 100 \qquad \text{Eq. (6)}$$

Designating the television nominal horizontal active time as TVNHAT, then the horizontal underscan (HU) of the television image can be determined according to equation 7.

$$HU = \frac{\frac{2 \times GPPLA}{GPPL \times GHF} - TVNHAT}{TVNHAT} \times 100 \qquad \text{Eq. (7)}$$

Therefore, for a given mode, the total number of graphics pixels per line (GPPL) should be chosen in order to match HU and VU and satisfy equation 4. The graphics pixel frequency (PCIk) can then be determined by multiplying the graphics horizontal frequency (GHF) by the graphics pixels per line (GPPL) as in equation 7.

In systems where a dual PLL is employed, and data is read from the line memory LM2 at some frequency other than one half the rate it is written into it (i.e., the GPF is different from the TVPF), the following relationship must hold true. In this-case, assume that the line memory LM2 read frequency is 1/2* (P/Q) times the line memory LM2 write frequency, where P and Q are defined to be the ratio of the frequencies of the two PLL's used in a dual PLL system. The ratio P/Q is proportional to the ratio TVPPL/GPPL. An alternative way of defining P and Q is that the LM2 read clock is P/2 times the graphics horizontal rate (GHF), whereas the LM1 read and write clocks and the LM2 write clock are Q times the GHF.

Consequently, the number of television pixels (TVPPL) times television lines (TVLPF) must equal (P/Q) times the number of graphics pixels (GPPL) times the number of graphics lines (GLPF). The proper selection of these two frequencies can aid in maintaining proper aspect ratio. Assuming the number of lines for both graphics and television are known, GPPL and TVPPL can be determined according to either equation 8 or equation 9.

$$\frac{TVPPL \times TVLPF}{2 \times (P/Q) \times GLPF} = \text{integer} = GPPL \qquad \text{Eq. (8)}$$

$$\frac{2 \times (P/Q) \times GPPL \times GLPF}{TVLPF} = \text{integer} = TVPPL \qquad \text{Eq. (9)}$$

The vertical underscan for the dual PLL case is again determined according to equation 6 and the horizontal underscan is determined according to equation 10, below.

$$HU = \frac{\frac{2 \times GPPLA}{(P/Q) \times GPPL \times GHF} - TVNHAT}{TVNHAT} \times 100 \qquad \text{Eq. (10)}$$

Examples of the VGA and television parameters computed according to these guidelines are shown in Appendices A and B. Using these equations, many other modes can be devised with different scaling factors and VGA and television signal characteristics.

In summary the present invention provides the following advantages over the prior art scan rate conversion systems:

scaling of VGA image in horizontal and vertical directions making entire image visible on a television monitor without the use of a frame buffer;

scaling filter with variable filter coefficients implements both flicker filter and scaling artifact reduction;

reduced memory requirement through manipulation of incoming graphics signal, and unique scan conversion memory control (i.e., no more than two line memories per video component);

scaled image maintains vertical frequency of source image, corrects horizontal frequency to television standard;

a set of equations determining the graphics processor output signal have been developed. These equations are critical for proper scaling of graphical images to television images;

maintenance of correct aspect ratio of image through proper choice of memory read clock and total graphics pixels per line; and variable image size achievable through selection of scaling ratio (7/8's, 5/6's, 3/4's).

Alternative Embodiments

Figure 16:
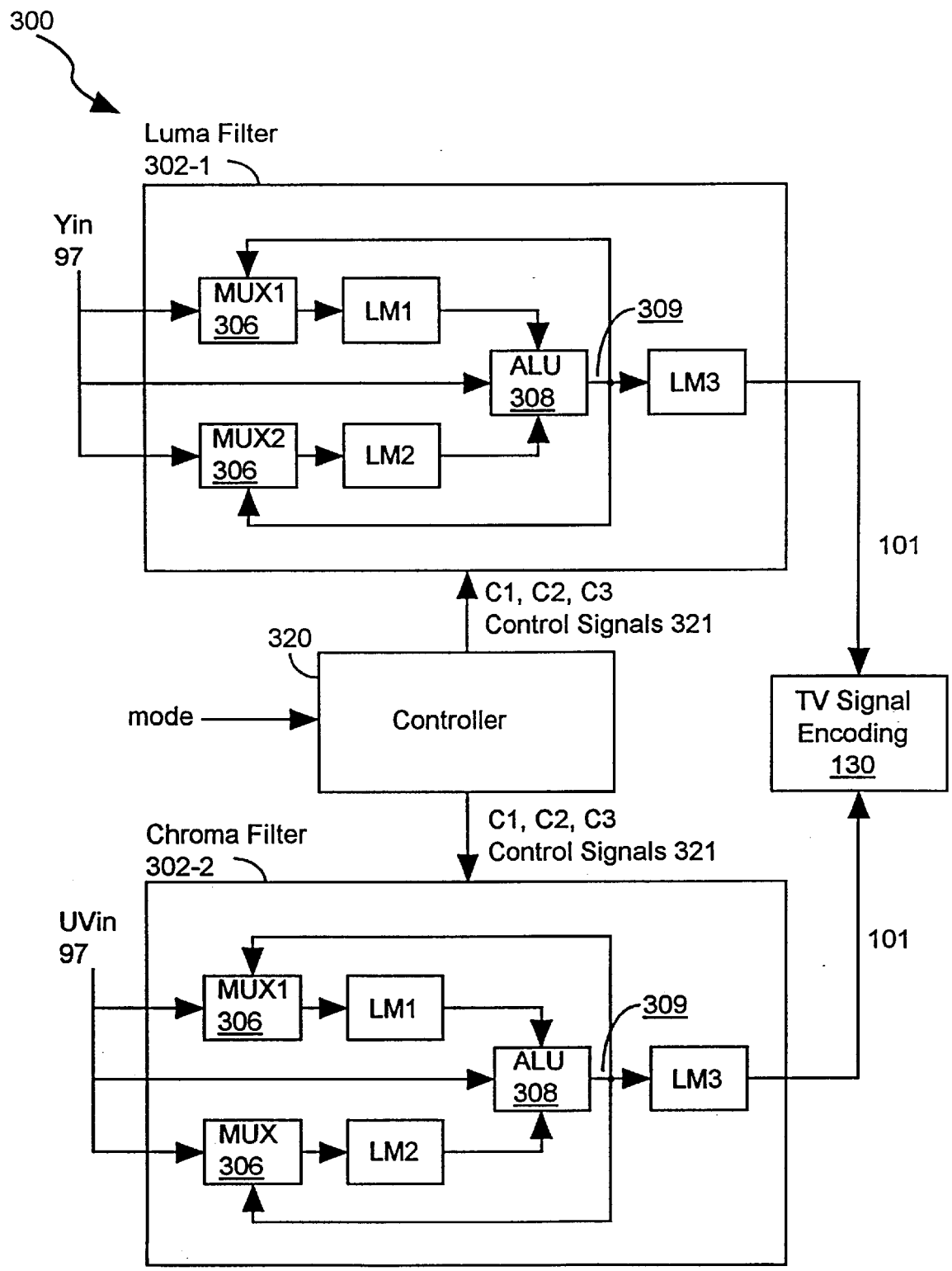
FIG. 16 is a block diagram of portions of a system 300 for converting a computer graphics image into a scaled television image that employs identical filters with three line memories for both luma (Y) and chroma (UV) video components.

Referring to FIG. 16, there is shown a block diagram of an alternative embodiment 300 of a scan rate conversion and flicker filter. This alternative embodiment performs the same functions and operates according to the same principles as the scan rate conversion and flicker filter 1100 of FIG. 11. However, the embodiment 300 can implement additional conversion/scaling modes.

The embodiment 300 includes a controller 320 and identical filter blocks 302-1, 302-2 that operate respectively on the luma (Y) and chroma (UV) signals 97 generated by the decimation block 96 (FIG. 111). Each filter block 302 includes one programmable arithmetic logic unit (ALU) 308, three line memories LM1, LM2, LM3 and two multiplexers 306 (sometimes referred to herein as "MUXes"). In the preferred embodiment, the line memories LM1, LM2, LM3 together store no more than 3*GPPL pixels. For example, all GPPL graphics pixels, or only the GPPLA active graphics pixels, can be stored for each line of video. The filter blocks 302 convert the graphics signals 97 to TV signals 101, which are processed by the TV signal encoding block 130 as described in reference to FIG. 11. The line memories LM1 and LM2 are functionally equivalent; that is, any operation of the embodiment 300 using either or both of the memories LM1 and LM2 can be performed using the memories LM2 and LM1 in a mirror-symmetrical manner. For example, a two cycle sequence wherein a new Yin value is written into the memory LM1 and an output from the ALU 308 is written to the memory LM2 can also be performed by writing the new Yin value to the memory LM2 and the ALU output to the memory LM1. The illustrated embodiment takes advantage of this symmetry by employing the memories LM1, LM2 interchangeably.

The controller 320 generates a set of filter coefficients C1, C2, C3 and control signals 321, including addresses for the line memories and operational parameters for the filter blocks 302, in accordance with a "mode" supplied externally (e.g., by the SRC controller 208 of FIG. 15). Among other things, the mode input to the controller 320 is associated with a scale factor to be applied to the graphics signals 97. Different scale factors, including no (or 1:1) scaling, are implemented to accommodate different combinations of image format and television formats.

The graphics signal 97 (e.g., Yin or UVin) is coupled to the MUXes 306 and the ALU 308. The other input of the MUXes 306 is coupled to the output 309 of the ALU 308. The output of each MUX 306 is coupled to the input of a respective line memory, the output of which is coupled to a respective input of the ALU 308. In addition to providing one input to the MUXes 306 the ALU output 309 is coupled to the input of the line memory LM3, the output of which provides the TV signals 1101 coupled to the TV signal encoder 130.

The filter block components operate conventionally. That is, a MUX 306 outputs whichever of its inputs is selected by a respective multiplexer control signal provided in the control signals 321. Each line memory stores its input upon the assertion of a write enable signal provided in the control signals 321. The contents of a line memory can be read at any time. The ALU 308 is configured to compute the sum of products C1×LM1+C2×LM2+C3×VGAin, where C1, C2 and C3 are the coefficients output by the controller 320, LM1 and LM2 represent the outputs of the memories LM1 and LM2 and VGAin is the graphics input 97. The coefficients C1, C2, and C3 can be zero or nonzero, which allows the ALU to generate a wide range of combinations of 7; coefficients and graphics signals. In fact, by varying the coefficients C1, C2, C3 and the other control signals 321 it is possible for the embodiment 300 to generate a single television line from three, four or five graphics lines. How the embodiment 300 generates one television line from three or four graphics lines is now described in reference to FIG. 17.

Referring to FIG. 17, there is shown a sequence of operations by which the SRC block 300 converts three or four graphics lines to a single television line. This particular sequence of operations repeats for every eight VGA lines/ five TV Dines and is associated with 5/4 scaling mode. FIG. 17 is similar in format to FIGS. 12 and 13; however, unlike those FIGS, scaling coefficients applied to the input graphics signals are not shown. As mentioned above, the outputs of the line memories LM1 and LM2 and the input graphics signal 97 can respectively be weighted by the variable coefficients C1, C2, C3. These coefficients can be generated by an external program or through an integrated Hookup process, which is shown in the alternative embodiment of FIG. 22.

Preferred values of the coefficients used for each of the eight cycles in the 3/4 scaling example of FIG. 17 are shown in Table 3. Note that, in the preferred embodiment, for each VGA line the value of each coefficient C1, C2, C3 can be selected from two values. The first value (FF0) is used to perform flicker filtering similar to that implemented in the embodiment of FIG. 11. The second value (FF1) is used to implement a four-line flicker filter. This table is only exemplary; the present invention is operable with any set of coefficients C1, C2, C3.

TABLE 3

| | Coefficient Values for ⅗'s Scaling Mode | | | | | |
|---|---|---|---|---|---|---|
| VGA Line | C1 FF0 | C1 FF1 | C2 FF0 | C2 FF1 | C3 FF0 | C3 FF1 |
| 1 | 0 | 0 | 0 | 0 | 16 | 0 |
| 2 | 6 | 8 | 10 | 5 | 0 | 3 |
| 3 | 4 | 2 | 10 | 7 | 2 | 6 |
| 4 | 0 | 0 | 16 | 16 | 0 | 1 |
| 5 | 8 | 4 | 8 | 8 | 0 | 4 |
| 6 | 10 | 6 | 2 | 1 | 4 | 7 |
| 7 | 16 | 16 | 0 | 0 | 0 | 2 |
| 8 | 10 | 8 | 6 | 3 | 0 | 5 |

The sequence of reads, writes and ALU operations used in the SRC block 300 to generate the scaled TV line 2 from the VGA lines 8, 1 and 2 is now described in reference to FIG. 17. During the first cycle of this sequence VGA line 8 from the previous set of lines is received and stored in the memory LM2. During the second cycle VGA line 1 is received and stored in the memory LM1 and a weighted sum of the three previous lines (i.e., f(L6+L7+L8)) is read out of the memory LM3 to form TV line 1. Note that the read out of memory LM3 starts during this second cycle VGA line, but does not complete since TV data is read out more slowly that it is written in. During the next cycle VGA line 2 is received, VGA line 8 is read out of the memory LM2, VGA line 1 is read out of the memory LMI and VGA line 2 is stored in the memory LM2. The ALU 308 then multiplies the readout VGA lines 8 and 1 and the newly received VGA line 2 by the coefficients C1, C2 and C3, respectively and writes the sum f(L8+L1+L2) into the memory LM3.

The sum f(L8+L1+L2) is then read out of the memory LM3 at the TV pixel frequency to form TV line 2. This sequence, or alternatives where the order of writing into the memories LM1 and LM2 is varied, is performed anytime a single TV line is generated from three VGA lines.

The alternative sequences can be derived from the principle that VGA lines used to generate more than one TV line must be maintained in storage as long as needed. For example, VGA line 3 is stored in the memory LM1 instead of the memory LM2 so as to not overwrite VGA line 4, which is still needed to generate subsequent TV lines (VGA line 4 is used to generate TV lines 3, 4 and 5).

FIG. 17 also shows how the SRC block 300 generates a single TV line from four VGA lines. For example, consider the sequence where the present TV line 3 is generated from VGA lines 1–4. During the first cycle of this sequence VGA line 1 is received and stored in the memory LM1. During the next cycle VGA line 2 is received and stored in the memory LM2 and VGA line 1 is read out of the memory LM1. During the next cycle VGA line 3 is received, VGA line 1 is read out of the memory LM1, VGA line 2 is read out of the memory LM2 and VGA line 3 is stored in the memory LM1. The ALU 308 then multiplies the readout VGA lines I and 2 and the newly received VGA line 3 by the coefficients C1, C2 and C3, respectively, and writes the sum f(L1+L2+L3) into the memory LM2. During the next cycle, VGA line 4 is received, the sum f(L1+L2+L3) is read out of the memory LM2 and VGA line 4 is stored in the memory LM2. The ALU 308 then multiplies the readout sum f(L1+L2+L3) and the newly received VGA line 4 by the coefficients C2 and C3, respectively, and writes the sum f(L1+L2+L3+L4) into the memory LM3. The sum f(L1+L2+L3+L4) is then read out of the memory LM3 at the TV pixel frequency to form TV line 3. This sequence, or alternatives where the order of writing into the memories LM1 and LM2 is varied, is performed anytime a single TV line is generated from four VGA lines. The alternative sequences can be derived as described above.

Referring to FIG. 18, there is shown another sequence of operations by which the SRC block 300 converts three or four graphics lines to a single television line. This particular sequence of operations repeats for every twelve VGA lines/five TV lines and is associated with 5/6 scaling mode. FIG. 18 is similar in format to FIG. 17; consequently, no description of FIG. 18 is provided herein. Differences between FIG. 17 and 18 are due to the different combinations of VGA lines needed to generate five TV lines from eight as opposed to twelve VGA lines. Preferred values of the coefficients C0, C2, C3 for the twelve steps of FIG. 18 are shown in Table 4.

TABLE 4

Coefficient Values for 5/6's Scaling Mode

| VGA | C1 | | C2 | | C3 | |
|---|---|---|---|---|---|---|
| Line | FF0 | FF1 | FF0 | FF1 | FF0 | FF1 |
| 1 | 0 | 0 | 0 | 0 | 0 | 0 |
| 2 | 10 | 9 | 8 | 4 | 6 | 8 |
| 3 | 10 | 10 | 0 | 0 | 0 | 15 |
| 4 | 10 | 7 | 4 | 2 | 0 | 1 |
| 5 | 10 | 10 | 0 | 0 | 0 | 25 |
| 6 | 0 | 0 | 0 | 0 | 0 | 0 |
| 7 | 10 | 5 | 10 | 10 | 4 | 7 |
| 8 | 0 | 0 | 10 | 10 | 0 | 10 |
| 9 | 6 | 3 | 10 | 8 | 8 | 9 |
| 10 | 0 | 0 | 10 | 10 | 0 | 20 |
| 11 | 2 | 0 | 10 | 6 | 10 | 12 |
| 12 | 0 | 0 | 16 | 8 | 10 | 30 |

Figure 19:
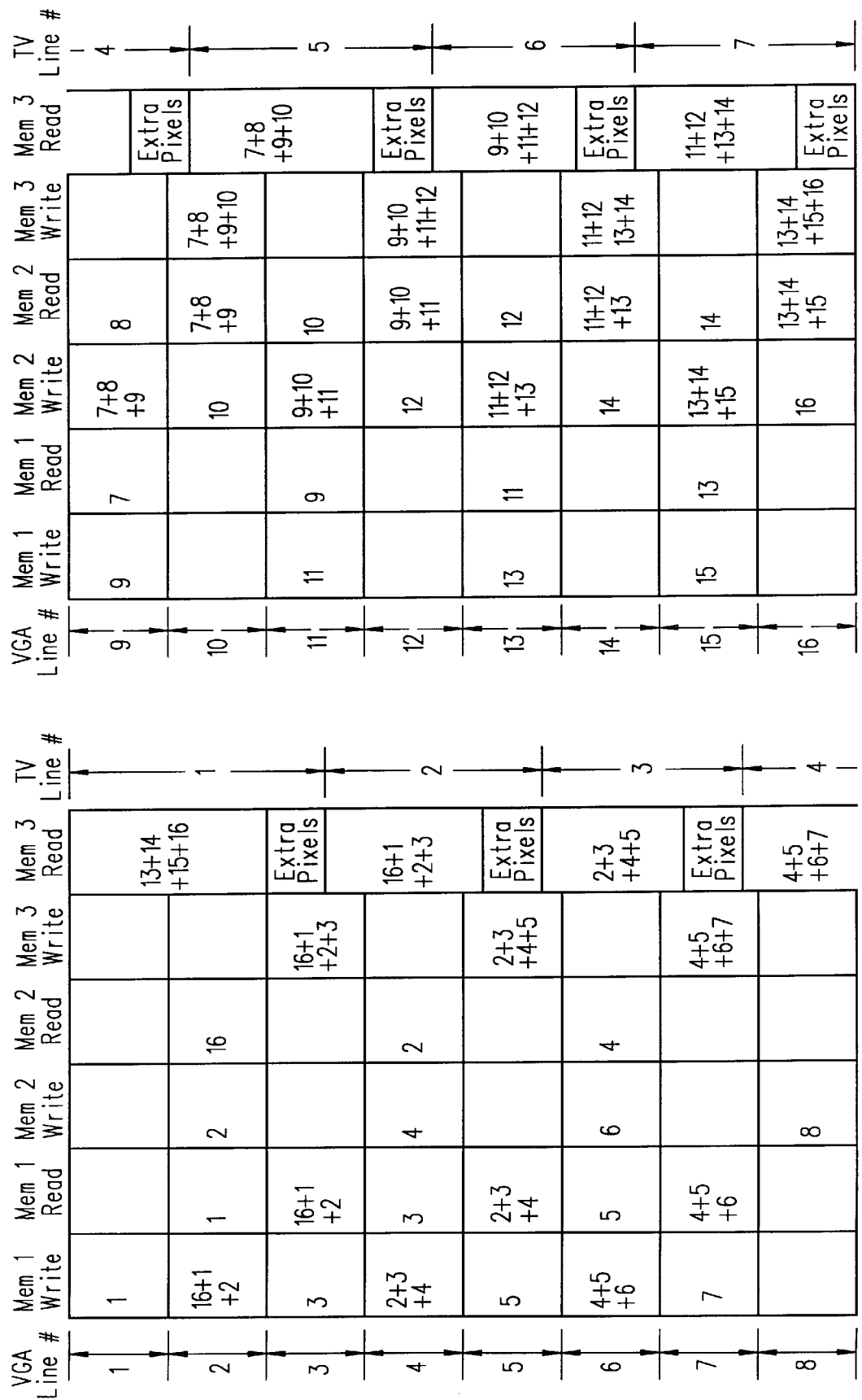
FIG. 19 illustrates the sequence of operations by which the scan rate conversion blocks 302 of FIG. 16 generate a TV line from four graphics lines for the 7/8 scaling mode.

Referring to FIG. 19, there is shown a sequence of operations by which the SRC block 300 converts four graphics lines to a single television line for all television lines. This particular sequence of operations repeats for every simeen VGA lines/seven TV lines and is associated with 7/8 scaling mode. FIG. 19 is similar in format to FIG. 17; consequently, no description of FIG. 19 is provided herein. Note that the sequence of operations repeats for every other VGA line. This uniformity is possible because every TV line is generated from four VGA lines. Preferred values of the coefficients C1, C2, C3 for the sixteen steps of FIG. 19 are shown in Table 5.

TABLE 5

Coefficient Values for 7/8's Scaling Mode (Gain = 16)

| VGA | Coef 1 | | Coef 2 | | Coef 3 | |
|---|---|---|---|---|---|---|
| Line | FF0 | FF1 | FF0 | FF1 | FF0 | FF1 |
| 1 | 0 | 0 | 0 | 0 | 0 | 0 |
| 2 | 14 | 13 | 12 | 6 | 6 | 10 |
| 3 | 8 | 8 | 0 | 0 | 0 | 12 |
| 4 | 14 | 11 | 8 | 4 | 10 | 12 |
| 5 | 8 | 8 | 0 | 0 | 0 | 20 |
| 6 | 14 | 9 | 4 | 2 | 14 | 14 |
| 7 | 8 | 8 | 0 | 0 | 0 | 28 |
| 8 | 0 | 0 | 0 | 0 | 0 | 0 |
| 9 | 14 | 7 | 14 | 14 | 4 | 9 |
| 10 | 0 | 0 | 8 | 8 | 0 | 8 |
| 11 | 10 | 5 | 14 | 12 | 8 | 11 |
| 12 | 0 | 0 | 8 | 8 | 0 | 16 |
| 13 | 6 | 3 | 14 | 10 | 12 | 13 |
| 14 | 0 | 0 | 8 | 8 | 0 | 24 |
| 15 | 2 | 0 | 14 | 8 | 14 | 16 |
| 16 | 0 | 0 | 8 | 8 | 8 | 31 |

Figure 20:
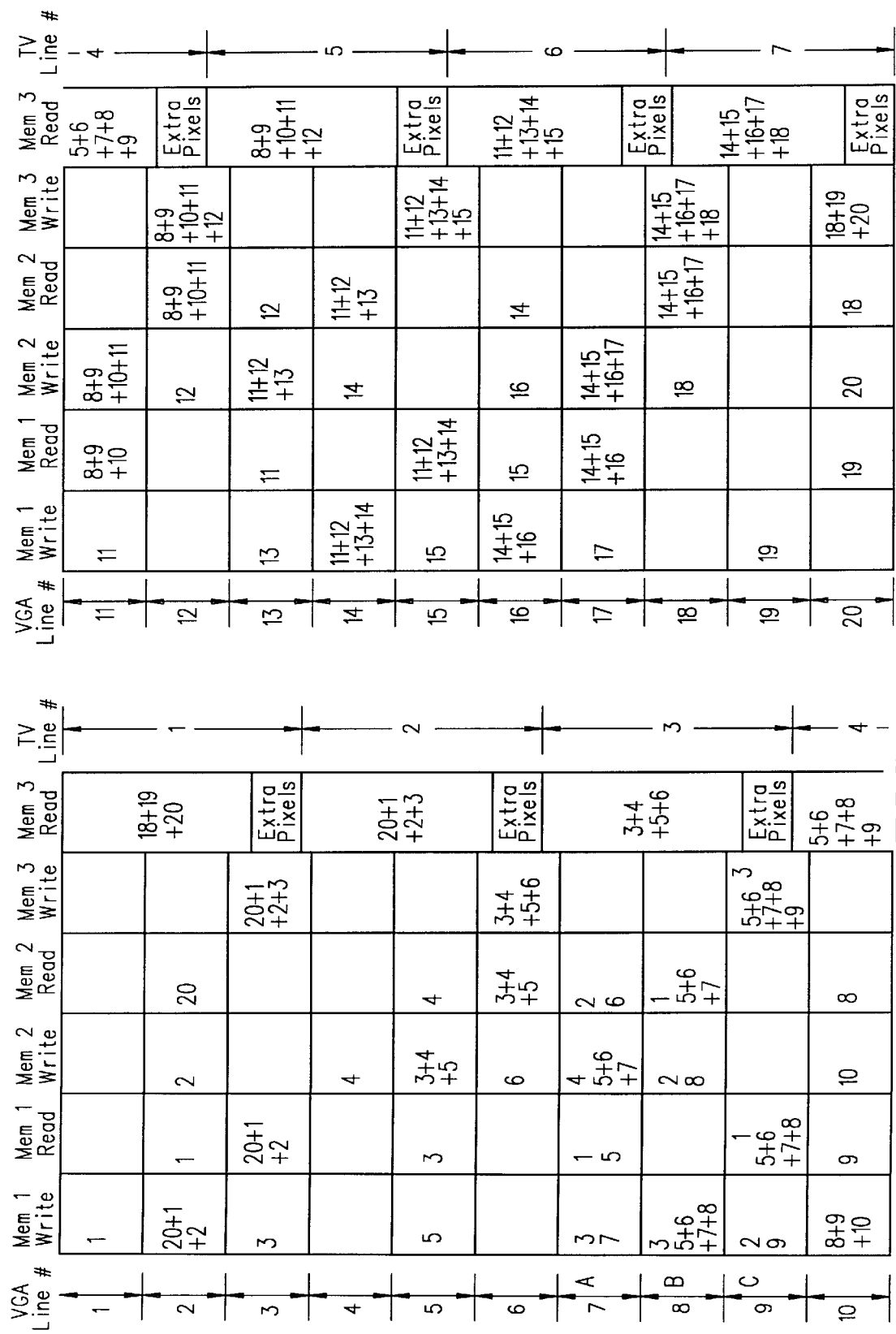
FIG. 20 illustrates the sequence of operations by which the scan rate conversion blocks 302 of FIG. 16 generate a TV line from four or five graphics lines for the 7/10 scaling mode.

Referring to FIG. 20, there is shown a sequence of operations by which the SRC block 200 converts three, four or five graphics lines to a single television line. This particular sequence of operations repeats for every twenty VGA lines seven TV lines and is associated with 7/10 scaling mode. Representative sequences by which a TV line can be generated from three or four VGA lines has already been described. A description is now provided of the sequence of operations by which the SRC block 300 generates one TV line from five VGA lines. In particular, the sequence is described for the generation of TV line 4 from VGA lines 5, 6, 7, 8 and 9.

During the first cycle of this sequence VGA line 5 is received and stored in the memory LM1. During the next cycle VGA line 6 is received and stored in the memory LM2. During the next cycle VGA line 7 is received, VGA line 5 is read out of the memory LM1, VGA line 6 is read out of the'memory LM2, and VGA line 7 is stored in the memory LM1. The ALU 308 then multiplies the readout VGA lines 5 and 6 and the newly received VGA line 7 by the coefficients C1, C2 and C3, respectively, and writes the sum f(L5+L6+L7) into the memory LM2. During the next cycle, VGA line 8 is received, the sum fL5+L6+L7) is read out of the memory LM2 and VGA line 8 is received and stored in the memory LM2. The ALU 308 then multiplies the readout sum f(L5+L6+L7) and the newly received VGA line 8 by the coefficients C2 and C3, respectively, and writes the sum f(L5+L6+L7+L8) into the memory LM1. During the next cycle, VGA line 9 is received, the sum f(L5+L6+L7+L8) is, read out of the memory LM1 and VGA line 9 is stored in the memory LM1. The ALU 308 then multiplies the readout sum f(L5+L6+L7+L8) and the newly received VGA line 9 by the coefficients C1 and C3, respectively, and writes the sum f(L6+L7+L7+L8+L9) into the memory LM3. The sum f(L5+L6+L7+LB+L9) is then read out of the memory LM3 at the TV pixel frequency to form TV line 4. This sequence, or alternatives where the order of writing into the memories LM1 and LM2 is varied, is performed anytime a single TV line is generated from five VGA lines. Preferred values of the coefficients C1, C2, C3 for the twenty steps of FIG. 20 are shown in Table 6. The alternative sequences can be derived as described above.

TABLE 6

Coefficient Values for 7/10's Scaling Mode (Gain = 40 = 1/8 * 1/5 = 3/128)

| VGA | Coef 1 | | Coef 2 | | Coef 3 | |
|---|---|---|---|---|---|---|
| Line | FF0 | FF1 | FF0 | FF1 | FF0 | FF1 |
| 1 | 0 | 0 | 0 | 0 | 0 | 0 |
| 2 | 14 | 14 | 14 | 7 | 12 | 13 |
| 3 | 12 | 12 | 0 | 0 | 0 | 18 |
| 4 | 14 | 8 | 2 | 1 | 14 | 14 |
| 5 | 8 | 8 | 0 | 0 | 20 | 24 |
| 6 | 0 | 0 | 12 | 12 | 0 | 15 |
| 7 | 4 | 2 | 14 | 9 | 14 | 14 |
| 8 | 0 | 0 | 8 | 8 | 16 | 22 |
| 9 | 12 | 12 | 0 | 0 | 0 | 12 |
| 10 | 14 | 10 | 6 | 3 | 14 | 14 |
| 11 | 8 | 8 | 0 | 0 | 12 | 20 |
| 12 | 0 | 0 | 12 | 12 | 0 | 9 |
| 13 | 8 | 4 | 14 | 11 | 14 | 14 |
| 14 | 0 | 0 | 8 | 8 | 8 | 18 |
| 15 | 12 | 12 | 0 | 0 | 0 | 6 |
| 16 | 14 | 12 | 10 | 5 | 14 | 14 |
| 17 | 8 | 8 | 0 | 0 | 4 | 16 |
| 18 | 0 | 0 | 12 | 12 | 0 | 3 |
| 19 | 12 | 6 | 14 | 13 | 14 | 14 |
| 20 | 0 | 0 | 12 | 12 | 0 | 21 |

In the no-scaling mode the embodiment 300 generates every TV line from three graphics lines in the manner already described in reference to FIG. 17. in no-scaling mode it is never necessary to generate a TV line from more than three VGA lines, therefore there are many different arrangements of read and write operations that can be used to generate the TV lines. For example, all reads and writes can be done using only two line memories (LM3 and one of LM1 or LM2) or all three line memories LM1, LM2, LM3. These alternatives follow from the descriptions of FIG. 17 and are not described herein. Preferred values of the coefficients C1, C2, C3 for the no-scaling operations are shown in Table 7. Note that Table 7 includes four values for each coefficient. Each value is used for a different flicker filter implementation, which is selectable by the controller 320. In the preferred embodiment the VGA line 2 coefficients are all set to 0, indicating that all three graphics lines used to generate a TV line are combined during the first line.

TABLE 7

Coefficient Values for 1/1 (No Scaling) Mode

| VGA | C1 | | | | C2 | | | | C3 | | | |
|-----|---|---|---|---|---|---|---|---|---|---|---|---|
| Line | 0 | 1 | 2 | 3 | 0 | 1 | 2 | 3 | 0 | 1 | 2 | 3 |
| 1 | 0 | 5 | 4 | 3 | 16 | 6 | 8 | 10 | 0 | 5 | 4 | 3 |
| 2 | 0 | 0 | 0 | 0 | 0 | 0 | 0 | 0 | 0 | 0 | 0 | 0 |

Figure 21:
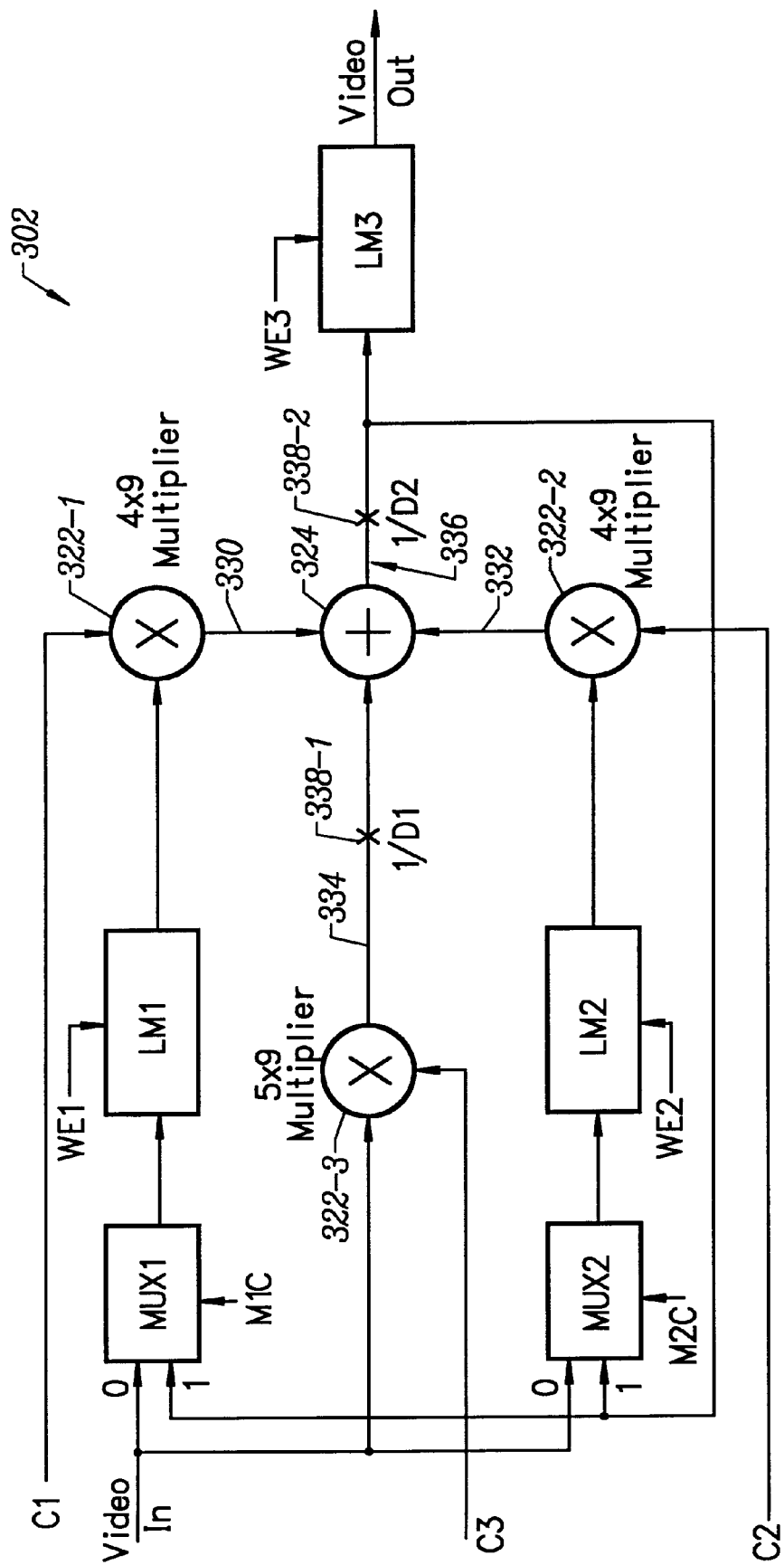
FIG. 21 is a block diagram illustrating additional details of a preferred embodiment of the filter blocks 302 of the scan converter circuitry of FIG. 16.

Referring to FIG. 21, there is shown a block diagram illustrating additional details of a preferred embodiment of portions of one of the filters 302 of FIG. 16. The circuitry of FIG. 21 is duplicated for each of the two data channels (i.e., the Yin and the UVin signals). The components MU1X, MUX2, LM1, LM2 and LM3 correspond respectively to the multiplexers MLUX1, MUX2 and line memories LM1, LM2, LM3 of FIG. 16. In the preferred embodiment, the line memories LM1, LM2, LM3 together store no more than 3*GPPL pixels. For example, all GPPL graphics pixels, or only the GPPLA active graphics pixels, can be stored for each line of video. The multipliers 322-1, 322-2, 322-3, adder 324 and gain multipliers 338-1, 338-2 compose a preferred embodiment of the ALU 308.

In the preferred embodiment the luma channel input Yin is an 8-bit, positive input which is treated as a 9-bit 2's complement value. The chroma input UVin is a 9-bit 2's complement input. Therefore, in the scan converter circuitry 300 arithmetic is done in 2's complement format and the line memories LM1, LV12, LM3 are 9-bits wide. Other inputs to the filter block 302 include coefficients C1, C2, C3 coupled respectively to the multipliers 322-1, 322-2, 322-3; multiplexer control signals M1C, M2C respectively coupled to the multiplexers MUX1, MUX2; line memory write enable signals WE1, WE2, WE3 respectively coupled to the line memories LM1, LM2, LM3; and scaling factors D1, D2 respectively coupled to the multipliers 338-1 338-2.

In the preferred embodiment, the inputs C1, C3, M1C, M2C, WE1, WE2, WE3, D1, D2 are configured as follows:

| Signal | Definition | Width |
|--------|-----------|-------|
| M1C | Line Memory 1 Mux Control | 1-bit |
| W1E | Line memory 1 Write Enable | 1-bit |
| C1 | Line Memory 1 Output Scale Factor | 4-bits |
| M2C | Line Memory 2 Mux Control | 1-bit |
| W2E | Line Memory 2 Write Enable | 1-bit |
| C2 | Line Memory 2 Output Scale Factor | 4-bits |
| D1 | Coefficient 3 scaling | 1-bit |
| D2 | Summation Scaling | 2-bits |
| C3 | Current VGA Line Scale Factor | 5-bits |
| W3E | Line Memory 3 Write Enable | 1-bit |

Each of these inputs is updated for each new VGA line input to the scan converter circuitry 300. This requires a maximum of 21 bits to be stored or generated in some other fashion for each VGA line (over which the scaling pattern repeats). For 5/4's scaling, this is 8 VGA lines, for 1/1 scaling 2 VGA lines, for 7/8's scaling 16 VGA lines, for 5/6's scaling 12 VGA lines, for 3/4's scaling 8 VGA Dines and for 7/10's scaling 20 VGA lines. In the preferred embodiment two sets of flicker coefficients C1, C2, C3 are stored for each scaling mode, one that provides flicker reduction similar to the CH7002 and one that performs a 4-line flicker filter. On the preferred embodiment the inputs C1–C3, M1C, M2C, WE1, WE2, WE3, D1, D2 are stored in a memory accessible to the controller 320 (FIG. 16), which provides the appropriate coefficient and control signal values at the appropriate times.

The VGA signals are coupled to the "0" input of the multiplexers MUX1, MUX2 and an input of the multiplier 322-3. The output of each multiplexer MVX1, MUX2 is coupled to the input of a respective line memory LM1, LM2, which stores the value on its input when a respective enable signal WE1, WE2 is active. The currently stored value of each memory LM1, LM2 is coupled to one input of a respective multiplier 322-1, 322-2. The other input of a multiplier 322-1, 322-2 is coupled to a respective coefficient C1, C2. The product of the stored value and the coefficient is output by a respective multiplier 322-1, 322-2 to the adder 324. The other input of the multiplier 322-3 is coupled to the coefficient C3. The output 334 of the multiplier 322-3 (the product of the VGA input and the coefficient C3) is coupled to the multiplier 338-1, which scales (divides) the input 334 by the scale factor D1. The adder 324 adds the scaled output from the multiplier 338-1, the output 330 from the multiplier 322-1 and the output 332 from the multiplier 322-2 and outputs the sum 336 to the multiplier 338-2. The multiplier 338-2 scales the sum 336 by the scale factor D2 and couples the scaled sum to the input of the line memory LM3 and the "1" input of the multiplexers MUX1, MUX2. The multiplexers MUX1, MUX2 output an input selected by the respective control signals M1C, M2C. The line memory LM3 stores the 9-bit value on its input when the write enable signal WE3 is active. The signal WE3 runs at the input pixel frequency; however, data is read out of the memory LM3 at the TV pixel frequency (TVPCLK).

As already described the scan rate conversion (SRC) block 300 includes a controller 320 (FIG. 16) that generates addresses for the line memories and sets operational parameters for the SIRC block 300 in accordance with the externally-supplied mode. In the preferred embodiment, the mode can include 5/4's, 1/1, 7/8's, 5/6's, 3/4's and 7/10's scaling modes. The settings for the operational parameters (M1C, M2C, WE1, WE2, D1, D2, C1, C2, C3) for these modes are shown in Tables 8–13, respectively. Each table shows the parameters' values for the number of input VGA lines over which the processing repeats for a given mode. For example, Table 8 shows the parameters used by the luma filter 302 for each of the 8 VGA lines used to generate 5 TV lines in the 5/4's scaling mode. As mentioned above, there are two possible values of the coefficients C1, C2 and C3 that can be used for each VGA line. The values shown under the column headings FF0 and FF1 are respectively associated with two different flicker filter modes, as already described. More or fewer coefficient values can easily be employed in variations of the preferred embodiment.

TABLE 8

5/4's Scaling Control (Gain = 16)

| VGA Line | M1C | W1E | Coef 1 FF0 | Coef 1 FF1 | M2C | W2E | Coef 2 FF0 | Coef 2 FF1 | D1 | D2 | Coef 3 FF0 | Coef 3 FF1 | W3E |
|---|---|---|---|---|---|---|---|---|---|---|---|---|---|
| 1 | 0 | 1 | 0 | 0 | x | 0 | 0 | 0 | 1 | 16 | 0 | 0 | 0 |
| 2 | x | 0 | 6 | 8 | 0 | 1 | 10 | 5 | 1 | 16 | 0 | 3 | 1 |
| 3 | 0 | 1 | 4 | 2 | 1 | 1 | 10 | 7 | 1 | 16 | 2 | 6 | 0 |
| 4 | x | 0 | 0 | 0 | 0 | 1 | 16 | 16 | 1 | 16 | 0 | 1 | 1 |
| 5 | 0 | 1 | 8 | 4 | x | 0 | 8 | 8 | 1 | 16 | 0 | 4 | 1 |
| 6 | 1 | 1 | 10 | 6 | 0 | 1 | 2 | 1 | 1 | 16 | 4 | 7 | 0 |
| 7 | 0 | 1 | 16 | 16 | x | 0 | 0 | 0 | 1 | 16 | 0 | 2 | 1 |
| 8 | x | 0 | 10 | 8 | 0 | 1 | 6 | 3 | 1 | 16 | 0 | 5 | 1 |

TABLE 9

1/1's Scaling Control (Gain = 16)

| VGA Line | M1C | W1E | Coef 1 0 | Coef 1 1 | Coef 1 2 | Coef 1 3 | M2C | W2E | Coef 2 0 | Coef 2 1 | Coef 2 2 | Coef 2 3 | D1 | D2 | Coef 3 0 | Coef 3 1 | Coef 3 2 | Coef 3 3 | W3E |
|---|---|---|---|---|---|---|---|---|---|---|---|---|---|---|---|---|---|---|---|
| 1 | 0 | 1 | 0 | 5 | 4 | 3 | x | 0 | 16 | 6 | 8 | 10 | 1 | 16 | 0 | 5 | 4 | 3 | 1 |
| 2 | x | 0 | 0 | 0 | 0 | 0 | 0 | 1 | 0 | 0 | 0 | 0 | 1 | 16 | 0 | 0 | 0 | 0 | 0 |

TABLE 10

7/8's Scaling Control (Gain = 16)

| VGA Line | M1C | W1E | Coef 1 FF0 | Coef 1 FF1 | M2C | W2E | Coef 2 FF0 | Coef 2 FF1 | D1 | D2 | Coef 3 FF0 | Coef 3 FF1 | W3E |
|---|---|---|---|---|---|---|---|---|---|---|---|---|---|
| 1 | 0 | 1 | 0 | 0 | x | 0 | 0 | 0 | 16 | 8 | 0 | 0 | 0 |
| 2 | 1 | 1 | 14 | 13 | 0 | 1 | 12 | 6 | 1 | 32 | 6 | 10 | 0 |
| 3 | 0 | 1 | 8 | 8 | x | 0 | 0 | 0 | 16 | 8 | 0 | 12 | 1 |
| 4 | 1 | 1 | 14 | 11 | 0 | 1 | 8 | 4 | 1 | 32 | 10 | 12 | 0 |
| 5 | 0 | 1 | 8 | 8 | x | 0 | 0 | 0 | 16 | 8 | 0 | 20 | 1 |
| 6 | 1 | 1 | 14 | 9 | 0 | 1 | 4 | 2 | 1 | 32 | 14 | 14 | 0 |
| 7 | 0 | 1 | 8 | 8 | x | 0 | 0 | 0 | 16 | 8 | 0 | 28 | 1 |
| 8 | x | 0 | 0 | 0 | 0 | 1 | 0 | 0 | 1 | 32 | 0 | 0 | 0 |
| 9 | 0 | 1 | 14 | 7 | 1 | 1 | 14 | 14 | 1 | 32 | 4 | 9 | 0 |
| 10 | x | 0 | 0 | 0 | 0 | 1 | 8 | 8 | 16 | 8 | 0 | 8 | 1 |
| 11 | 0 | 1 | 10 | 5 | 1 | 1 | 14 | 12 | 1 | 32 | 8 | 11 | 0 |
| 12 | x | 0 | 0 | 0 | 0 | 1 | 8 | 8 | 16 | 8 | 0 | 16 | 1 |
| 13 | 0 | 1 | 6 | 3 | 1 | 1 | 14 | 10 | 1 | 32 | 12 | 13 | 0 |
| 14 | x | 0 | 0 | 0 | 0 | 1 | 8 | 8 | 16 | 8 | 0 | 24 | 1 |
| 15 | 0 | 1 | 2 | 0 | 1 | 1 | 14 | 8 | 1 | 32 | 14 | 16 | 0 |
| 16 | x | 0 | 0 | 0 | 0 | 1 | 8 | 8 | 16 | 8 | 8 | 31 | 1 |

TABLE 11

5/6's Scaling Control (Gain = 24 = 1/8 * 1/3 = 5/128)

| VGA Line | M1C | W1E | Coef 1 FF0 | Coef 1 FF1 | M2C | W2E | Coef 2 FF0 | Coef 2 FF1 | D1 | D2 | Coef 3 FF0 | Coef 3 FF1 | W3E |
|---|---|---|---|---|---|---|---|---|---|---|---|---|---|
| 1 | 0 | 1 | 0 | 0 | x | 0 | 0 | 0 | 16 | 8 | 0 | 0 | 0 |
| 2 | 1 | 1 | 10 | 9 | 0 | 1 | 8 | 4 | 1 | 32 | 6 | 8 | 0 |
| 3 | 0 | 1 | 10 | 10 | x | 0 | 0 | 0 | 16 | 8 | 0 | 15 | 1 |
| 4 | 1 | 1 | 10 | 7 | 0 | 1 | 4 | 2 | 1 | 32 | 10 | 10 | 0 |
| 5 | 0 | 1 | 10 | 10 | x | 0 | 0 | 0 | 16 | 8 | 0 | 25 | 1 |
| 6 | x | 0 | 0 | 0 | 0 | 1 | 0 | 0 | 1 | 32 | 0 | 0 | 0 |
| 7 | 0 | 1 | 10 | 5 | 1 | 1 | 10 | 10 | 1 | 32 | 4 | 7 | 0 |
| 8 | x | 0 | 0 | 0 | 0 | 1 | 10 | 10 | 16 | 8 | 0 | 10 | 1 |
| 9 | 0 | 1 | 6 | 3 | 1 | 1 | 10 | 8 | 1 | 32 | 8 | 9 | 0 |
| 10 | x | 0 | 0 | 0 | 0 | 1 | 10 | 10 | 16 | 8 | 0 | 20 | 1 |

TABLE 11-continued

5/6's Scaling Control (Gain = 24 = 1/8 * 1/3 = 5/128)

| VGA Line | M1C | W1E | Coef 1 | | M2C | W2E | Coef 2 | | D1 | D2 | Coef 3 | | W3E |
|---|---|---|---|---|---|---|---|---|---|---|---|---|---|
| | | | FF0 | FF1 | | | FF0 | FF1 | | | FF0 | FF1 | |
| 11 | 0 | 1 | 2 | 0 | 1 | 1 | 10 | 6 | 1 | 32 | 10 | 12 | 0 |
| 12 | x | 0 | 0 | 0 | 0 | 1 | 10 | 10 | 16 | 8 | 10 | 30 | 1 |

TABLE 12

3/4's Scaling Control (Gain = 16)

| VGA Line | M1C | W1E | Coef 1 | | M2C | W2E | Coef 2 | | D1 | D2 | Coef 3 | | W3E |
|---|---|---|---|---|---|---|---|---|---|---|---|---|---|
| | | | FF0 | FF1 | | | FF0 | FF1 | | | FF0 | FF1 | |
| 1 | 0 | 1 | 0 | 0 | x | 0 | 0 | 0 | 1 | 16 | 0 | 0 | 0 |
| 2 | 1 | 1 | 6 | 5 | 0 | 1 | 4 | 2 | 1 | 16 | 6 | 6 | 0 |
| 3 | 0 | 1 | 16 | 16 | x | 0 | 0 | 0 | 1 | 16 | 0 | 3 | 1 |
| 4 | x | 0 | 0 | 0 | 0 | 1 | 0 | 0 | 1 | 16 | 0 | 0 | 0 |
| 5 | 0 | 1 | 6 | 3 | 1 | 1 | 6 | 6 | 1 | 16 | 4 | 5 | 0 |
| 6 | x | 0 | 0 | 0 | 0 | 1 | 16 | 16 | 1 | 16 | 0 | 2 | 1 |
| 7 | 0 | 1 | 2 | 0 | 1 | 1 | 6 | 4 | 1 | 16 | 6 | 8 | 0 |
| 8 | x | 0 | 0 | 0 | 0 | 1 | 16 | 16 | 1 | 16 | 2 | 4 | 1 |

TABLE 13

7/10's Scaling Control (Gain = 40 = 1/8 * 1/5 = 3/128)

| VGA Line | M1C | W1E | Coef 1 | | M2C | W2E | Coef 2 | | D1 | D2 | Coef 3 | | W3E |
|---|---|---|---|---|---|---|---|---|---|---|---|---|---|
| | | | FF0 | FF1 | | | FF0 | FF1 | | | FF0 | FF1 | |
| 1 | 0 | 1 | 0 | 0 | x | 0 | 0 | 0 | 16 | 8 | 0 | 0 | 0 |
| 2 | 1 | 1 | 14 | 14 | 0 | 1 | 14 | 7 | 1 | 64 | 12 | 13 | 0 |
| 3 | 0 | 1 | 12 | 12 | x | 0 | 0 | 0 | 16 | 8 | 0 | 18 | 1 |
| 4 | 1 | 1 | 14 | 8 | 0 | 1 | 2 | 1 | 1 | 64 | 14 | 14 | 0 |
| 5 | 0 | 1 | 8 | 8 | 1 | 1 | 0 | 0 | 16 | 8 | 20 | 24 | 0 |
| 6 | x | 0 | 0 | 0 | 0 | 1 | 12 | 12 | 16 | 8 | 0 | 15 | 1 |
| 7 | 0 | 1 | 4 | 2 | 1 | 1 | 14 | 9 | 1 | 64 | 14 | 14 | 0 |
| 8 | 1 | 1 | 0 | 0 | 0 | 1 | 8 | 8 | 16 | 8 | 16 | 22 | 0 |
| 9 | 0 | 1 | 12 | 12 | x | 0 | 0 | 0 | 16 | 8 | 0 | 12 | 1 |
| 10 | 1 | 1 | 14 | 10 | 0 | 1 | 6 | 3 | 1 | 64 | 14 | 14 | 0 |
| 11 | 0 | 1 | 8 | 8 | 1 | 1 | 0 | 0 | 16 | 8 | 12 | 20 | 0 |
| 12 | x | 0 | 0 | 0 | 0 | 1 | 12 | 12 | 16 | 8 | 0 | 9 | 1 |
| 13 | 0 | 1 | 8 | 4 | 1 | 1 | 14 | 11 | 1 | 64 | 14 | 14 | 0 |
| 14 | 1 | 1 | 0 | 0 | 0 | 1 | 8 | 8 | 16 | 8 | 8 | 18 | 0 |
| 15 | 0 | 1 | 12 | 12 | x | 0 | 0 | 0 | 16 | 8 | 0 | 6 | 1 |
| 16 | 1 | 1 | 14 | 12 | 0 | 1 | 10 | 5 | 1 | 64 | 14 | 14 | 0 |
| 17 | 0 | 1 | 8 | 8 | 1 | 1 | 0 | 0 | 16 | 8 | 4 | 16 | 0 |
| 18 | x | 0 | 0 | 0 | 0 | 1 | 12 | 12 | 16 | 8 | 0 | 3 | 1 |
| 19 | 0 | 1 | 12 | 6 | 1 | 1 | 14 | 13 | 1 | 64 | 14 | 14 | 0 |
| 20 | x | 0 | 0 | 0 | 0 | 1 | 12 | 12 | 16 | 8 | 0 | 21 | 1 |

The preferred embodiment 300 supports many different computer graphics and television formats. For example, the preferred embodiment can generate PAL or NTSC television signals from VGA images with 640×480 or 800×600 pixel resolutions. As already described, to accommodate the different combinations of formats and different desired television image sizes, the preferred embodiment provides a wide-range of scaling factors, including 1:1 (no scaling), 7:8, 5:6, 5:4, 7:10 and 3:4. Each different supported combination of scaling factor, television format (output) and computer graphics format (input) is defined as a selectable user mode. Once a user selects a mode of operation, the preferred embodiment determines parameters of the VGA and television signals consistent with that mode. This parameter determination can be performed in the scan rate conversion block 300 by table lockup or by direct calculation.

Referring to Appendix C, there are shown two tables (Table C1 and Table C2) that list some of the VGA and television signal characteristics associated with operational modes supported in a preferred embodiment of the present invention. The signal characteristics shown in Table C1 include:

| | |
|---|---|
| TV Format | (NTSC or PAL), |
| Mode | A unique mode index, |
| Input Resolution | Graphics pixels per line × graphics lines per frame), |
| Scale Factor | TV lines per frame:Graphics lines per frame |
| Active TV Lines | Number of TV lines with viewable content. |
| Percent Overscan | Over/underscan percentage of the resulting scaled image when displayed on a television monitor (overscan is positive, underscan is negative), |
| Pixel Clock | Graphics pixel clock frequency (GPF), |
| Horizontal total | Graphics pixels per line (GPPL), |
| Vertical total | Graphics lines per frame (GLPF). |

The signal characteristics shown in Table C2 are similar to those shown in Table C1. Additional information shown in Table C2 includes:

| | |
|---|---|
| IR[2:0] | a 3-bit field that designates the Input Resolution, |
| VOS[1:0] | A 2-bit field that designates the TV Format, |
| SR[2:0] | A 3-bit field that designates the Scale Factor. |

Appendix C documents a set of 25 modes (0–24) that are implemented in the Chrontel model CH17003 Digital VGA to NTSC/PAL Encoder. The possible settings are not limited to those illustrated in Appendix C. These settings can be stored and retrieved in the same manner described in reference to FIG. 15.

Figure 22:
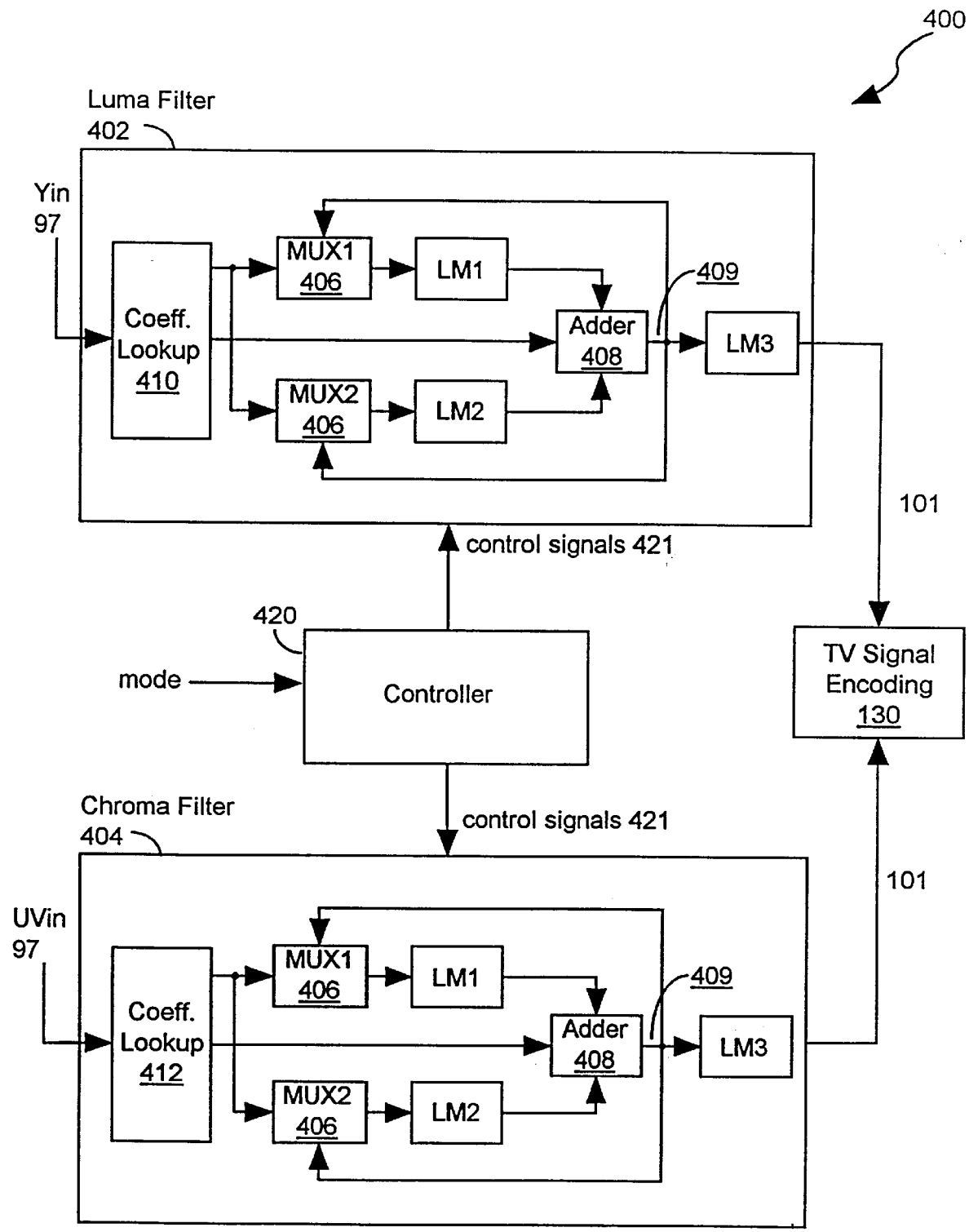
FIG. 22 is a block diagram of portions of a system for converting a computer graphics image into a scaled television image that employs different filters, each with three line memories, for the luma (Y) and chroma (UV) video components.

Referring to FIG. 22, there is shown a block diagram of an alternative embodiment 400 of a scan rate conversion and flicker filter. This alternative embodiment performs the same functions as and operates similarly to the scan rate conversion and flicker filter 300 of FIG. 16. Differences between the embodiment 400 and the embodiment 300 are due to the manner in which the embodiment 400 generates coefficients to be applied to the input signals.

The embodiment 400 includes a controller block-420 and filter blocks 402, 404 that operate respectively on the luma (Y) and chroma (UV) signals 97 generated by the decimation block 96 (FIG. 11). The filter blocks 402, 404 differ but include the same types of components. That is, each filter block 402, 404 includes one adder 408, three line memories LM1, LM2, LM3 and two multiplexers 406. The filter blocks 402, 404 include coefficient lookup circuitry 410, 412, respectively, which is not employed in the SRC block 300 (FIG. 16). This is because, in the embodiment of FIG. 16, the controller 320 generates the filter coefficients, which are different from the filter coefficients generated by the embodiment of FIG. 22. The line memories LM1 and LM2 are functionally equivalent; that is, any operation of the embodiment 400 using either or both of the memories LM1 and LM2 can be performed using the memories LM2 ansd LM1 in a mirror-symmetrical manner. For example, a two cycle sequence wherein a new Yin value is written into the memory LM1 and an output from the adder 408 is written to the memory LM2 can also be performed by writing the new Yin value to the memory LM2 and the ALU output to the memory LM1. The illustrated embodiment takes advantage of this symmetry by employing the memories LM1, LM2 interchangeably.

The coefficient lookup circuitry 410, 412 respectively store tables of coefficients C1, C2 for the supported modes. In response to mode and control signals from the controller (FIG. 11), the lookup circuitry 410, 412 reads out mode-appropriate coefficients C1, C2, which it applies the appropriate input channel (i.e. Yin or UVin). The coefficient lookup circuitry 410, 412 can be identical. However, for reasons described in reference to FIGS. 23 and 24, in the preferred embodiment the lookup circuitry 410, 412 differ.

The controller 420 generates control signals 421, including addresses for the line memories and operational parameters for the filter blocks 402, in accordance with a "mode" supplied externally (e.g., by the SRC controller 208 of FIG. 15). Among other things, the mode input to the controller 420 is associated with a scale factor to be applied to the graphics signals 97. Different scale factors, including no (or 1:1) scaling, are implemented to accommodate different combinations of image format and television formats.

The operational sequences implemented by the SRC block 400 are nearly the same for the various modes as those of the SRC block 300 described in reference to FIGS. 17–20. Therefore, these operational sequences are not described herein. A comparison of the M1C, M1E, M2C, M2E and M3E parameters of Tables 8–13 and Tables 14–20 will clearly show the differences.

Figure 23:
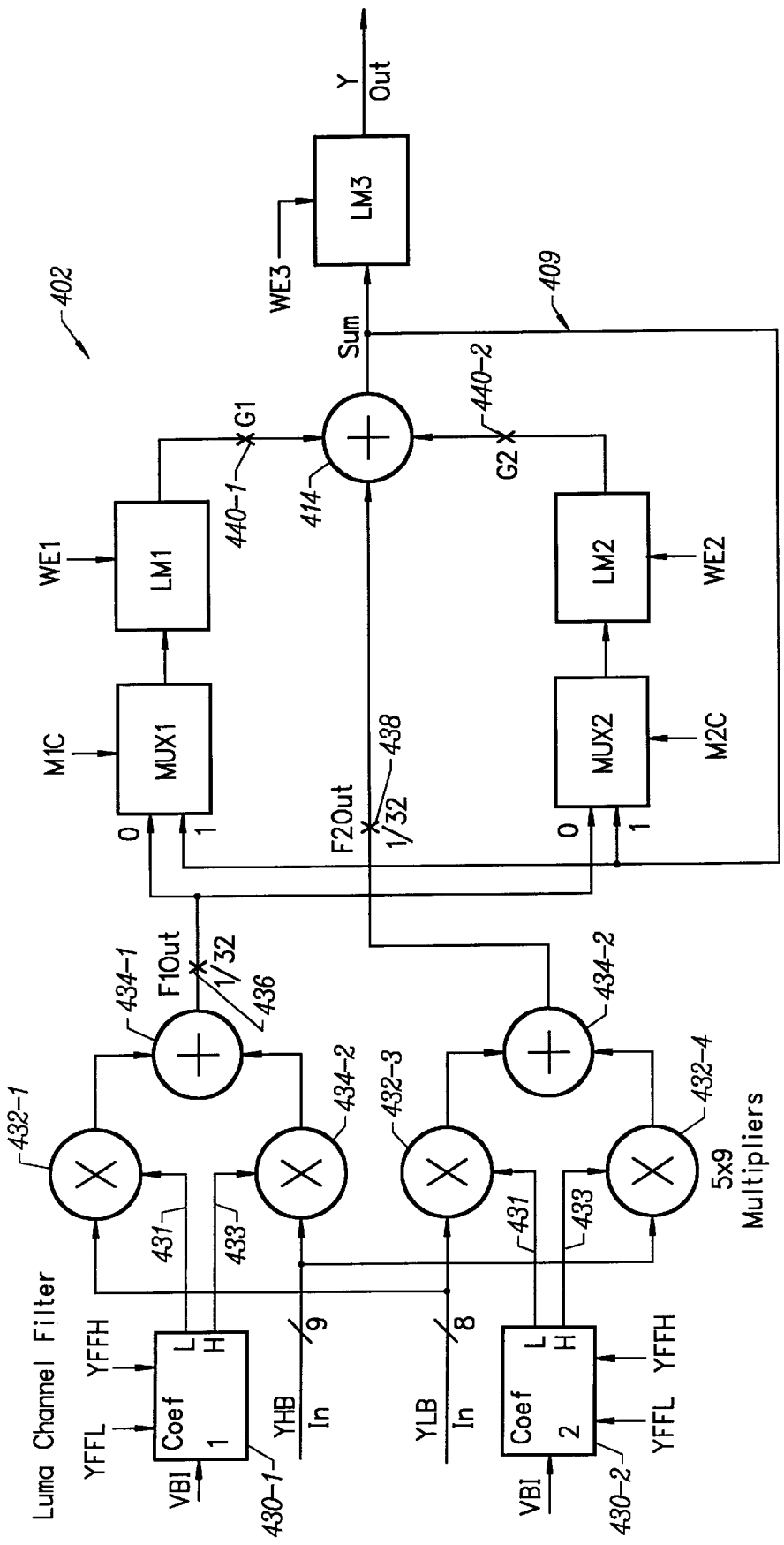
FIG. 23 is a block diagram illustrating additional details of a preferred embodiment of the luma filter portion 402 of the scan converter circuitry of FIG. 22.

Referring to FIG. 23, there is shown a block diagram of a preferred embodiment of the umina filter block 402. The filter block 402 includes two multiplexers (MUX1, MUX2), three line memories (LM1, LM2, LM3), an adder 414 and gain multipliers 440-1, 440-2; these elements correspond to the MUX1, MUX2, LM1, LM2, LM3 and adder 408 of FIG. 22. In the preferred embodiment, the line memories LM1, LM2, LM3 together store no more than 3*GPPL pixels. For example, all GPPL graphics pixels, or only the GPPLA active graphics pixels, can be stored for each line of video. The filter block 402 also includes coefficient memories 430-1, 430-2, multipliers 432 an adder 434 and scaling multipliers 436, 438, which compose the coefficient lookup circuit 410 of FIG. 22.

The luma channel input to the filter block 402 consists of a low bandwidth. input YLB and a high bandwidth input YLH. In the preferred embodiment the input YLB is an 8-bit value and the YLH input is a 9-bit two's complement value. The low bandwidth and high bandwidth signals come from a modified filter and decimation block (similar to the block 96 of FIG. 11), which separates the luma signal into two separate signals, each of which can receive different levels of flicker-filtering in the luma filter 402. The separation of the luma signals and the different amount of flicker filtering performed on respective luma signal components is the subject of U.S. patent application Ser. No. 08/988,790 (Improved Images in Interlaced Formats: a Novel Method of Scan Conversion for Video Imaging Systems), which is entirely incorporated herein by reference. Even though the embodiment 400 allows for the possibility of applying separate flicker filtering to a luma signal that is split into two separate components, one requiring high filtering and one requiring low filtering, this, is not a requirement of the present invention. More generally, the separate luma signals can be any two components that need to receive different amounts of flicker reduction/filtering in the luma filter 402.

Other inputs to the filter block 402 include YFFH, YFFL and VBI control signals coupled to the coefficient memories 430; multiplexer control signals M1C, M2C respectively coupled to the multipliers MUX1, MUX2; line memory write enable signals WE1, WE2, WE3 respectively coupled to the line memories LM1, LM2, LM3; and one-bit gain factors G1, G2 respectively coupled to the one-bit multipliers 440-1, 440-2.

In the preferred embodiment each memory 430 holds four values of a respective coefficient C1, C2 for a number of VGA lines. The four values are associated with respective flicker filters that can be implemented in the embodiment 400. One of four coefficients is selected to be output by each of the two output signals from the memory 430 by the control signals YFFL, YFFH and VBI. In particular:

| | |
|---|---|
| YFFH | selects in combination with YFFL one of four versions of the coefficients C1 or C2 to be output by the memory 430; |
| YFFL | selects in combination with YFFH one of four versions of the coefficients C1 or C2 to be output by the memory 430; and |
| VBI | indicates when set that all filter coefficients are to be forced to their minimum values, corresponding to YFFH = 0 and YFFL = 0. |

Based on these signals a coefficient memory 430 outputs to respective multipliers 432 complementary (L and H) versions 431, 433 of a coefficient C1 or C2. In particular, the memory 430-1 outputs L and H versions of the coefficient C1 and the memory 430-2 outputs L and H versions of the coefficient C2. In both cases the L signal is a low bandwidth signal and the H signal is a two's complement high bandwidth signal.

In addition to a coefficient from the memories 430 each multiplier 432 receives a luma input signal YLQ or YHB. In particular, the multipliers 432-1, 432-3 receive the low bandwidth-signal YLB and the multipliers 432-2, 432-4 receive the high bandwidth signal YHB. Each multiplier 432 is configured to multiply its input coefficient by its input luma signal. The outputs of the multipliers 432-1, 432-2 are then added by the adder 434-1 and the outputs of the multipliers 432-3, 432-4 are added by the adder 434-2. The output of each adder 434 is coupled to a 1132 divider 436 or 438 that normalizes the adder's output F1Out or F2out, respectively. The 1/32 factor corresponds to the range of 5-bit values that can be taken by the coefficients C1 or C2 in most situations. However, in the 1/1 scaling mode, a coefficient C1, C2 needs to be set to 32, which is a 6-bit value. The present invention can adopt two approaches to handle this case.

First, instead of setting a coefficient C1, C2 to 32, it can instead be set to 31. This solves the problem of handling a 6-bit value but introduces a gain error of −3.125%. A second approach sets the coefficients to 16 instead of 32 and accordingly divides in the multipliers 436, 438 by a factor of 16 instead of 32. This approach is preferable as it prevents the introduction of a gain error. The latter approach is reflected in Table 15, which lists the operational parameters' values for 1/1 scaling mode.

The output F1 Out of the adder 434-1 is coupled to the "0" input of both multiplexers MUX1 and MU)X2 and the output F2Out of the adder 434-2 is coupled to one input of the adder 414. The "1" input of both multiplexers is coupled to the output 409 of the adder 414. The output of the multiplexers MX1 and MX2 are coupled respectively to the line memories LM1 and LM2. The multiplexers MX1, M2 (2 output a selected input signal to a respective memory LM1 or LM2 in response to a respective mux control signal M1C, M2C. The output signals from the multiplexers are written into a respective line memory in response to a respective write enable signal WE, which runs at the input pixel frequency (PCLK). The output of a line memory LM1, LM2 is multiplied by a respective gain factor G1, G2 (set to 1 or a 0) in a respective 1-bit multiplier 440-1., 440-2 and the resulting value is input to the adder 414. In addition to being fed back to the multiplexers MUX1, MUX2. The sum 409 produced by the adder 408 is coupled to the line memory LM3, whose writing is controlled by the write enable signal WE3. The WE3 signal also runs at the input pixel frequency; however, data is read out of the memory LM3 at the TV pixel frequency (TVPCLK).

As already described the scan rate conversion (SRC) block 400 includes a controller 420 (FIG. 16) that generates addresses for the line memories and sets operational parameters for the SRC block 400 in accordance with the externally-supplied mode. In the preferred embodiment, the mode can include 5/4's, 1/1, 7/8's, 5/6's, 3/4's, 7/10's (w/4-line flicker filter) and 7/10's (w/5-line flicker filter) scaling modes. The settings for the operational parameters (M1C, M2C, WE1, WE2, G1, G2, C1, C2) for these modes are shown in Tables 14–20, respectively.

Each of the Tables 14–20 shows the parameters' values for the number of input VGA lines over which the processing repeats for a given mode. For example, Table 14 shows the parameters used by the luma filter 402 for each of the 8 VGA lines used to generate 5 TV lines in the 5/4's scaling mode. As mentioned above, there are four possible values of the coefficients and C2 that can be used for each VGA line. The coefficients Cl and C2 are stored in the coefficient 1 and 2 memories 430-1, 430-2 respectively and are accessed using different combinations of the YFFL and YFFH inputs. The four values of each coefficient are shown in the tables in four columns headed FF0, FF1, FF2 and FF3, where the output 431 is controlled by YFFL and the output 432 is controlled by YFFH. YFFL and YFFH are each 2-bit numbers, variations of which control the outputs as follows:

YFFL[1:0]=00 selects FFO for output 431

YFFL[1:0]=01 selects FF1 for output 431

YFFL[1:0]=10 selects FF2 for output 431

YFFL[1:0]=11 selects FF3 for output 431

YFFL[1:0]=00 selects FF0 for output 432

YFFL[1:0]=0 selects FF1 for output 432

YFFL[1:0]=10 selects FF2 for output 432

YFFL[1:0]=11 selects FF3 for output 432

There are two tables for the 7/10's scaling mode. The first table (Table 19) includes coefficients for a 4-line flicker filter. The second table (Table 20) includes coefficients for a 5-line flicker filters. The optional 5-line flicker filter is provided as the greatest amount of decimation is applied to input data in 7/10 scaling (600 lines compressed to 420), hence the need for the lowest bandwidth (i.e., 5-line) filter.

TABLE 14

5/4's Scaling Mode

| VGA Line | M1C | W1E | G 1 | Coef 1 FF0 | FF1 | FF2 | FF3 | M2C | W2E | G 2 | Coef 2 FF0 | FF1 | FF2 | FF3 | W3E |
|---|---|---|---|---|---|---|---|---|---|---|---|---|---|---|---|
| 1 | 0 | 1 | x | 28 | 16 | 16 | 16 | x | 0 | x | 0 | 0 | 0 | 0 | 0 |
| 2 | x | 0 | 1 | 16 | 16 | 16 | 16 | 0 | 1 | 1 | 0 | 6 | 6 | 6 | 1 |
| 3 | 0 | 1 | 0 | 0 | 6 | 6 | 6 | 1 | 1 | 1 | 16 | 16 | 16 | 16 | 0 |
| 4 | x | 0 | 0 | 28 | 16 | 16 | 16 | 0 | 1 | 1 | 0 | 0 | 0 | 0 | 1 |
| 5 | 0 | 1 | 1 | 8 | 12 | 12 | 12 | x | 0 | 1 | 4 | 10 | 10 | 10 | 1 |
| 6 | 1 | 1 | 1 | 0 | 4 | 4 | 4 | 0 | 1 | 0 | 24 | 16 | 16 | 16 | 0 |
| 7 | 0 | 1 | 1 | 24 | 16 | 16 | 16 | x | 0 | 0 | 0 | 4 | 4 | 4 | 1 |
| 8 | x | 0 | 1 | 4 | 10 | 10 | 10 | 0 | 1 | 1 | 8 | 12 | 12 | 12 | 1 |

TABLE 15

1/1's Scaling Control (1/32 replaced with 1/16)

| VGA Line | M1C | W1E | G 1 | Coef 1 FF0 | FF1 | FF2 | FF3 | M2C | W2E | G 2 | Coef 2 FF0 | FF1 | FF2 | FF3 | W3E |
|---|---|---|---|---|---|---|---|---|---|---|---|---|---|---|---|
| 1 | 0 | 1 | 1 | 0 | 5 | 4 | 8 | x | 0 | 0 | 0 | 5 | 4 | 8 | 1 |
| 2 | 1 | 1 | 1 | 0 | 0 | 0 | 0 | x | 0 | 0 | 16 | 6 | 8 | 0 | 0 |

TABLE 16

7/8's Scaling Control

| VGA Line | M1C | W1E | G 1 | Coef 1 FF0 | FF1 | FF2 | FF3 | M2C | W2E | G 2 | Coef 2 FF0 | FF1 | FF2 | FF3 | W3E |
|---|---|---|---|---|---|---|---|---|---|---|---|---|---|---|---|
| 1 | 0 | 1 | x | 24 | 16 | 14 | 4 | x | 0 | x | 0 | 0 | 0 | 0 | 0 |
| 2 | 1 | 1 | 1 | 0 | 0 | 4 | 8 | 0 | 1 | 1 | 8 | 12 | 10 | 12 | 0 |
| 3 | 0 | 1 | 1 | 16 | 16 | 12 | 8 | x | 0 | 0 | 0 | 0 | 2 | 4 | 1 |
| 4 | 1 | 1 | 1 | 0 | 0 | 2 | 4 | 0 | 1 | 1 | 16 | 16 | 12 | 8 | 0 |
| 5 | 0 | 1 | 1 | 8 | 12 | 10 | 12 | x | 0 | 0 | 0 | 0 | 4 | 8 | 1 |
| 6 | 1 | 1 | 1 | 0 | 0 | 0 | 0 | x | 0 | 1 | 0 | 24 | 16 | 14 | 4 | 0 |
| 7 | 0 | 1 | 1 | 0 | 6 | 7 | 14 | x | 0 | 0 | 0 | 4 | 6 | 12 | 1 |
| 8 | x | 0 | x | 28 | 16 | 15 | 2 | 0 | 1 | x | 0 | 0 | 0 | 0 | 0 |
| 9 | 0 | 1 | 1 | 0 | 2 | 5 | 10 | 1 | 1 | 1 | 4 | 10 | 9 | 14 | 0 |
| 10 | x | 0 | 0 | 20 | 16 | 13 | 6 | 0 | 1 | 1 | 0 | 0 | 1 | 2 | 1 |
| 11 | 0 | 1 | 1 | 0 | 0 | 3 | 6 | 1 | 1 | 1 | 12 | 14 | 11 | 10 | 0 |
| 12 | x | 0 | 0 | 12 | 14 | 11 | 10 | 0 | 1 | 1 | 0 | 0 | 3 | 6 | 1 |
| 13 | 0 | 1 | 1 | 0 | 0 | 1 | 2 | 1 | 1 | 1 | 20 | 16 | 13 | 6 | 0 |
| 14 | x | 0 | 0 | 4 | 10 | 9 | 14 | 0 | 1 | 1 | 0 | 2 | 5 | 10 | 1 |
| 15 | x | 0 | 1 | 0 | 0 | 0 | 0 | 1 | 1 | 1 | 28 | 16 | 15 | 2 | 0 |
| 16 | x | 0 | 0 | 0 | 4 | 6 | 12 | 0 | 1 | 1 | 0 | 6 | 7 | 14 | 1 |

TABLE 17

5/6's Scaling Control

| VGA Line | M1C | W1E | G 1 | Coef 1 FF0 | FF1 | FF2 | FF3 | M2C | W2E | G 2 | Coef 2 FF0 | FF1 | FF2 | FF3 | W3E |
|---|---|---|---|---|---|---|---|---|---|---|---|---|---|---|---|
| 1 | 0 | 1 | x | 24 | 16 | 14 | 4 | x | 0 | x | 0 | 0 | 0 | 0 | 0 |
| 2 | 1 | 1 | 1 | 0 | 0 | 2 | 4 | 0 | 1 | 1 | 8 | 12 | 10 | 12 | 0 |
| 3 | 0 | 1 | 1 | 8 | 12 | 10 | 12 | x | 0 | 0 | 0 | 0 | 2 | 4 | 1 |
| 4 | 1 | 1 | 1 | 0 | 0 | 0 | 0 | 1 | 1 | 1 | 24 | 16 | 14 | 4 | 0 |
| 5 | 0 | 1 | 1 | 0 | 6 | 7 | 14 | x | 0 | 0 | 0 | 4 | 6 | 12 | 1 |
| 6 | x | 0 | x | 28 | 16 | 15 | 2 | 0 | 1 | x | 0 | 0 | 0 | 0 | 0 |
| 7 | 0 | 1 | 1 | 0 | 0 | 4 | 8 | 1 | 1 | 1 | 4 | 10 | 9 | 14 | 0 |
| 8 | x | 0 | 0 | 16 | 16 | 12 | 8 | 0 | 1 | 1 | 0 | 0 | 1 | 2 | 1 |
| 9 | 0 | 1 | 1 | 0 | 0 | 1 | 2 | 1 | 1 | 1 | 16 | 16 | 12 | 8 | 0 |
| 10 | x | 0 | 0 | 4 | 10 | 9 | 14 | 0 | 1 | 1 | 0 | 0 | 4 | 8 | 1 |

TABLE 17-continued

5/6's Scaling Control

| VGA Line | M1C | W1E | G 1 | Coef 1 FF0 | FF1 | FF2 | FF3 | M2C | W2E | G 2 | Coef 2 FF0 | FF1 | FF2 | FF3 | W3E |
|---|---|---|---|---|---|---|---|---|---|---|---|---|---|---|---|
| 11 | 0 | 0 | 1 | 0 | 0 | 0 | 0 | 1 | 1 | 1 | 28 | 16 | 15 | 2 | 0 |
| 12 | x | 0 | 0 | 0 | 4 | 6 | 12 | 0 | 1 | 1 | 0 | 6 | 7 | 14 | 1 |

TABLE 18

3/4's Scaling Control

| VGA Line | M1C | W1E | G 1 | Coef 1 FF0 | FF1 | FF2 | FF3 | M2C | W2E | G 2 | Coef 2 FF0 | FF1 | FF2 | FF3 | W3E |
|---|---|---|---|---|---|---|---|---|---|---|---|---|---|---|---|
| 1 | 0 | 1 | 1 | 16 | 16 | 12 | 8 | x | 0 | 0 | 0 | 0 | 2 | 4 | 0 |
| 2 | 1 | 1 | 1 | 0 | 0 | 0 | 0 | x | 0 | 1 | 16 | 16 | 12 | 8 | 0 |
| 3 | 0 | 1 | 1 | 0 | 0 | 7 | 14 | x | 0 | 0 | 0 | 0 | 4 | 8 | 1 |
| 4 | x | 0 | x | 28 | 16 | 15 | 2 | 0 | 1 | x | 0 | 0 | 0 | 0 | 0 |
| 5 | 0 | 1 | 1 | 0 | 0 | 1 | 2 | 1 | 1 | 1 | 4 | 10 | 9 | 14 | 0 |
| 6 | x | 0 | 0 | 4 | 10 | 9 | 14 | 0 | 1 | 1 | 0 | 0 | 1 | 2 | 1 |
| 7 | x | 0 | 1 | 0 | 0 | 0 | 0 | 1 | 1 | 1 | 28 | 16 | 15 | 2 | 0 |
| 8 | x | 0 | 0 | 0 | 0 | 4 | 8 | 0 | 1 | 1 | 0 | 6 | 7 | 14 | 1 |

TABLE 19

7/10's Scaling Control (4-Line Flicker Filter)

| VGA Line | M1C | W1E | G 1 | Coef 1 FF0 | FF1 | FF2 | FF3 | M2C | W2E | G 2 | Coef 2 FF0 | FF1 | FF2 | FF3 | W3E |
|---|---|---|---|---|---|---|---|---|---|---|---|---|---|---|---|
| 1 | 0 | 1 | 1 | 24 | 16 | 14 | 4 | 1 | 1 | 1 | 0 | 0 | 0 | 0 | 0 |
| 2 | 1 | 1 | 1 | 0 | 0 | 3 | 6 | 0 | 1 | 1 | 0 | 4 | 6 | 12 | 0 |
| 3 | 0 | 1 | 1 | 12 | 14 | 11 | 10 | x | 0 | 0 | 0 | 0 | 0 | 0 | 1 |
| 4 | 1 | 1 | 1 | 0 | 0 | 0 | 0 | x | 0 | 1 | 20 | 16 | 13 | 6 | 0 |
| 5 | 0 | 1 | 1 | 0 | 0 | 4 | 8 | 1 | 1 | 0 | 0 | 2 | 5 | 10 | 0 |
| 6 | x | 0 | 0 | 16 | 16 | 12 | 8 | 0 | 1 | 1 | 0 | 0 | 0 | 0 | 1 |
| 7 | x | 0 | 1 | 0 | 0 | 0 | 0 | 1 | 1 | 1 | 16 | 16 | 12 | 8 | 0 |
| 8 | 1 | 1 | 0 | 0 | 2 | 5 | 10 | 0 | 1 | 1 | 0 | 0 | 4 | 8 | 0 |
| 9 | 0 | 1 | 1 | 20 | 16 | 13 | 6 | x | 0 | 0 | 0 | 0 | 0 | 0 | 1 |
| 10 | 1 | 1 | 1 | 0 | 0 | 0 | 0 | x | 0 | 1 | 12 | 14 | 11 | 10 | 0 |
| 11 | 0 | 1 | 1 | 0 | 4 | 6 | 12 | 1 | 1 | 0 | 0 | 0 | 3 | 6 | 0 |
| 12 | x | 0 | 0 | 24 | 16 | 14 | 4 | 0 | 1 | 1 | 0 | 0 | 0 | 0 | 1 |
| 13 | x | 0 | 1 | 0 | 0 | 0 | 0 | 1 | 1 | 1 | 8 | 12 | 10 | 12 | 0 |
| 14 | 1 | 1 | 0 | 0 | 6 | 7 | 14 | 0 | 1 | 1 | 0 | 0 | 2 | 4 | 0 |
| 15 | 0 | 1 | 1 | 28 | 16 | 15 | 2 | x | 0 | 0 | 0 | 0 | 0 | 0 | 1 |
| 16 | 1 | 1 | 1 | 0 | 0 | 0 | 0 | x | 0 | 1 | 4 | 10 | 9 | 14 | 0 |
| 17 | 0 | 1 | 1 | 4 | 10 | 10 | 16 | 1 | 1 | 0 | 0 | 0 | 1 | 2 | 0 |
| 18 | x | 0 | 0 | 28 | 16 | 15 | 2 | 0 | 1 | 1 | 0 | 0 | 0 | 0 | 1 |
| 19 | 0 | 1 | 1 | 0 | 0 | 2 | 4 | 1 | 1 | 1 | 0 | 6 | 7 | 14 | 0 |
| 20 | 1 | 0 | 0 | 8 | 12 | 10 | 12 | 0 | 1 | 1 | 0 | 0 | 0 | 0 | 1 |

TABLE 20

7/10's Scaling Control (5-Line Flicker Filter)

| VGA Line | M1C | W1E | G 1 | Coef 1 FF0 | FF1 | FF2 | FF3 | M2C | W2E | G 2 | Coef 2 FF0 | FF1 | FF2 | FF3 | W3E |
|---|---|---|---|---|---|---|---|---|---|---|---|---|---|---|---|
| 1 | 0 | 1 | 1 | 16 | 14 | 12 | 8 | 1 | 1 | 1 | 0 | 0 | 0 | 0 | 0 |
| 2 | 1 | 1 | 1 | 0 | 0 | 2 | 3 | 0 | 1 | 1 | 12 | 10 | 10 | 8 | 0 |
| 3 | 0 | 1 | 1 | 6 | 7 | 7 | 8 | x | 0 | 0 | 0 | 2 | 3 | 6 | 1 |
| 4 | 1 | 1 | 1 | 0 | 0 | 0 | 0 | x | 0 | 1 | 16 | 15 | 12 | 8 | 0 |
| 5 | 0 | 1 | 1 | 0 | 0 | 2 | 4 | 1 | 1 | 0 | 10 | 9 | 9 | 8 | 0 |
| 6 | x | 0 | 0 | 5 | 8 | 8 | 8 | 0 | 1 | 1 | 0 | 1 | 2 | 5 | 1 |

TABLE 20-continued

7/10's Scaling Control (5-Line Flicker Filter)

| VGA Line | M1C | W1E | G 1 | Coef 1 FF0 | FF1 | FF2 | FF3 | M2C | W2E | G 2 | Coef 2 FF0 | FF1 | FF2 | FF3 | W3E |
|---|---|---|---|---|---|---|---|---|---|---|---|---|---|---|---|
| 7  | x | 0 | 1 | 0  | 0  | 0  | 0 | 1 | 1 | 1 | 16 | 16 | 12 | 8 | 0 |
| 8  | 1 | 1 | 0 | 0  | 1  | 2  | 5 | 0 | 1 | 1 | 8  | 8  | 8  | 8 | 0 |
| 9  | 0 | 1 | 1 | 10 | 9  | 9  | 8 | x | 0 | 0 | 0  | 0  | 2  | 4 | 1 |
| 10 | 1 | 1 | 1 | 0  | 0  | 0  | 0 | x | 0 | 1 | 16 | 15 | 12 | 8 | 0 |
| 11 | 0 | 1 | 1 | 0  | 2  | 3  | 6 | 1 | 1 | 0 | 6  | 7  | 7  | 8 | 0 |
| 12 | x | 0 | 0 | 12 | 10 | 10 | 8 | 0 | 1 | 1 | 0  | 0  | 2  | 3 | 1 |
| 13 | x | 0 | 1 | 0  | 0  | 0  | 0 | 1 | 1 | 1 | 16 | 14 | 12 | 8 | 0 |
| 14 | 1 | 1 | 0 | 0  | 3  | 3  | 7 | 0 | 1 | 1 | 4  | 6  | 6  | 8 | 0 |
| 15 | 0 | 1 | 1 | 14 | 11 | 11 | 8 | x | 0 | 0 | 0  | 0  | 1  | 2 | 1 |
| 16 | 1 | 1 | 1 | 0  | 0  | 0  | 0 | x | 0 | 1 | 16 | 13 | 12 | 8 | 0 |
| 17 | 0 | 1 | 1 | 2  | 5  | 6  | 9 | 1 | 1 | 0 | 2  | 5  | 5  | 8 | 0 |
| 18 | x | 0 | 0 | 16 | 13 | 12 | 8 | 0 | 1 | 1 | 0  | 0  | 1  | 1 | 1 |
| 19 | 0 | 1 | 1 | 0  | 0  | 1  | 2 | 1 | 1 | 1 | 14 | 11 | 11 | 8 | 0 |
| 20 | x | 0 | 0 | 4  | 6  | 6  | 8 | 0 | 1 | 1 | 0  | 3  | 3  | 7 | 1 |

Figure 24:
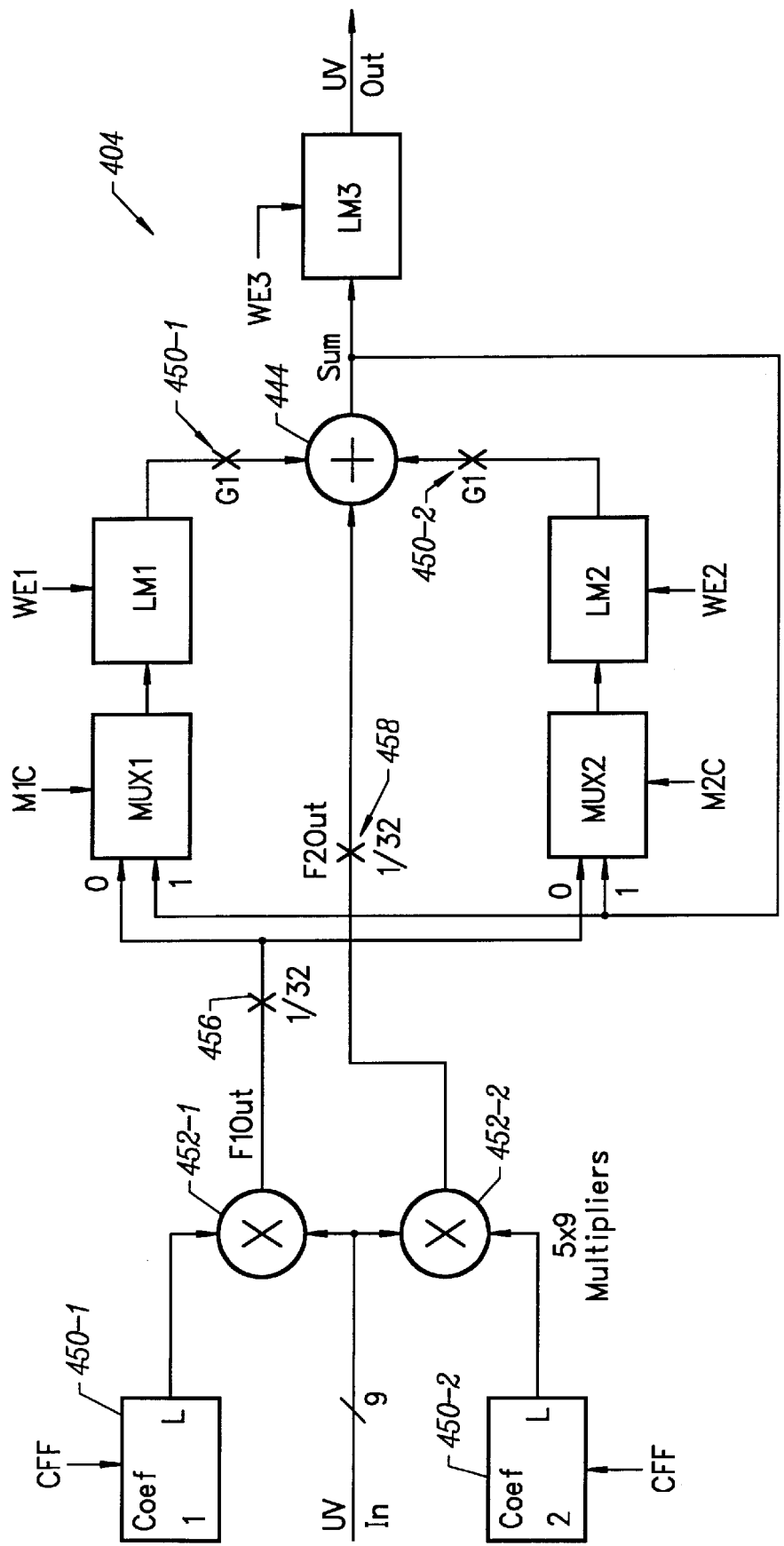
FIG. 24 is a block diagram illustrating additional details of a preferred embodiment of the chroma filter portion 404 of the scan converter circuitry of FIG. 22.

Referring to FIG. 24, there is shown a block diagram of a preferred embodiment of the chroma filter block 404. The chroma flicker filter 404 uses the same architecture and tables of coefficients as the luma flicker filter 402. However, in the preferred embodiment there is no high and low bandwidth separation of the chroma data. Thus, the chroma flicker filter 404 uses two fewer adders and multipliers than the luma flicker filter 402. In the preferred embodiment the luma and chroma filters 402, 404 are implemented as separate memories loaded with the same coefficients. However, this arrangement is not a requirement of the present invention (e.g., the luma and chroma filters 402, 404 can be implemented as the same memory).

In particular, the filter block 404 includes two multiplexers (MUX1, MUX2), three line memories (LM1, LM2, LM3), an adder 444 and one-bit multipliers 460-1, 460-2; these elements correspond to the MUX1, MUX2, LM1, LM2, LM3 and adder 408 of FIG. 22. On the preferred embodiment, the line memories LM1, LM2, LM3 together store no more than 3*GPPL pixels. For example, all GPPL graphics pixels, or only the GPPLA active graphics pixels, can be stored for each line of video. The filter block 404 also includes coefficient memories 450-1, 450-2, multipliers 452 and scaling multipliers 456, 458, which compose the coefficient lookup circuit 412 of FIG. 22.

Inputs to the filter block 404 include the chroma input UV; a CFF control signal coupled to the coefficient memories 450; multiplexer control signals M1C, M2C respectively coupled to the multipliers MUX1, MUX2; line memory write enable signals WE1, WE2, WE3 respectively coupled to the line memories LM1, LM2, LM3; and one-bit gain factors G1, G2 respectively coupled to the one-bit multipliers 460-1, 460-2. Apart from the UV signal the inputs to the chroma filter 404 are provided by the controller 420 (FIG. 22).

The coefficient memories 450 are controlled by the 2-bit CFF control signal, which selects one of four versions of the coefficients C1 or C2 to be output by a memory 450. Referring to the tables 14–20 shown above, the CFF control signal selects among the entries FF0, FF1, FF2 and FF3. The other table entries are stored or generated by the controller 420 in the same manner as the controller 320 (FIGS. 16, 21). The CFF signal selects between FF0, FF1, FF2 and FF3 as shown below:

CFF[1:0]=00 selects FF0 for output
CFF[1:0]=01 selects FF1 for output
CFF[1:0]=10 selects FF2 for output
CFF[1:0]=11 selects-FF3 for output One difference between the luma and chroma filter blocks 402, 404 is the different connection paths between the coefficient memories 450-1, 450-2 and the multiplexers MUX1, MUX2. In the chroma filter block 404 the coefficients output by the coefficient memories 450 are coupled to one input of a respective multiplier 452. The other input of the multipliers 452 is coupled to the chroma input signal UVin. The multiplier 452-1 outputs the product of C1 and UVin to the multiplier 458, which scales the product by 1/32 or 1/16 as in the luma flicker filter block 402 (i.e., the scale factor of 32 is used for all modes except for the 1/1 mode, for which the scale factor of 16 is used). The scaled product is coupled to the "0" inputs of the multiplexers MUX1, MUX2. The multiplier 452-2 outputs the product of C2 and UVin to the multiplier 456, which scales the product by 1/32 or 1/16 as just described. The scaled product is coupled to one input of the adder 444.

The settings for the operational parameters (M1, W1E, C1, G1, M2C, W2E, C2, G2, W3E) for 5/4's, 1/1's, 7/8's, 5/6's, 3/4's, 7/10's (w/4-line flicker filter) and 7/10's *w/5-line flicker filter) scaling modes are the same as the settings shown in Tables 14–20, respectively.

Referring to Appendix D, there are shown two tables (Table D1 and Table D2) that list some of the VGA and television signal characteristics associated with operational modes supported in a preferred embodiment of the present invention. The signal characteristics shown in Table D1 include:

| | |
|---|---|
| TV Format | NTSC br PAL, |
| Mode | A unique mode index, |
| Input Resolution | Graphics pixels per line x graphics lines per frame), |
| Scale Factor | TV lines per frame:Graphics lines per frame |
| Active TV Lines | Number of TV lines with viewable content. |
| Percent Overscan | Over/underscan percentage of the resulting scaled image when displayed on a television monitor (overscan is positive, underscan is negative), |
| Pixel Clock | Frequency of the output D/A converter, equivalent to TV pixel clock frequency (TVPCLK), |
| Horizontal total | TV pixels per line, |
| Vertical total | TV lines per frame. |

The signal characteristics shown in Table D2 are similar to those shown in Table D1. Additional information shown in Table D2 includes:

| | |
|---|---|
| IR[2:0] | a 3-bit field that designates the Input Resolution, |
| VOS[1:0] | A 2-bit field that designates the TV Format, |
| SR[2:0] | A 3-bit field that designates the Scale Factor. |

Appendix D is directed to a set of 29 modes (0–28) that are implemented in the Chrontel model CH7004 Digital VGA to NTSC/PAL Encoder. The possible settings are not limited to those illustrated in Appendix D. These settings can be stored and retrieved in the same manner described in reference to FIG. 15. Note that the modes 25–28 bypass the scaling section of the chip and therefore are not implemented in the conversion block 400 described herein.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

APPENDIX A

TABLE OF SCALING PARAMETERS IMPLEMENTED IN THE CHRONTEL CH7002 SCAN RATE CONVERTER

| | PAL OUT 640 × 480 IN | NTSC OUT 640 × 480 IN | PAL OUT 800 × 600 IN | NTSC OUT 800 × 600 IN |
|---|---|---|---|---|
| 1:1 Scale Factor | Mode 1 | Mode 2 | Mode 5 | NA |
| # of VGA Lines | 625 | 525 | 625 | |
| # of VGA Pixels/Line | 800 | 800 | 944 | |
| VGA Horizontal Freq.$_{(KHz)}$ | 31.2500 | 31.4685 | 31.2500 | |
| VGA Pixel Freq.$_{(Mhz)}$ | 25.0000 | 25.1748 | 29.5000 | |
| A/D Clock Freq.$_{(Mhz)}$ | 25.0000$_{(800)}$ | 25.1748$_{(800)}$ | 25.0000$_{(800)}$ | |
| D/A Clock Freq$_{(Mhz)}$ | 28.1250$_{(900)}$ | 25.1748$_{(800)}$ | 25.0000$_{(800)}$ | |
| # of TV Lines | 625 | 525 | 625 | |
| # of TV Pixels/TV Line | 1800 | 1600 | 1600 | |
| Over/Under Scan$_{(\%)}$ | −16V, −13H | 0V, −2H | +4 | |
| Aspect Ratio$_{(Hor/Ver)}$ | 1.040/1 | 0.975/1 | 0.997/1 | |
| 7:8 Scale Factor | NA | Mode 3 | NA | NA |
| # of VGA Lines | | 600 | | |
| # of VGA Pixels/Line | | 784 | | |
| VGA Horizontal Freq.$_{(KHz)}$ | | 35.9640 | | |
| VGA Pixel Freq.$_{(Mhz)}$ | | 28.1958 | | |
| A/D Clock Freq.$_{(Mhz)}$ | | 28.1958$_{(784)}$ | | |
| D/A Clock Freq$_{(Mhz)}$ | | 28.1958$_{(784)}$ | | |
| # of TV Lines | | 525 | | |
| # of TV Pixels/TV Line | | 1792 | | |
| Over/Under Scan$_{(\%)}$ | | −13 | | |
| Aspect Ratio$_{(Hor/Ver)}$ | | 0.995/1 | | |
| 5:6 Scale Factor | NA | NA | Mode 0 | NA |
| # of VGA Lines | | | 750 | |
| # of VGA Pixels/Line | | | 944 | |
| VGA Horizontal Freq.$_{(KHz)}$ | | | 37.5000 | |
| VGA Pixel Freq.$_{(Mhz)}$ | | | 35.4000 | |
| A/D Clock Freq.$_{(Mhz)}$ | | | 30.0000$_{(800)}$ | |
| D/A Clock Freq$_{(Mhz)}$ | | | 30.0000$_{(800)}$ | |
| # of TV Lines | | | 625 | |
| # of TV Pixels/TV Line | | | 1920 | |
| Over/Under Scan$_{(\%)}$ | | | −13 | |
| Aspect Ratio$_{(Hor/Ver)}$ | | | 0.998/1 | |
| 3:4 Scale Factor | NA | NA | NA | Mode 6 |
| # of VGA Lines | | | | 700 |
| # of VGA Pixels/Line | | | | 1040 |
| VGA Horizontal Freq.$_{(KHz)}$ | | | | 41.9581 |
| VGA Pixel Freq.$_{(Mhz)}$ | | | | 43.6364 |
| A/D Clock Freq.$_{(Mhz)}$ | | | | 33.5664$_{(800)}$ |
| D/A Clock Freq$_{(Mhz)}$ | | | | 25.1748$_{(600)}$ |
| # of TV Lines | | | | 525 |
| # of TV Pixels/TV Line | | | | 1600 |
| Over/Under Scan$_{(\%)}$ | | | | −6 |
| Aspect Ratio$_{(Hor/Ver)}$ | | | | 0.999/1 |
| 7:6 Scale Factor | NA | NA | NA | NA |
| # of VGA Lines | | | | |
| # of VGA Pixels/Line | | | | |
| VGA Horizontal Freq.$_{(KHz)}$ | | | | |
| VGA Pixel Freq.$_{(Mhz)}$ | | | | |
| A/D Clock Freq.$_{(Mhz)}$ | | | | |
| D/A Clock Freq$_{(Mhz)}$ | | | | |
| # of TV Lines | | | | |
| # of TV Pixels/TV Line | | | | |
| Over/Under Scan$_{(\%)}$ | | | | |
| Aspect Ratio$_{(Hor/Ver)}$ | | | | |

APPENDIX B

TABLE OF POSSIBLE SCALING PARAMETERS

| | PAL OUT 640 × 480 IN | NTSC OUT 640 × 480 IN | PAL OUT 800 × 600 IN | NTSC OUT 800 × 600 IN |
|---|---|---|---|---|
| 1:1 Scale Factor | | | | NA |
| # of VGA Lines | 625 | 525 | 625 | |
| # of VGA Pixels/Line | 840 | 784 | 840 | |
| VGA Horizontal Freq.$_{(KHz)}$ | 31.2500 | 31.4685 | 31.2500 | |
| VGA Pixel Freq.$_{(Mhz)}$ | 26.2500 | 24.6713 | 26.2500 | |
| A/D Clock Freq.$_{(Mhz)}$ | 26.2506$_{(840)}$ | 24.6713$_{(784)}$ | 26.2500$_{(840)}$ | |
| D/A Clock Freq$_{(Mhz)}$ | 29.5313$_{(945)}$ | 24.6713$_{(784)}$ | 29.5313$_{(945)}$ | |
| # of TV Lines | 625 | 525 | 625 | |
| # of TV Pixels/TV Line | 1890 | 1568 | 1890 | |
| Over/Under Scan$_{(\%)}$ | −17 | 0 | +4 | |
| Aspect Ratio$_{(Hor/Ver)}$ | 0.996/1 | 0.995/1 | 0.997/1 | |
| 7:8 Scale Factor | | | | NA |
| # of VGA Lines | 712 | 600 | 712 | |
| # of VGA Pixels/Line | 840 | 784 | 840 | |
| VGA Horizontal Freq.$_{(KHz)}$ | 35.7143 | 35.9640 | 35.7143 | |
| VGA Pixel Freq.$_{(Mhz)}$ | 30.0000 | 28.1958 | 30.0000 | |
| A/D Clock Freq.$_{(Mhz)}$ | 30.0000$_{(840)}$ | 28.1958$_{(784)}$ | 30.0000$_{(840)}$ | |
| D/A Clock Freq$_{(Mhz)}$ | 33.7500$_{(945)}$ | 28.1958$_{(784)}$ | 33.7500$_{(945)}$ | |
| # of TV Lines | 623 | 525 | 623 | |
| # of TV Pixels/TV Line | 2160 | 1792 | 2160 | |
| Over/Under Scan$_{(\%)}$ | −27 | −13 | −9 | |
| Aspect Ratio$_{(Hor/Ver)}$ | 0.996/1 | 0.995/1 | 0.997/1 | |
| 5:6 Scale Factor | | | | |
| # of VGA Lines | 750 | 630 | 750 | 630 |
| # of VGA Pixels/Line | 840 | 800 | 840 | 1040 |
| VGA Horizontal Freq.$_{(KHz)}$ | 37.5000 | 37.7622 | 37.5000 | 37.7622 |
| VGA Pixel Freq.$_{(Mhz)}$ | 31.5000 | 30.2098 | 31.5000 | 39.2727 |
| A/D Clock Freq.$_{(Mhz)}$ | 31.5000$_{(840)}$ | 30.2098$_{(800)}$ | 31.5000$_{(840)}$ | 31.7203$_{(840)}$ |
| D/A Clock Freq$_{(Mhz)}$ | 35.4375$_{(945)}$ | 30.2098$_{(800)}$ | 35.4375$_{(945)}$ | 23.7902$_{(630)}$ |
| # of TV Lines | 625 | 525 | 625 | 525 |
| # of TV Pixels/TV Line | 2268 | 1920 | 2268 | 1512 |
| Over/Under Scan$_{(\%)}$ | −31 | −17 | −13 | +4 |
| Aspect Ratio$_{(Hor/Ver)}$ | 0.997/1 | 0.975/1 | 0.997/1 | 0.999/1 |
| 3:4 Scale Factor | | | | |
| # of VGA Lines | 836 | 700 | 836 | 700 |
| # of VGA Pixels/Line | 840 | 792 | 840 | 1040 |
| VGA Horizontal Freq.$_{(KHz)}$ | 41.6667 | 41.9581 | 41.6667 | 41.9581 |
| VGA Pixel Freq.$_{(Mhz)}$ | 35.0000 | 33.2308 | 35.0000 | 43.6364 |
| A/D Clock Freq.$_{(Mhz)}$ | 35.0000$_{(840)}$ | 33.2308$_{(792)}$ | 35.0000$_{(840)}$ | 35.2448$_{(840)}$ |
| D/A Clock Freq$_{(Mhz)}$ | 39.3750$_{(945)}$ | 33.2308$_{(792)}$ | 39.3750$_{(945)}$ | 26.4336$_{(630)}$ |
| # of TV Lines | 627 | 525 | 627 | 525 |
| # of TV Pixels/TV Line | 2520 | 2112 | 2520 | 1680 |
| Over/Under Scan$_{(\%)}$ | −38 | −25 | −22 | −6 |
| Aspect Ratio$_{(Hor/Ver)}$ | 0.997/1 | 0.985/1 | 0.996/1 | 0.999/1 |
| 7:6 Scale Factor | | NA | NA | NA |
| # of VGA Lines | 534 | | | |
| # of VGA Pixels/Line | 840 | | | |
| VGA Horizontal Freq.$_{(KHz)}$ | 26.7857 | | | |
| VGA Pixel Freq.$_{(Mhz)}$ | 22.5000 | | | |
| A/D Clock Freq.$_{(Mhz)}$ | 22.5000$_{(840)}$ | | | |
| D/A Clock Freq$_{(Mhz)}$ | 25.3125$_{(945)}$ | | | |
| # of TV Lines | 623 | | | |
| # of TV Pixels/TV Line | 1620 | | | |
| Over/Under Scan$_{(\%)}$ | −3 | | | |
| Aspect Ratio$_{(Hor/Ver)}$ | 0.997/1 | | | |

APPENDIX C: TABLE OF SCALING PARAMETERS IMPLEMENTED IN THE CHRONTEL CH7003 SCAN THE CONVERTER

Display Modes

The CH7003 display mode is controlled by three Independent factors: input resolution, TV format, and scale factor, which are programmed via the display mode register. It is designed to accept input resolutions of 640×480, 800×600, 640×400 (including 320×200 scan-doubled output), 720×400, and 512×384. It is designed to support output to either NTSC or PAL television formats. The CH7003 provides interpolated scaling with selected factors of 5:4, 1:1, 7:8, 5:6, 3:4, and 7:10, in order to support adjustable overscan or underscan operation when displayed on a TV. This combination of factors results in a matrix of useful operating modes which are listed in detail in Table C-1.

The inclusion of multiple levels of scaling for each resolution have been created to enable optimal use of the CH7003 for different application needs. In general, underscan (modes where percent overscan is negative) provides an image that is viewable in its entirety on screen; it should be used as the default for most applications (e.g., viewing text screens, operating games, running productivity applications, working within Windows). Overscanning provides an image that extends past the edges of the TV screen, exactly like normal television programs and movies appear on TV, and is only recommended for viewing movies or video clips coming from the computer.

Another view of the modes is shown in Table C-2, which lists 25 modes (the 25 from the preceding table) supported by the CH7003. Each mode is associated with a unique combination of values of three fields: IR (three bits), VOS (2 bits) and SR (three bits). The VOS register indicates whether the TV format is PAL (VOS=00) or NTSC (OS=01). The IR register indicates whether the input resolution (i.e., number of active VGA pixels x active VGA lines) is 512×384 (IR=000), 720×400 (IR=001), 640×400 (IR=010), 640×480 (SR=011) and 800×600 R=100). The SR register Indicates whether the scaling factor is 5/4 (SR=000), 1/1 (SR=001), 7/8 (SR=01), 5/6 (SR=011), 3/4 (SR=100) and 7/10 (SR=101).

TABLE C-1

CH7003 Display Modes

| TV Format Standard; Mode | Input (active) Resolution | Scale Factor | Active TV Lines | Percent (1) Overscan | Pixel Clock | Horizontal Total | Vertical Total |
|---|---|---|---|---|---|---|---|
| NTSC; 16 | 640 × 480 | 1:1 | 480 | 10% | 24.671 | 784 | 525 |
| NTSC; 17 | 640 × 480 | 7:8 | 420 | (3%) | 28.169 | 784 | 600 |
| NTSC; 18 | 640 × 480 | 5:6 | 400 | (8%) | 30.210 | 800 | 630 |
| NTSC; 22 | 800 × 600 | 5:6 | 500 | 16% | 39.293 | 1040 | 630 |
| NTSC; 23 | 800 × 600 | 3:4 | 450 | 4% | 43.636 | 1040 | 700 |
| NTSC; 24 | 800 × 600 | 7:10 | 420 | 93%) | 47.832 | 1064 | 750 |
| NTSC; 10 | 640 × 400 | 5:4 | 500 | 16% | 21.147 | 840 | 420 |
| NTSC; 11 | 640 × 400 | 1:1 | 400 | (8%) | 26.434 | 840 | 525 |
| NTSC; 12 | 640 × 400 | 7:8 | 350 | (19%) | 30.210 | 840 | 600 |
| NTSC; 6 | 720 × 400 | 5:4 | 500 | 16% | 23.790 | 945 | 420 |
| NTSC; 7 | 720 × 400 | 1:1 | 400 | (8%) | 29.455 | 936 | 525 |
| NTSC; 2 | 512 × 384 | 5:4 | 480 | 10% | 20.140 | 800 | 420 |
| NTSC; 3 | 512 × 384 | 1:1 | 384 | (11%) | 24.671 | 784 | 525 |
| PAL; 13 | 640 × 480 | 5:4 | 600 | 14% | 21.000 | 840 | 500 |
| PAL; 14 | 640 × 480 | 1:1 | 480 | (8%) | 26.250 | 840 | 625 |
| PAL; 15 | 640 × 480 | 5:6 | 400 | (29%) | 31.500 | 840 | 750 |
| PAL; 19 | 800 × 600 | 1:1 | 600 | 14% | 29.500 | 944 | 625 |
| PAL; 20 | 800 × 600 | 5:6 | 500 | (4%) | 36.000 | 960 | 750 |
| PAL; 21 | 800 × 600 | 3:4 | 450 | (15%) | 39.000 | 936 | 836 |
| PAL; 8 | 640 × 400 | 5:4 | 500 | (4%) | 25.000 | 1000 | 500 |
| PAL; 9 | 640 × 400 | 1:1 | 400 | (29%) | 31.500 | 1008 | 625 |
| PAL; 4 | 720 × 400 | 5:4 | 500 | (4%) | 28.125 | 1125 | 500 |
| PAL; 5 | 720 × 400 | 1:1 | 400 | (29%) | 34.875 | 1116 | 625 |
| PAL; 0 | 512 × 384 | 5:4 | 480 | (8%) | 21.000 | 840 | 500 |
| PAL; 1 | 512 × 384 | 1:1 | 384 | (35%) | 26.250 | 840 | 625 |

Note: Percent underscan is a calculated value based on average viewable lines on each TV format, assuming an average TV overscan of 10%. Negative values ( ) indicate modes which are operating in underscan.
For NTSC: 480 active lines - 10% (overscan) = 432 viewable lines (average)
For PAL: 576 active lines - 10% (overscan) = 518 viewable lines (average)

TABLE C-2

Mode Selection

| Mode | IR [2:0] | VOS [1:0] | SR [2:0] | Input Data Format (Active Video) | Total Pixels/Line × Total Lines/Frame | Output Format | Scaling | Pixel Clock (MHz) |
|---|---|---|---|---|---|---|---|---|
| 0 | 000 | 00 | 000 | 512 × 384 | 840 × 500 | PAL | 5/4 | 21.000000 |
| 1 | 000 | 00 | 001 | 512 × 384 | 840 × 625 | PAL | 1/1 | 26.250000 |
| 2 | 000 | 01 | 000 | 512 × 384 | 800 × 420 | NTSC | 5/4 | 20.139860 |
| 3 | 000 | 01 | 001 | 512 × 384 | 784 × 525 | NTSC | 1/1 | 24.671329 |
| 4 | 001 | 00 | 000 | 720 × 400 | 1125 × 500 | PAL | 5/4 | 28.125000 |
| 5 | 001 | 00 | 001 | 720 × 400 | 1116 × 625 | PAL | 1/1 | 34.875000 |
| 6 | 001 | 01 | 000 | 720 × 400 | 945 × 420 | NTSC | 5/4 | 23.790210 |
| 7 | 001 | 01 | 001 | 720 × 400 | 936 × 525 | NTSC | 1/1 | 29.454545 |
| 8 | 010 | 00 | 000 | 640 × 400 | 1000 × 500 | PAL | 5/4 | 25.000000 |
| 9 | 010 | 00 | 001 | 640 × 400 | 1008 × 625 | PAL | 1/1 | 31.500000 |
| 10 | 010 | 01 | 000 | 640 × 400 | 840 × 420 | NTSC | 5/4 | 21.146853 |
| 11 | 010 | 01 | 001 | 640 × 400 | 840 × 525 | NTSC | 1/1 | 26.433566 |
| 12 | 010 | 01 | 010 | 640 × 400 | 840 × 600 | NTSC | 7/8 | 30.209790 |
| 13 | 011 | 00 | 000 | 640 × 480 | 840 × 500 | PAL | 5/4 | 21.000000 |
| 14 | 011 | 00 | 001 | 640 × 480 | 840 × 625 | PAL | 1/1 | 26.250000 |
| 15 | 011 | 00 | 011 | 640 × 480 | 840 × 750 | PAL | 5/6 | 31.500000 |
| 16 | 011 | 01 | 001 | 640 × 480 | 784 × 525 | NTSC | 1/1 | 24.671329 |
| 17 | 011 | 01 | 010 | 640 × 480 | 784 × 600 | NTSC | 7/8 | 28.195804 |
| 18 | 011 | 01 | 011 | 640 × 480 | 800 × 630 | NTSC | 5/6 | 30.209790 |
| 19 | 100 | 00 | 001 | 800 × 600 | 944 × 625 | PAL | 1/1 | 29.500000 |
| 20 | 100 | 00 | 011 | 800 × 600 | 960 × 750 | PAL | 5/6 | 36.000000 |

TABLE C-2-continued

Mode Selection

| Mode | IR [2:0] | VOS [1:0] | SR [2:0] | Input Data Format (Active Video) | Total Pixels/Line × Total Lines/Frame | Output Format | Scaling | Pixel Clock (MHz) |
|---|---|---|---|---|---|---|---|---|
| 21 | 100 | 00 | 100 | 800 × 600 | 936 × 836 | PAL | 3/4 | 39.000000 |
| 22 | 100 | 01 | 011 | 800 × 600 | 1040 × 630 | NTSC | 5/6 | 39.272727 |
| 23 | 100 | 01 | 100 | 800 × 600 | 1040 × 700 | NTSC | 3/4 | 43.636364 |
| 24 | 100 | 01 | 101 | 800 × 600 | 1064 × 750 | NTSC | 7/10 | 47.832168 |

APPENDIX D: TABLE OF SCALING PARAMETERS IMPLEMENTED IN THE CHRONTEL CH7004 SCAN RATE CONVERTER

Display Modes

The CH7004 display mode is controlled by three independent factors: input resolution, TV format, and scale factor, which are programmed via the display mode register. It is designed to accept input resolutions of 640×480, 800×600, 640×400 (including 320×200 scan-doubled output), 720×400, and 512×384. It is designed to support output to either NTSC or PAL television formats. The CH7004 provides interpolated scaling with selected factors of 5:4, 1:1, 7:8, 5:6, 3:4 and 7:10, in order to support adjustable overscan or underscan operation when displayed on a TV. This combination of factors results in a matrix of useful operating modes, which are listed in detail in Table D-1.

The inclusion of multiple levels of scaling for each resolution have been created to enable optimal use of the CH7004 for different application needs. In general, underscan (modes where percent overscan is negative) provides an image that is viewable in its entirety on screen; it should be used as the default for most applications (e.g., viewing text screens, operating games, running productivity applications, working within Windows). Overscanning provides an image that extends past the edges of the TV screen, exactly like normal television programs and movies appear on TV, and is only recommended for viewing movies or video clips coming from the computer. In addition to the above mode table, the CH7004 also supports interlaced input modes, both in CCIR 656 and proprietary formats (see Display Mode Register section).

Another view of the modes is shown in Table D-2, which lists 29 modes (the 25 from the preceding table and additional Interlaced modes) supported by the CH7004. Each mode is associated with a unique combination of values of three fields: IR (three bits), VOS (2 bits) and SR (three bits). The VOS register indicates whether the TV format is PAL (VOS=00) or NTSC (VOS=01). The IR register indicates whether the Input resolution (i.e., number of active VGA pixels×active VGA lines) is 512×384 (IR=000), 720×400 (IR=001), 640×400 (IR=010), 800×600 30 OPR=100), or one of the interlaced input modes 720×576 or 480 (IR=101) and 800×600 or 400 (IR=110). The SR register indicates whether the scaling factor is 5/4 (SR=000), 1/1 (SR=001), 7/8 (SR=010), 5/6 (SR=011), 3/4 (SR=100) and 7/10 (SR=101).

TABLE D-1

CH7004 Display Modes

| TV Format Standard; Mode | Input (active) Resolution | Scale Factor | Active TV Lines | Percent (1) Overscan | Pixel Clock | Horizontal Total | Vertical Total |
|---|---|---|---|---|---|---|---|
| NTSC; 16 | 640 × 480 | 1:1 | 480 | 10% | 24.671 | 784 | 525 |
| NTSC; 17 | 640 × 480 | 7:8 | 420 | (3%) | 28.196 | 784 | 600 |
| NTSC; 18 | 640 × 480 | 5:6 | 400 | (8%) | 30.210 | 800 | 630 |
| NTSC; 22 | 800 × 600 | 5:6 | 500 | 16% | 29.273 | 1040 | 630 |
| NTSC; 23 | 800 × 600 | 3:4 | 450 | 4% | 43.636 | 1040 | 700 |
| NTSC; 24 | 800 × 600 | 7:10 | 420 | (3%) | 47.832 | 1064 | 750 |
| NTSC; 10 | 640 × 400 | 5:4 | 500 | 16% | 21.147 | 840 | 420 |
| NTSC; 11 | 640 × 400 | 1:1 | 400 | (8%) | 26.434 | 840 | 525 |
| NTSC; 12 | 640 × 400 | 7:8 | 350 | (19%) | 30.210 | 840 | 600 |
| NTSC; 6 | 720 × 400 | 5:4 | 500 | 16% | 23.790 | 945 | 420 |
| NTSC; 7 | 720 × 400 | 1:1 | 400 | (8%) | 29.455 | 936 | 525 |
| NTSC; 2 | 512 × 384 | 5:4 | 480 | 10% | 20.140 | 800 | 420 |
| NTSC; 3 | 512 × 384 | 1:1 | 384 | (11%) | 24.671 | 784 | 525 |
| PAL; 13 | 640 × 480 | 5:4 | 600 | 14% | 21.000 | 840 | 500 |
| PAL; 14 | 640 × 480 | 1:1 | 480 | (8%) | 26.250 | 840 | 625 |
| PAL; 15 | 640 × 480 | 5:6 | 400 | (29%) | 31.500 | 840 | 750 |
| PAL; 19 | 800 × 600 | 1:1 | 600 | 14% | 29.500 | 944 | 625 |
| PAL; 20 | 800 × 600 | 5:6 | 500 | (4%) | 36.000 | 960 | 750 |
| PAL; 21 | 800 × 600 | 3:4 | 450 | (15%) | 39.000 | 936 | 836 |
| PAL; 8 | 640 × 400 | 5:4 | 500 | (4%) | 25.000 | 1000 | 500 |
| PAL; 9 | 640 × 400 | 1:1 | 400 | (29%) | 31.500 | 1008 | 625 |
| PAL; 4 | 720 × 400 | 5:4 | 500 | (4%) | 28.125 | 1125 | 500 |
| PAL; 5 | 720 × 400 | 1:1 | 400 | (29%) | 34.875 | 1116 | 625 |

TABLE D-1-continued

CH7004 Display Modes

| TV Format Standard; Mode | Input (active) Resolution | Scale Factor | Active TV Lines | Percent (1) Overscan | Pixel Clock | Horizontal Total | Vertical Total |
|---|---|---|---|---|---|---|---|
| PAL; 0 | 512 × 384 | 5:4 | 480 | (8%) | 21.000 | 840 | 500 |
| PAL; 1 | 512 × 384 | 1:1 | 384 | (35%) | 26.250 | 840 | 625 |

Note: Percent underscan is a calculated value based on average viewable lines on each TV format, assuming an average TV overscan of 10%. Negative values ( ) indicate modes which are operating in underscan.
For NTSC: 480 active lines - 10% (overscan) = 432 viewable lines (average)
For PAL: 576 active lines - 10% (overscan) = 518 viewable lines (average)

TABLE D-2

Display Modes

| Mode | IR [2:0] | VOS [1:0] | SR [2:0] | Input Data Format (Active Video) | Total Pixels/Line × Total Lines/Frame | Output Format | Scaling | Pixel Clock (MHz) |
|---|---|---|---|---|---|---|---|---|
| 0  | 000 | 00 | 000 | 512 × 384 | 840 × 500 | PAL | 5/4 | 21.000000 |
| 1  | 000 | 00 | 001 | 512 × 384 | 840 × 625 | PAL | 1/1 | 26.250000 |
| 2  | 000 | 01 | 000 | 512 × 384 | 800 × 420 | NTSC | 5/4 | 20.129860 |
| 3  | 000 | 01 | 001 | 512 × 384 | 784 × 525 | NTSC | 1/1 | 24.671329 |
| 4  | 001 | 00 | 000 | 720 × 400 | 1125 × 500 | PAL | 5/4 | 28.125000 |
| 5  | 001 | 00 | 001 | 720 × 400 | 1116 × 625 | PAL | 1/1 | 34.875000 |
| 6  | 001 | 01 | 000 | 720 × 400 | 945 × 420 | NTSC | 5/4 | 23.790210 |
| 7  | 001 | 01 | 001 | 720 × 400 | 936 × 525 | NTSC | 1/1 | 29.454545 |
| 8  | 010 | 00 | 010 | 640 × 400 | 1000 × 500 | PAL | 5/4 | 25.000000 |
| 9  | 010 | 00 | 001 | 640 × 400 | 1008 × 625 | PAL | 1/1 | 31.500000 |
| 10 | 010 | 01 | 000 | 640 × 400 | 840 × 420 | NTSC | 5/4 | 21.146853 |
| 11 | 010 | 01 | 001 | 640 × 400 | 840 × 525 | NTSC | 1/1 | 31.500000 |
| 12 | 010 | 01 | 010 | 640 × 400 | 840 × 600 | NTSC | 7/8 | 30.209790 |
| 13 | 011 | 00 | 000 | 640 × 480 | 840 × 500 | PAL | 5/4 | 21.000000 |
| 14 | 011 | 00 | 001 | 640 × 480 | 840 × 625 | PAL | 1/1 | 26.250000 |
| 15 | 011 | 00 | 011 | 640 × 480 | 840 × 750 | PAL | 5/6 | 31.500000 |
| 16 | 011 | 01 | 001 | 640 × 480 | 784 × 525 | NTSC | 1/1 | 24.671329 |
| 17 | 011 | 01 | 010 | 640 × 480 | 784 × 600 | NTSC | 7/8 | 28.195804 |
| 18 | 011 | 01 | 011 | 640 × 480 | 800 × 630 | NTSC | 5/6 | 30.209790 |
| 19 | 100 | 00 | 001 | 800 × 600 | 944 × 625 | PAL | 1/1 | 29.500000 |
| 20 | 100 | 00 | 011 | 800 × 600 | 960 × 750 | PAL | 5/6 | 36.000000 |
| 21 | 100 | 00 | 100 | 800 × 600 | 936 × 836 | PAL | 3/4 | 39.000000 |
| 22 | 100 | 01 | 011 | 800 × 600 | 1040 × 630 | NTSC | 5/6 | 39.272727 |
| 23 | 100 | 01 | 100 | 800 × 600 | 1040 × 700 | NTSC | 3/4 | 43.636364 |
| 24 | 100 | 01 | 101 | 800 × 600 | 1064 × 750 | NTSC | 7/10 | 47.832168 |
| 25* | 101 | 00 | 001 | 720 × 576 | 864 × 625 | PAL | 1/1 | 13.500000 |
| 26* | 101 | 01 | 001 | 720 × 480 | 858 × 525 | NTSC | 1/1 | 13.500000 |
| 27* | 110 | 00 | 001 | 800 × 600 | 1135 × 625 | PAL | 1/1 | 17.734375 |
| 28* | 110 | 01 | 001 | 640 × 400 | 910 × 525 | NTSC | 1/1 | 14.318182 |

*Interlaced modes of operation.

What is claimed is:

1. A method to convert computer graphics signals to television video signals with vertical and horizontal scaling, comprising the steps of:

(1) based on a predetermined computer image format associated with an input image represented by the computer graphics signals and a predetermined television display format in which the television video signals representing a corresponding television image are to be displayed, determining:

a television display lines per frame setting (TVLPF) representing the desired number of television lines per frame, a television horizontal frequency setting (TVHF), a graphics display lines per frame setting (GLPF), a fractional scale factor K representing percentage of vertical scaling to be applied to the input image, a graphics horizontal frequency setting (GHF), a graphics pixels per line setting (GPPL) and a television pixels per line setting (TVPPL), and a graphics pixel clock frequency setting (GPF);

(2) receiving from a video source computer graphics pixels composing the computer graphics signals in accordance with the GHF, GLPF, GPPL and GPG;

(3) providing a readout clock running at a television pixel frequency (TVPF) that governs the rate at which television pixels composing the television signals are provided;

(4) providing storage for at most 3*GPPL of the graphics pixels;

(5) storing no more than GPPL pixels per new line of the computer graphics signals as the new line graphics signals are provided, each newly stored pixel being selected from (a) a linear combination of a previously stored pixel and a pixel from the new line graphics signals and (b) a scaled version of the pixel from the new line;

(6) when the pixel clock indicates the beginning of a new graphics line:

determining screen position of the new graphics line relative to screen positions of a predetermined subset of graphics lines to be used to form a new television line-and screen position of the new television line being generated, and subsequently reading out the television signals for the new television line, wherein each television signal pixel composing the new television line represents a weighted sum of corresponding stored graphics pixels from the predetermined subset that minimizes flicker in the television image by compensating for differences in the screen positions of the new television line and each of the predetermined subset; and (7) when the readout clock indicates that all stored graphics pixels of the predetermined subset have been processed, reading out blank television pixels for the new television line until the total of the television pixels read out for the new television line equals the TYPPL;

the television image thereby fitting fully within the television display and having an aspect ratio identical to the aspect ratio of the image.

2. The method of claim 1, wherein:

the predetermined subset of the stored lines comprises stored lines of the input image that fall within a predefined distance of the new television line;

the screen position determining step comprises determining respective degree of overlap between each member line of the predetermined subset distance and the new television line; and weights used to compute the weighted sum comprise a respective weight for each member line that represents the degree of overlap between that member line and the new television line.

3. The method of claim 1, further comprising the steps of:

determining a repeat value (RV) representing a number of input image lines after which the predetermined subset and the new television line are in the same relative positions and the beginning of one member line of the predetermined subset and the new television line coincide;

identifying all possible arrangements of the member lines and the new television line, the total number of different arrangements equaling the RV; and associating a respective set of weights with each different arrangement;

such that the step of reading out the television signals comprises:

when a new input image line begins, determining from values of the pixel clock which of the possible arrangements describes a current arrangement of the member lines and the new television line; and setting the weights used to compute the weighted sum to the respective set of weights associated with the current arrangement.

4. The method of claim 1, further comprising the step of:

defining a set of modes defined by combinations of the predetermined computer image formats and the predetermined television display formats, wherein each of the set of modes defines settings associated with that mode, including:

the television display lines per frame setting (TLPF), the graphics display lines per frame setting (GLPF), the television pixels per line setting (TVPPL), and the graphics pixels per line setting (GPPL),
the television pixel clock frequency setting (TVPF), and
the graphics pixel clock frequency setting (GPF).

5. The method of claim 4, wherein the combinations of the predetermined computer image formats and the predetermined television display formats comprise combinations of:

a television format selected from PAL or NTSC;

a graphics image format defined in terms of the GPPL and the GLPF, including 640×480 and 800×600; and the fraction scaling factor K selected from 1/1, 3/4, 5/4, 5/6, 7/8 or 7/10.

6. The method of claim 1, wherein the GPPL and TVPPL determining step comprises:

determining, when the method is implemented with the GPF equal to the TVPF, graphics pixels per line (GPPL) and television pixels per line (TVPPL) so that the following equation holds:

$$\frac{TVPPL \times TVLPF}{2 \times GLPF} = \text{integer} = GPPL$$

determining, when the method is implemented with the GPF different from the TVPF, graphics pixels per line (GPPL) and television pixels per line (TVPPL) so that the following equation holds, wherein the factor 1/2*PIQ provides the ratio between television memory read and write frequencies:

$$\frac{TVPPL \times TVLPF}{2 \times (P/Q) \times GLPF} = \text{integer} = GPPL.$$

7. A method to convert computer graphics signals to television video signals with vertical and horizontal scaling, comprising the steps of:

(1) providing storage for less than a full frame's worth of graphics pixels per video component;

(2) storing the graphics pixels as they are provided so that each newly stored pixel is selected from (a) a linear combination of a previously stored pixel and a pixel from the graphics signals of a new line and (b) a scaled version of the pixel from the new line; and (3) in a repeating pattern for every RV VGA lines, where IRV≧2, generating television pixels composing the television video signals from a weighted sum of the stored graphics pixels such that a different precomputed set of weights are used to compute the television pixels for each of the generated television lines.

8. The method of claim 7, wherein the precomputed set of weights used to compute the weighted sum comprises a respective weight for each member line within said storage that represents a degree of overlap between that member line and a new television line being generated.

9. A system to convert computer graphics signals to television video signals with vertical and horizontal scaling so that a computer video image can be entirely displayed on a television display, comprising:

a source of computer graphics signals that provides graphics pixels composing the graphics signals in accordance with a selectable graphics pixel frequency (GPF), graphics lines per frame setting (GLPF) and graphics pixels per line setting (GPPL);

storage for less than a full frame's worth of graphics pixels per video component;

a scan rate converter that performs the horizontal and vertical scaling on the computer graphics signals according to a mode determined by format of the television display, format of the video image and a scaling factor, the scan rate converter being configured to:

determine in accordance with the mode: the GPPL, the GLFF, the GPF, television lines per frame (TVLPF), television pixels per line (TVPPL) and television pixel frequency (TVPF) enabling the computer video image to be entirely displayed on the television display;

store the graphics pixels as they are provided so that each newly stored pixel is selected from (a) a linear combination of a previously stored pixel and a pixel from the graphics signals of a new line and (b) a scaled version of the pixel from the new line; and in a repeating pattern for every IRV VGA lines, where RV $\geq 2$, generate television pixels composing the television video signals from a weighted sum of the stored graphics pixels such that a different precomputed set of weights are used to compute the television pixels for each of the generated television lines.

10. The system of claim 9, wherein the storage comprises for each component of the graphics signals:

a first memory providing storage for no more than GPPL pixels responsive to first read and first write signals updated at the GPF;

a second memory providing storage for no more than GPPL pixels responsive to second read and second write signals updated at the GPF, the first and second memories being functionally interchangeable;

a third memory providing storage for no more than GPPL pixels responsive to a third write signal updated at the GPF and a third read signal updated at the TVPF, the output of the third memory providing the television pixels;

and the scan rate converter further comprises:

a first multiplexer having inputs coupled to the graphics signals and the input of the third memory and an output coupled to the input of the first memory;

a second multiplexer having inputs coupled to the graphics signals and the input of the third memory and an output coupled to the input of the second memory;

a first multiplier having inputs coupled to the output of the first memory and a first coefficient and an output coupled to an adder;

a second multiplier having inputs coupled to the output of the second memory and a second coefficient and an output coupled to the adder;

a third multiplier having inputs coupled to the graphics signals and a third coefficient and an output coupled to the adder;

the adder having an output coupled to the input of the third memory;

wherein the scan converter controls the operation of the memories, multiplexers, multipliers and the adder in such a manner that the graphics pixels from as many as five graphics lines are combined to form the television pixels composing a single television line.

11. The system of claim 10, wherein, when the single television line is being generated from first, second and third adjacent graphics lines, after the pixels from the third line are received:

stored pixels from the first line are read out from the first memory and scaled by the first coefficient in the first multiplier;

stored pixels from the second line are read out from the second memory and scaled by the second coefficient in the second multiplier;

the pixels from the third line are stored in the first memory and are scaled by the third coefficient in the third multiplier;

the scaled first line pixels, the scaled second line pixels and the scaled third line pixels are added in the adder and the resulting sum of products is stored in the third memory at the graphics pixel frequency;

the stored sum of products being output from the third memory at the television pixel frequency as the television signals.

12. The system of claim 10, wherein, when the single television line is being generated from first, second, third and fourth adjacent graphics lines, after the pixels from the third line are received:

stored pixels from the first line are read out from the first memory and scaled by the first coefficient in the first multiplier;

stored pixels from the second line are read out from the second memory and scaled by the second coefficient in the second multiplier;

the pixels from the third line are stored in the first memory, are scaled by the third coefficient in the third multiplier;

the scaled first line pixels, the scaled second line pixels and the scaled third line pixels are added in the adder and the resulting sum of products is stored in the second memory;

after the pixels from the fourth line are received:

the stored sum of products is read out of the second memory;

the pixels from the fourth line are stored in the second memory and are scaled by the third coefficient in the third multiplier;

the scaled fourth line pixels and the sum of products are added in the adder and the resulting second sum of products is stored in the third memory;

the stored second sum of products being output as the television signals at the television pixel frequency.

13. The system of claim 10, wherein, when the single television line is being generated from first, second, third, fourth and fifth adjacent graphics lines, after the pixels from the third line are received:

stored pixels from the first line are readout from the first memory and scaled by the first coefficient in the first multiplier;

stored pixels from the second line are read out from the second memory and scaled by the second coefficient in the second multiplier;

the pixels from the third line are stored in the first memory, are scaled by the third coefficient in the third multiplier;

the scaled first line pixels, the scaled second line pixels and the scaled third line pixels are added in the adder and the resulting sum of products is stored in the second memory;

after the pixels from the fourth line are received:

the stored sum of products is read out of the second memory;

the pixels from the fourth line are stored in the second memory and are scaled by the third coefficient in the third multiplier;

the scaled fourth line pixels and the sum of products are added in the adder and the resulting second sum of products is stored in the first memory;

after the pixels from the fifth line are received:
the stored second sum of products is read out of the first memory;
the pixels from the fifth line are stored in the first memory and are scaled by the third coefficient in the third multiplier;
the scaled fifth line pixels and the second sum of products are added in the adder and the resulting third sum of products is stored in the third memory;
the stored third sum of products being output as the television signals at the television pixel frequency.

14. The system of claim 9, wherein the scan rate converter further comprises a database defining for each supported mode signal settings associated with that mode, wherein the signal settings include:
the television display lines per frame setting (TVLPF),
the graphics display lines per frame setting (GLPF),
the television pixels per line setting (TVPPL), and
the graphics pixels per line setting (GPPL),
the television pixel clock frequency setting (TVPF), and
the graphics pixel clock frequency setting (GPF).

15. The system of claim, 14, wherein:
the format of the television display is selected from PAL or NTSC;
the format of the video image is defined in terms of the GPPL and the GLPF, including 512×384, 720×400, 640×400, 640×480 and 800×600; and
the scaling factor K is selected from 1/1, 3/4, 5/4, 5/6, 7/8 or 7/10.

16. The system of claim 15, wherein the format of the video image defined in terms of the GPPL and the GLPF further includes interlaced 720×576, interlaced 720×480, interlaced 800×500, and interlaced 640×400.

17. The system of claim 9, wherein the GPPL and TVPPL are determined:
when the method is implemented with the GPF equal to the TVPF, in accordance with the following equation:

$$\frac{TVPPL \times TVLPF}{2 \times GLPF} = \text{integer} = GPPL$$

when the method is implemented with the GPPL different from the TVPF, in accordance with the following equation, wherein the factor 1/2*PIQ provides the ratio between second memory read and write frequencies:

$$\frac{TVPPL \times TVLPF}{2 \times (P/Q) \times GLPF} = \text{integer} = GPPL.$$

18. The system of claim 9, wherein the storage comprises for each component of the graphics signals:
a first memory providing storage for no more than GPPL pixels responsive to first read and first write signals updated at the GPF;
a second memory providing storage for no more than GPPL pixels responsive to second read and second write signals updated at the GPF, the first and second memories being functionally interchangeable;
a third memory providing storage for no more than G[]PP pixels responsive to a third write signal updated at the GPF and a third read signal updated at the TVPF, the output of the third memory providing the television pixels;
and the scan rate converter further comprises:

a coefficient memory configured to store coefficients used to form the weighted sum of the stored graphics pixels, the input of the coefficient memory being coupled to control signals that determine which coefficients are output by the coefficient memory;
an ALU with inputs coupled to the outputs of the coefficient memory and the graphics signals, the ALU being configured to compute first and second weighted graphics signals each representing at least a combination of a new graphics signal and at least one new coefficient output by the coefficient memory;
a first multiplexer having inputs coupled to the first weighted graphics signal and the input of the third memory and an output coupled to the input of the first memory;
a second multiplexer having inputs coupled to the first weighted graphics signal and the input of the third memory and an output coupled to the input of the second memory;
an adder with inputs coupled to the outputs of the first and second memories and the second weighted graphics signal and an output coupled to the input of the third memory; the adder being configured to output a weighted sum of its inputs;
wherein the scan converter controls the operation of the memories, multiplexers, the ALU and the adder in such a manner that the graphics pixels from as many as five graphics lines are combined to form the television pixels composing a single television line.

19. The system of claim 18, wherein:
the first weighted signal is coupled to the inputs of the first and second multiplexers via a first scaler configured to scale the first weighted signal by a predetermined scale factor selected to enable resulting scaled first weighted signal to be stored in a predetermined number of bits in first and second line memories; and
the second weighted signal is coupled to the input of the adder via a second scaler configured to scale the second weighted signal by the predetermined scale factor and to produce a scaled second weighted signal.

20. The system of claim 19, wherein:
the outputs of the first and second line memories are respectively coupled to the adder via first and second gain elements;
the first gain element being configured to output to the adder a first product of the first line memory output and a first one-bit gain factor; and
the second gain element being configured to output to the adder a second product of the second line memory output and a second one-bit gain factor;
such that the weighted sum output by the adder comprises the sum of the first and second products and the scaled second weighted signal.

21. The system of claim 18, wherein the coefficient memory comprises first and second coefficient memories respectively configured to store values of first and second coefficients.

22. The system of claim 21, wherein the first and second coefficient memories store for a given mode a number RV of sets of the first and second coefficients, where the number RV is a repeat value (RV) representing a number of input image lines after which a set of graphics lines whose graphics pixels are stored in the line memories and a new television line being generated from at least a subset of the set of graphics lines are in the same relative positions and the beginning of one of the set of graphics lines and the new television line coincide;

the scan converter being configured to direct the coefficient memories to output the first and second coefficients that correspond to the position of a current VGA line in a sequence of RV graphics lines.

23. The system of claim 22, wherein each of the sets of the first and second coefficients includes a plurality of the first and second coefficients, each associated with a particular flicker filter implementation.

24. The system of claim 18, wherein:

the graphics signals comprise input high and low bandwidth signals;

the ALU comprises first, second, third and fourth multipliers and first and second adders;

the first coefficient memory output comprises first low bandwidth and high bandwidth signals;

the second coefficient memory output comprises second low bandwidth and high bandwidth signals;

the first multiplier has inputs coupled respectively to the first low bandwidth signal and the input low bandwidth signal and is configured to generate a first product that is the product of its two inputs;

the second multiplier has inputs coupled respectively to the first high bandwidth signal and the input high bandwidth signal and is configured to generate a second product that is the product of its two inputs;

the third multiplier has inputs coupled respectively to the second low bandwidth signal and the input low bandwidth signal and is configured to generate a third product that is the product of its two inputs;

the fourth multiplier has inputs coupled respectively to the second high bandwidth signal and the input high bandwidth signal and is configured to generate a fourth product that is the product of its two inputs;

the first adder has inputs coupled to the first and second products and is configured to generate the first weighted graphics signal, which equals the sum of the first and second products; and the second adder has inputs coupled the third and fourth products and is configured to generate the second weighted graphics signal, which equals the sum of the first and second products.

25. The system of claim 18, wherein:

the ALU comprises first and second multipliers and a first adder;

the first coefficient memory output comprises a first coefficient;

the second coefficient memory output comprises a second coefficient;

the first multiplier is configured to output a first product of the first coefficient and the new graphics signal, the first product composing the first weighted sum; and the second multiplier is configured to output a second product of the second coefficient and the new graphics signal, the second product composing the second weighted sum.

26. The system of claim 18, wherein, when the single television line is being generated from first, second and third adjacent graphics lines, after the pixels from the first line are received
the pixels from the first line are scaled by the ALU, and stored in the first memory;

after the pixels from the second line are received;
the pixels from the second line are scaled by the ALU, and stored in the second memory;

after the pixels from the third line are received;
stored and scaled pixels are read out from the first memory;
stored and scaled pixels are read out from the second memory;
the pixels from the third line are scaled with one set of coefficients by the ALU and stored in the first memory and scaled by a second set of coefficients in the ALU;
the scaled first line pixels, the scaled second line pixels and the scaled third line pixels are added in the adder and the resulting sum of products is stored in the third memory at the graphics pixel frequency;
the stored sum of products being output from the third memory at the television pixel frequency as the television signals.

27. The system of claim 18, wherein, when the single television line is being generated from first, second, third and fourth adjacent graphics lines, after the pixels from the first line are received;
the pixels from the first line are scaled by the ALU, and stored in the first memory;

after the pixels from the second line are received;
the pixels from the second line are scaled by the ALU, and stored in the second memory;

after the pixels from the third line are received;
stored and scaled pixels are read out from the first memory;
stored and scaled pixels are read out from the second memory;
the pixels from the third line are scaled with one set of coefficients by the ALU and stored in the first memory and scaled by a second set of coefficients in the ALU;
the scaled first line pixels, the scaled second line pixels and the scaled third line pixels are added in the adder and the resulting sum of products is stored in the second memory;

after the pixels from the fourth line are received;
the stored sum of products is read out of the second memory;
the pixels from the fourth line are scaled by one set of coefficients in the ALU and stored in the second memory and scaled by a second set of coefficients in the ALU;
the scaled fourth line pixels and the sum of products are added in the adder and the resulting second sum of products is stored in the third memory at the graphics pixel frequency;
the stored second sum of products being output from the third memory at the television pixel frequency as the television signals.

28. The system of claim 18, wherein, when the single television line is being generated from first, second, third, fourth and fifth adjacent graphics lines, after the pixels from the first line are received;
the pixels from the first line are scaled by the ALU, and stored in the first memory;

after the pixels from the second line are received;
the pixels from the second line are scaled by the ALU, and stored in the second memory;

after the pixels from the third line are received;
- stored and scaled pixels are read out from the first memory;
- stored and scaled pixels are read out from the second memory;
- the pixels from the third line are scaled with one set of coefficients by the ALU and stored in the first memory and scaled by a second set of coefficients in the ALU;
- the scaled first line pixels, the scaled second line pixels and the scaled third line pixels are added in the adder and the resulting sum of products is stored in the second memory;

after the pixels from the fourth line are received;
- the stored sum of products is read out of the second memory;
- the pixels from the fourth line are scaled by one set of coefficients in the ALU and stored in the second memory and scaled by a second set of coefficients in the ALU;
- the scaled fourth line pixels and the sum of products are added in the adder and the resulting second sum of products is stored in the first memory;

after the pixels from the fifth line are received;
- the stored second sum of products is read out of the first memory;
- the pixels from the fifth line are scaled by one set of coefficients in the ALU and stored in the first memory and scaled by a second set of coefficients in the ALU;
- the scaled fifth line pixels and the second sum of products are added in the adder and the resulting third sum of products is stored in the third memory at the graphics pixel frequency;
- the stored third sum of products being output from the third memory at the television pixel frequency as the television signals.

* * * * *